United States Patent
Jung et al.

(10) Patent No.: US 11,442,241 B2
(45) Date of Patent: Sep. 13, 2022

(54) LENS DRIVING APPARATUS, CAMERA MODULE, AND OPTICAL APPARATUS

(71) Applicant: LG INNOTEK CO., LTD., Seoul (KR)

(72) Inventors: Tae Jin Jung, Seoul (KR); Sang Jun Min, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 338 days.

(21) Appl. No.: 16/725,158

(22) Filed: Dec. 23, 2019

(65) Prior Publication Data
US 2020/0150378 A1  May 14, 2020

Related U.S. Application Data

(63) Continuation of application No. 15/748,116, filed as application No. PCT/KR2016/007993 on Jul. 22, 2016, now Pat. No. 10,551,588.

(30) Foreign Application Priority Data

Jul. 29, 2015 (KR) .................. 10-2015-0107040
Oct. 26, 2015 (KR) .................. 10-2015-0148723
Dec. 9, 2015 (KR) .................. 10-2015-0174865

(51) Int. Cl.
*G02B 7/09* (2021.01)
*G03B 3/10* (2021.01)
(Continued)

(52) U.S. Cl.
CPC .............. *G02B 7/09* (2013.01); *G02B 7/08* (2013.01); *G02B 27/646* (2013.01); *G03B 3/10* (2013.01);
(Continued)

(58) Field of Classification Search
CPC .......... G02B 7/09; G02B 7/08; G02B 27/646; G03B 3/10; G03B 5/00; G03B 13/36;
(Continued)

(56) References Cited

U.S. PATENT DOCUMENTS 9,225,887 B1   12/2015   Hsu et al.
10,197,762 B2   2/2019   Park et al.
(Continued)

FOREIGN PATENT DOCUMENTS

CN   203259538 U   10/2013
CN   104142553 A   11/2014
(Continued)

OTHER PUBLICATIONS

Office Action dated Dec. 26, 2019 in Chinese Application No. 201680044218.4.
(Continued)

*Primary Examiner* — Mohammed A Hasan
(74) *Attorney, Agent, or Firm* — Saliwanchik, Lloyd & Eisenschenk

(57) ABSTRACT

The present invention relates to a lens driving apparatus, comprising: a cover member which comprises an upper plate and a side plate extending downwardly from the upper plate; a housing which is located in an inner space formed by the upper plate and the side plate; a base which is positioned below the housing; a first driving unit which is positioned in the housing; a second driving unit which is located in the base and has an electromagnetic interaction with the first driving unit; and a side support member which elastically supports the housing with respect to the base, wherein the cover member comprises a first round portion formed to be rounded in at least a part of portion at which the upper plate and the side plate meet, and the housing comprises a second round portion which is formed in a part of the housing corresponding to the first round portion and has a curvature radius which is smaller than or equal to a curvature radius of the first round portion.

20 Claims, 20 Drawing Sheets

(51) Int. Cl.
- *H02K 33/16* (2006.01)
- *H04N 5/225* (2006.01)
- *H04N 5/232* (2006.01)
- *G02B 7/08* (2021.01)
- *G02B 27/64* (2006.01)
- *G03B 5/00* (2021.01)
- *G03B 13/36* (2021.01)

(52) U.S. Cl.
CPC ............... *G03B 5/00* (2013.01); *G03B 13/36* (2013.01); *H02K 33/16* (2013.01); *H04N 5/2253* (2013.01); *H04N 5/2254* (2013.01); *H04N 5/23212* (2013.01); *H04N 5/23287* (2013.01); *G03B 2205/0007* (2013.01); *G03B 2205/0069* (2013.01)

(58) Field of Classification Search
CPC .... G03B 2205/0007; G03B 2205/0069; H02K 33/16; H04N 5/2253; H04N 5/2254; H04N 5/23212; H04N 5/23287
USPC .......................................................... 359/824
See application file for complete search history.

(56) References Cited

U.S. PATENT DOCUMENTS

| | | |
|---|---|---|
| 2011/0286732 A1 | 11/2011 | Hosokawa et al. |
| 2012/0025633 A1* | 2/2012 | Lee .......................... G02B 7/04 310/12.16 |
| 2012/0200176 A1 | 8/2012 | Park |
| 2013/0050828 A1 | 2/2013 | Sato et al. |
| 2013/0119785 A1 | 5/2013 | Han |
| 2014/0177056 A1 | 6/2014 | Hayashi et al. |
| 2015/0160471 A1 | 6/2015 | Dong et al. |
| 2016/0191754 A1* | 6/2016 | Cho ...................... H04N 5/2257 348/357 |
| 2016/0320584 A1* | 11/2016 | Lee ...................... G02B 27/646 |
| 2017/0115466 A1 | 4/2017 | Murakami et al. |
| 2017/0192195 A1 | 7/2017 | Murakami |
| 2017/0371127 A1 | 12/2017 | Murakami |
| 2018/0120532 A1 | 5/2018 | Murakami et al. |
| 2018/0239217 A1 | 8/2018 | Konuma et al. |
| 2018/0246296 A1 | 8/2018 | Sugawara |
| 2018/0364445 A1 | 12/2018 | Osaka et al. |
| 2018/0364446 A1 | 12/2018 | Osaka et al. |
| 2018/0364447 A1 | 12/2018 | Osaka et al. |
| 2019/0033613 A1 | 1/2019 | Takimoto et al. |

FOREIGN PATENT DOCUMENTS

| | | |
|---|---|---|
| CN | 104204934 A | 12/2014 |
| CN | 104219441 A | 12/2014 |
| CN | 104272716 A | 1/2015 |
| CN | 104902149 A | 9/2015 |
| CN | 104902158 A | 9/2015 |
| CN | 104935792 A | 9/2015 |
| CN | 106094160 A | 11/2016 |
| GB | 2444830 A | 6/2008 |
| KR | 10-2010-0126176 A | 12/2010 |
| KR | 10-2012-0065764 A | 6/2012 |
| KR | 10-1485742 B1 | 1/2015 |
| KR | 10-2015-0050080 A | 5/2015 |
| KR | 10-2015-0080730 A | 7/2015 |

OTHER PUBLICATIONS

International Search Report in International Application No. PCT/KR2016/007993, filed Jul. 22, 2016.
Office Action dated May 2, 2019 in U.S. Appl. No. 15/748,116.
Notice of Allowance dated Sep. 23, 2019 in U.S. Appl. No. 15/748,116.
Office Action dated Oct. 16, 2020 in Chinese Application No. 201680044218.4.
Office Action dated Mar. 28, 2022 in Korean Application No. 10-2015-0107040.
Office Action dated Nov. 3, 2021 in Chinese Application No. 202011331768.9.

* cited by examiner

LENS DRIVING APPARATUS, CAMERA MODULE, AND OPTICAL APPARATUS

CROSS-REFERENCE TO RELATED APPLICATIONS

This application is a continuation of U.S. application Ser. No. 15/748,116, filed Jan. 26, 2018; which is the U.S. national stage application of International Patent Application No. PCT/KR2016/007993, filed Jul. 22, 2016, which claims priority to Korean Application Nos. 10-2015-0107040, filed Jul. 29, 2015; 10-2015-0148723, filed Oct. 26, 2015; and 10-2015-0174865, filed Dec. 9, 2015, the disclosures of each of which are incorporated herein by reference in their entirety.

TECHNICAL FIELD

The teachings in accordance with exemplary and non-limiting embodiments of this invention relate generally to a lens driving apparatus, a camera module, and an optical apparatus.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to prompt various types of circumferential devices or additional equipment to be mounted on mobile terminals. Inter alfa, camera modules may be representative items photographing an object in a still picture or a video.

Camera modules capable of performing handshake correction (OIS: Optical Image Stabilization) function are recently used, and the conventional camera module suffers from disadvantages/problems where an upper end of a housing horizontally moving in order to perform the OIS function contacts a rounded portion of a cover member to generate an unintentional tilt to the housing. Particularly, when an external pressure such as reliability test (drop or tumbling) is applied, the conventional camera module has suffered disadvantages/problems where an entire external surface of a housing does not contact an inner surface of a cover member but only an upper end of a corner at the housing bumps into a cover member to generate a deformation to the housing or to generate a burr.

Meantime, development of camera modules having an auto focus feedback function has been waged recently that includes a function of automatically adjusting a focus in response to a distance of an object and a function of receiving feedbacks in real time in order to perform a more accurate auto focus implementation.

However, in a camera module having a conventional auto focus feedback function, there used to be a limit of distance between a Hall sensor and a sensing magnet to thereby generate a problem in enhancing a Hall output (intensity of magnetic force detected by the Hall sensor). Furthermore, a distance between a driving coil and a Hall sensor is problematically proximate to allow noise to be detected by the Hall sensor due to the electromagnetic field of a coil. Still furthermore, in a camera module having a conventional auto focus feedback function, it is difficult to form a conductive line to a sensor detecting movement of a lens module due to restricted inner space.

DETAILED DESCRIPTION OF THE INVENTION

Technical Subject

In order to solve the abovementioned problems/disadvantages, exemplary embodiments of the present invention provide a lens driving apparatus where an external surface abuts an inner surface of a cover member when a housing maximally moves to a cover member side.

Furthermore, exemplary embodiments of the present invention provide a lens driving apparatus configured to minimize a gap between a Hall sensor and a sensing magnet and to maximize a distance between a Hall sensor and a driving coil.

Still furthermore, exemplary embodiments of the present invention provide a lens driving apparatus formed with a conductive line structure for an auto focus sensor. Still furthermore, exemplary embodiments of the present invention provide a camera module including the lens driving apparatus and an optical apparatus.

Technical Solution

In one general aspect of the present invention, there is provided a lens driving apparatus comprising: a cover member including an upper plate and a lateral plate downwardly extended from the upper plate; a housing disposed at an inner space formed by the upper plate and the lateral plate; a base disposed at a lower side of the housing; a first driving unit disposed at the housing; a second driving unit disposed at the base to electromagnetically interact with the first driving unit; and a lateral support member elastically support the housing relative to the base, wherein the cover member includes a first round portion formed to be rounded in at least a part of a portion where the upper plate and the lateral plate meet, and wherein the housing includes a second round portion formed in a part of the housing corresponding to the first round portion and having a curvature radius smaller than or equal to a curvature radius of the first round portion.

Preferably, but not necessarily, the second round portion may contact the first round portion in response to movement of the housing.

Preferably, but not necessarily, the second round portion may be disposed at an upper end of the housing in order to function as an upper stopper of the housing.

Preferably, but not necessarily, the second round portion may be disposed at an extreme left side of the housing.

Preferably, but not necessarily, an outer lateral side of the housing may surface-contact an inner surface of the lateral plate, when the housing maximally moves to a lateral side.

Preferably, but not necessarily, at least a part of the second round portion may horizontally overlap with at least a part of the first round portion.

Preferably, but not necessarily, the second round portion may overlap with the cover member to an optical axis direction.

Preferably, but not necessarily, the housing may include a first lateral surface, a second lateral surface adjacent to the first lateral surface, and a corner portion interposed between the first lateral surface and the second lateral surface, wherein the second round portion is disposed at the corner portion.

Preferably, but not necessarily, the housing may include four (4) lateral surfaces and four (4) corner portions disposed among the four (4) lateral surfaces, wherein the second round portion is disposed at each of the four corner portions.

Preferably, but not necessarily, the lens driving apparatus may further comprise: a bobbin disposed at an inner side of the housing; a third driving unit disposed at the bobbin to electromagnetically interact with the first driving unit; an upper support member coupled to an upper surface of the housing and to an upper surface of the bobbin; and a lower support member coupled to a lower surface of the housing and to a lower surface of the bobbin.

Preferably, but not necessarily, the first driving unit may include a magnet, and the second driving unit and the third driving unit may include a coil.

Preferably, but not necessarily, the lens driving apparatus may further comprise a flexible substrate (board) formed with the second driving unit, wherein the lateral support member may be coupled to the upper support member and to the substrate.

Preferably, but not necessarily, the second driving unit may be an FP (Fine Pattern) coil, and the FP coil may be mounted on the substrate.

Preferably, but not necessarily, the lens driving apparatus may further comprise a first sensor disposed at the bobbin to detect the first driving unit.

Preferably, but not necessarily, the lateral support member may include first to eighth wires, each spaced apart from the other wire, wherein the first and second wires are electrically connected to the third driving unit, and the third to eighth wires are electrically connected to the first sensor.

Preferably, but not necessarily, the upper support member may include first to eighth support units, each spaced apart from the other, and the first and second support units may electrically connect the first and second wires to third driving unit, and the third to eighth support units may electrically connect the third to eighth wires to the first sensor.

Preferably, but not necessarily, the lens driving apparatus may further comprise a second sensor interposed between the substrate and the base to detect the first driving unit.

Preferably, but not necessarily, the cover member may be formed in a metal plate material.

In another general aspect of the present invention, there is provided a camera module, comprising: a PCB mounted with an image sensor; a cover member including an upper plate and a lateral plate downwardly extended from the upper plate; a housing disposed at an inner space formed by the upper plate and the lateral plate; a base interposed between the housing and the PCB; a first driving unit disposed at the housing; a second driving unit disposed at the base to electromagnetically interact with the first driving unit; and a lateral support member elastically supporting the housing with respect to the base; wherein the cover member may include a first round portion formed to be rounded in at least a part of a portion where the upper plate and the lateral plate meet; and the housing may include a second round portion formed in a part of the housing corresponding to the first round portion and having a curvature radius smaller than or equal to a curvature radius of the first round portion.

In still another general aspect of the present invention, there is provided an optical apparatus, comprising a body, a camera module disposed at the body to photograph an image of an object, and a display portion disposed at one surface of the body to output the image of the object, wherein the camera module includes: a PCB mounted with an image sensor; a cover member including an upper plate and a lateral plate downwardly extended from the upper plate; a housing disposed at an inner space formed by the upper plate and the lateral plate; a base interposed between the housing and the PCB; a first driving unit disposed at the housing; a second driving unit disposed at the base to electromagnetically interact with the first driving unit; and a lateral support member elastically supporting the housing with respect to the base; wherein the cover member may include a first round portion formed to be rounded in at least a part of a portion where the upper plate and the lateral plate meet; and the housing may include a second round portion formed in a part of the housing corresponding to the first round portion and having a curvature radius smaller than or equal to a curvature radius of the first round portion.

A lens driving apparatus according to a first exemplary embodiment of the present invention may comprise: a housing; a first driving unit disposed at the housing; a second driving unit moving the first driving unit through an electromagnetic interaction with the first driving unit; a fixing member disposed at a lower side of the housing to movably support the housing; and a cover member including an upper plate, a lateral plate extended from the upper plate and an inner space formed by the upper plate and the lateral plate, the inner space accommodating the housing, wherein the cover member includes a first round portion formed to be rounded in at least a part of a portion where the upper plate and the lateral plate meet, and wherein the housing includes a second round portion formed in a part of the housing corresponding to the first round portion and having a curvature radius smaller than or equal to a curvature radius of the first round portion.

Preferably, but not necessarily, an outside surface may surface-contact an inner surface of the fixing member by contact between the first round portion and the second round portion, when the housing moves to contact an inner surface of the fixing member.

Preferably, but not necessarily, at least a part of the first round portion may horizontally overlap with the second round portion.

Preferably, but not necessarily, the second round portion may have a shape corresponding to that of the first round portion.

Preferably, but not necessarily, the housing may include a first lateral surface, a second lateral surface adjacent to the first lateral surface and a corner portion interposed between the first lateral surface and the second lateral surface, wherein the second round portion may be disposed at a corner portion.

Preferably, but not necessarily, the second round portion may be disposed at an upper end of the housing.

Preferably, but not necessarily, the second round portion may vertically overlap with the cover member.

Preferably, but not necessarily, the housing may include four (4) lateral surfaces and four (4) corner portions disposed among the four lateral surfaces, wherein the second round portion may be disposed at each of the four corner portions.

Preferably, but not necessarily, the outer surface of the housing and an inner surface of the cover member may be flatly formed.

Preferably, but not necessarily, the fixing member may include a circuit substrate disposed with the second driving portion, and the housing may be elastically supported by a lateral support member coupled by the circuit substrate.

Preferably, but not necessarily, the second driving unit may include an FP (Fine Pattern) coil, and the FP coil may be mounted on the circuit substrate.

Preferably, but not necessarily, the lateral support member may include a plurality of wires.

Preferably, but not necessarily, the fixing member may include a base coupled with the lateral plate of the cover member, and the housing may be elastically supported to the base by a leaf spring.

Preferably, but not necessarily, the lens driving apparatus may further comprise: a bobbin accommodating a lens module while being movably supported to an inside of the housing; and a third driving unit disposed at the bobbin, wherein the first driving unit can move the third driving unit through an electromagnetic interaction with the third driving unit.

Preferably, but not necessarily, the third driving unit and the second driving unit may include a coil and the first driving unit may include a magnet.

Preferably, but not necessarily, the cover member may be formed with a metal plate material.

A camera module according to a first exemplary embodiment of the present invention may comprise: a housing; a first driving portion disposed at the housing; a bobbin disposed at an inside of the housing; a second driving portion moving the first driving portion through an electromagnetic interaction with the first driving portion; a fixing member disposed at a lower side of the housing to movably support the housing; and a cover member including an upper plate, a lateral plate extended from the upper plate and an inner space formed by the upper plate and the lateral plate, the inner space accommodating the housing, wherein the cover member includes a first round portion formed to be rounded in at least a part of a portion where the upper plate and the lateral plate meet, and wherein the housing includes a second round portion formed in a part of the housing corresponding to the first round portion and having a curvature radius smaller than or equal to a curvature radius of the first round portion.

An optical apparatus according to a first exemplary embodiment of the present invention, comprising a body, a display portion disposed at one surface of the body to display information, and a camera module disposed at the body to photograph an image or a photograph, wherein the camera module includes: a housing; a first driving unit disposed at the housing; a second driving unit moving the first driving unit through an electromagnetic interaction with the first driving unit; a fixing member disposed at a lower side of the housing to movably support the housing; and a cover member including an upper plate, a lateral plate extended from the upper plate and an inner space formed by the upper plate and the lateral plate, the inner space accommodating the housing, wherein the cover member includes a first round portion formed to be rounded in at least a part of a portion where the upper plate and the lateral plate meet, and wherein the housing includes a second round portion formed in a part of the housing corresponding to the first round portion and having a curvature radius smaller than or equal to a curvature radius of the first round portion.

A lens driving apparatus according to a second exemplary embodiment of the present invention may comprise: a bobbin; a housing disposed at an outside of the bobbin; a support member coupled to the bobbin and the housing; a first magnet arranged at the bobbin; a substrate arranged at the housing; and a sensor mounted on the substrate to detect the first magnet, wherein the substrate may be so arranged as to allow a mounted surface of the sensor to face a first magnet side.

Preferably, but not necessarily, an imaginary extension line extended from the substrate may meet an optical axis of the lens module coupled to the bobbin to form an acute angle.

Preferably, but not necessarily, the substrate may be arranged in parallel with the optical axis of the lens module and may be arranged in parallel with the first magnet.

Preferably, but not necessarily, the sensor may be interposed between the substrate and the first magnet.

Preferably, but not necessarily, the sensor may include a sensing portion sending a magnetic field of the first magnet, and a case accommodating the sensing portion at an inside thereof, wherein the case may include a first surface mounted on the substrate, a second surface facing the first surface, and a third surface connecting a corner of the first surface and a corner of the second surface, and wherein a distance between the sensing portion and the second surface may be shorter than a distance between the sensing portion and the third surface.

Preferably, but not necessarily, a distance between the sensing portion and the second surface may be shorter than a distance between the sensing portion and the first surface.

Preferably, but not necessarily, a distance between the sensing portion and the second surface may be 90 μm~110 μm, and a distance between the sensing portion and the third surface may be 240 μm~260 μm.

Preferably, but not necessarily, the lens driving apparatus may further comprise a second magnet arranged at the bobbin and may be symmetrically disposed with the first magnet about the bobbin.

Preferably, but not necessarily, the lens driving apparatus may further comprise a first coil disposed at the bobbin, a third magnet disposed at the housing to face the first coil, wherein the sensor may be arranged at an upper surface of the housing and the first magnet may be arranged at an upper surface of the bobbin and the first coil may be arranged at a lower surface of the bobbin.

Preferably, but not necessarily, the lens driving apparatus may further comprise a sensor portion accommodation portion arranged at an upper surface of the housing and accommodated with the substrate and the sensor, wherein the sensor portion accommodation portion may include a substrate support portion supporting a lower surface of the substrate, and a sensor support portion supporting a lower surface of the sensor, and wherein the substrate support portion and the sensor support portion may be connected in a staircase manner.

Preferably, but not necessarily, the support member may include an upper support member coupled to an upper surface of the bobbin and to an upper surface of the housing, wherein the upper support member may include first to sixth upper support members, each spaced apart from the other, and the first to fourth upper support members may be electrically connected to the substrate and the fifth and sixth upper support members may be electrically connected to the first coil.

Preferably, but not necessarily, the lens driving apparatus may further comprise: a base disposed at a lower side of the housing; a flexible substrate disposed at the base; and a second coil disposed at the flexible substrate to face the third magnet, wherein the second coil may be an FP (Fine Pattern) coil mounted on the flexible substrate.

Preferably, but not necessarily, the lens driving apparatus may further comprise a lateral support member in which one end portion of one side is electrically connected to the flexible substrate and one end portion of the other side is electrically connected to the upper support member, wherein the lateral support member may include first to eighth lateral support members, each spaced apart from the other, and wherein the first lateral support member is electrically connected to the first upper support member, the second lateral support member is electrically connected to the second upper support member, the third lateral support member is electrically connected to the third upper support member, the fourth lateral support member is electrically connected to the fourth upper support member, the fifth lateral support member is electrically connected to the fifth upper support member, and the sixth lateral support member is electrically connected to the sixth upper support member.

A camera module according to a second exemplary embodiment of the present invention may comprise: a bobbin; a housing disposed at an outside of the bobbin; a support member coupled to the bobbin and the housing; a first magnet arranged at the bobbin; a substrate arranged at the housing; and a sensor mounted on the substrate to detect the first magnet, wherein the substrate may be such that a mounting surface mounted with the sensor faces a first magnet side.

An optical apparatus according to a second exemplary embodiment of the present invention may comprise: a bobbin; a housing disposed at an outside of the bobbin; a support member coupled to the bobbin and the housing; a first magnet arranged at the bobbin; a substrate arranged at the housing; and a sensor mounted on the substrate to detect the first magnet, wherein the substrate may be such that a mounting surface mounted with the sensor faces a first magnet side.

A lens driving apparatus according to a third exemplary embodiment of the present invention may comprise: a housing; a first driving portion disposed at the housing; a bobbin disposed at an inside of the housing; a second driving portion disposed at the bobbin to face the first driving portion; a support member coupled to the housing and the bobbin; a passive detector disposed at the bobbin; and a sensor portion disposed at the housing to detect the passive detector; wherein the support member may include first to fourth support units each spaced apart from the other, and the first to fourth support units may be electrically connected to the sensor portion.

Preferably, but not necessarily, the first support unit may be disposed, in at least a part thereof, on a same planar surface as that of the second to fourth support units.

Preferably, but not necessarily, the support member may further include fifth and sixth support units, each of the fifth and sixth support units being spaced apart from the other, and each of the fifth and sixth support units spaced apart from the first to fourth support units, wherein the fifth and sixth support units may be electrically connected to the second driving portion.

Preferably, but not necessarily, the housing may include a first lateral surface portion and a second lateral surface portion adjacent to the first lateral surface portion, wherein the first and second support units may be vertically overlapped with the first lateral surface portion, and the third and fourth support units may be vertically overlapped with the second lateral surface portion.

Preferably, but not necessarily, each of the first to sixth support units may be formed with a different shape.

Preferably, but not necessarily, the lens driving apparatus according to a third exemplary embodiment of the present invention may further comprise: a base disposed at a lower side of the housing; a third driving portion disposed at the base to face the first driving portion; and a lateral elastic member supporting the housing respective to the base, wherein the lateral elastic member may include first to sixth elastic units, each spaced apart from the other, and wherein the first to sixth elastic units may be electrically paired and connected with the first to sixth support units.

Preferably, but not necessarily, the second support unit may include a first conductive portion coupled to the second elastic unit, an extension unit extended from the first conductive portion to an outside along a circumference of the housing, a bent portion extended from the extension unit by being bent inwardly, a coupled portion connected to the bent portion and coupled with the housing, and a second conductive portion extended from the bent portion to be electrically connected to the sensor portion.

Preferably, but not necessarily, the coupled portion may include a coupling hole inserted by a coupling lug that protrudes upwardly from an upper surface of the housing, and a guide hole inserted by a guide lug protruded upwardly from an upper surface of the housing to be spaced apart from the coupling lug.

Preferably, but not necessarily, the housing may further include an upper stopper protruded upwardly from an upper surface, wherein the upper stopper may be disposed at an inside of the first conductive portion, the extension portion, the bent portion and the coupling portion.

Preferably, but not necessarily, the sensor portion may include a Hall sensor detecting the passive detector, and a substrate mounted at one surface with the Hall sensor and formed at the other surface with first to fourth terminals, wherein the first to fourth terminals may be electrically paired with and connected to the first to fourth support units.

A camera module according to a third exemplary embodiment of the present invention may comprise: a housing; a first driving portion disposed at the housing; a bobbin disposed at an inside of the housing; a second driving portion disposed at the bobbin to face the first driving portion; a support member coupled to the housing and the bobbin; a passive detector disposed at the bobbin; a sensor portion disposed at the housing to detect the passive detector, wherein the support member may include first to fourth support units, each spaced apart from the other, and wherein the first to fourth support units may be electrically connected to the sensor portion.

An optical apparatus according to a third exemplary embodiment of the present invention may comprise: a housing; a first driving portion disposed at the housing; a bobbin disposed at an inside of the housing; a second driving portion disposed at the bobbin to face the first driving portion; a support member coupled to the housing and the bobbin; a passive detector disposed at the bobbin; a sensor portion disposed at the housing to detect the passive detector, wherein the support member may include first to fourth support units, each spaced apart from the other, and wherein the first to fourth support units may be electrically connected to the sensor portion.

Advantageous Effects

A phenomenon of a housing being unintentionally tilted may be advantageously inhibited even if the housing is maximally moved to a cover member side according to the first exemplary embodiment of the present invention. Furthermore, a phenomenon of an upper stopper at the housing generating a burr by being abraded or worn by reliability test or an external shock can be advantageously inhibited according to the first exemplary embodiment of the present invention.

A Hall output detected by a sensing portion of a Hall sensor can be increased because a position of the sensing portion disposed at an inside of the Hall sensor can be distanced to a minimum from a sensing magnet according to a second exemplary embodiment of the present invention. Furthermore, a distance between a sensing portion inside the Hall sensor and a driving coil can be grown apart to minimize noises by the driving coil, the noises detected by the sensing portion. Thus, a position of bobbin arranged with a sensing magnet can be accurately sensed.

A conductive line of a sensor for auto focus feedback function can be formed through an upper support member according to a third exemplary embodiment of the present invention. Furthermore, rotation respective to a housing of the upper support member can be inhibited. Still furthermore, interference between an upper stopper of housing and a corner portion of a cover member can be minimized to reduce generation of foreign objects caused by wear and to decrease deformation as well.

BRIEF DESCRIPTION OF DRAWINGS

FIG. 14(a) is a partial cross-sectional view illustrating a lens driving apparatus according to a second exemplary embodiment of the present invention, and FIG. 14(b) is partial cross-sectional view of a lens driving apparatus according to a comparative example.

BEST MODE

Figure 1:
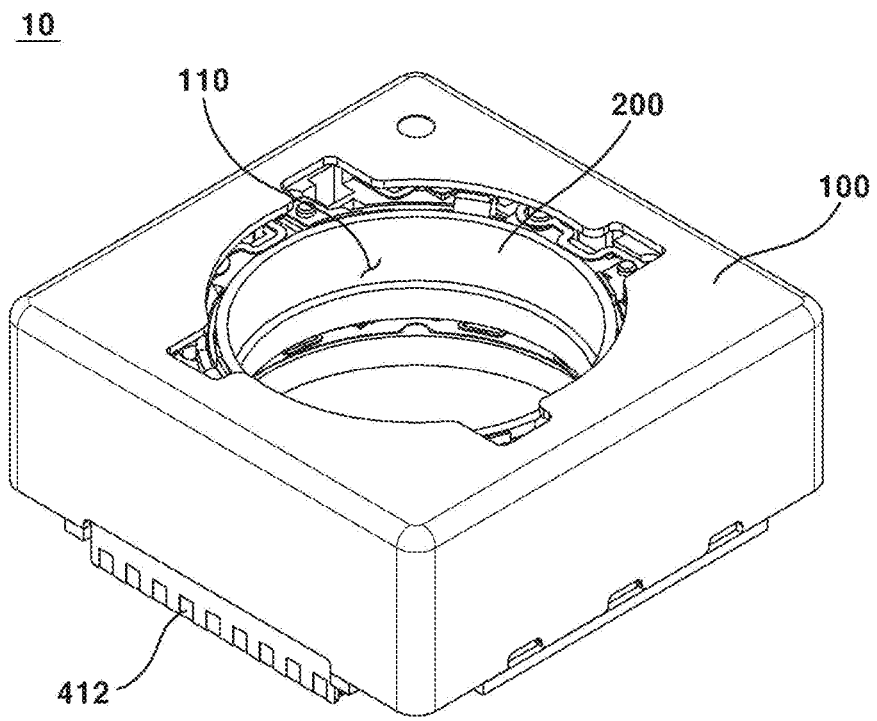
FIG. 1 is a perspective view illustrating a lens driving apparatus according to a first exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter may be defined as an optical axis direction of a lens module in a state of being coupled to a lens driving apparatus (10).

An "auto focus function" as used hereinafter may be defined as a function of matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an external force. Meantime, the "handshake correction" may be interchangeably used with an "OIS (Optical Image Stabilization)".

Now, a configuration of an optical apparatus according to a first exemplary embodiment of the present invention will be described hereinafter.

The optical apparatus according to the exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical device according to an exemplary embodiment of the present invention may include a main body (not shown), a display portion (not shown) disposed at one surface of the main body to display information, and a camera (not shown) disposed on the main body to photograph an image or a photograph.

The optical apparatus according to an exemplary embodiment of the present invention may include a body (not shown), a display portion (not shown) displaying information by being disposed at one surface of the body and a camera (not shown) disposed at the body to photograph an image or a photograph and formed with a camera module (not shown).

Now, configuration of camera module will be described.

The camera module may include a lens driving apparatus (10), a lens module (not shown), an infrared cut-off filter (not shown), a PCB (Printed Circuit Board, not shown), and an image sensor (not shown), and may further include a controller (not shown).

The lens module may include one or more lenses (not shown) and a lens barrel accommodating one or more lenses. However, one element of the lens module is not limited by the lens barrel, and any holder structure capable of supporting one or more lenses will suffice. The lens module may move along with the lens driving apparatus (10) by being coupled to the lens driving apparatus (10). The lens module may be coupled to an inside of the lens driving apparatus (10), for example. The lens module may be screw-coupled with a lens driving apparatus (10), for example.

The lens module may be coupled to an inside of the lens driving apparatus (10), for example. Meantime, a light having passed the lens module may be irradiated on an image sensor.

The infrared cut-off filter may serve to inhibit a light of infrared ray region from entering the image sensor. The infrared cut-off filter may be interposed between the lens module and the image sensor, for example. The infrared cut-off filter may be disposed at a holder member (not shown). However, the infrared cut-off filter may be installed at a hollow hole (510) formed at a center of a base (500). The infrared cut-off filter may be formed with a film material or a glass material, for example. Meantime, the infrared cut-off filter may be formed by allowing an infrared cut-off coating material to be coated on a plate-shaped optical filter such as an imaging plane protection cover glass or a cover glass, for example.

A PCB (Printed Circuit Board) may support the lens driving apparatus (10). The PCB may be mounted with an image sensor. For example, an upper surface of the PCB may be disposed with the lens driving apparatus (10), and an upper inside of the PCB may be disposed with an image sensor. Furthermore, an upper external side of the PCB may be coupled by a sensor holder (not shown), and the sensor holder may be coupled thereon with the lens driving apparatus. Through this structure, a light having passed the lens module accommodated inside the lens driving apparatus (10) may be irradiated onto the image sensor mounted on the PCB. The PCB may supply a power to the lens driving apparatus (10). Meantime, the PCB may be disposed with a controller in order to control the lens driving apparatus (10).

The image sensor may be mounted on the PCB. The image sensor may be so disposed as to match the lens module in terms of optical axis, through which the image sensor can obtain a light having passed the lens module. The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on a PCB. The controller may be disposed at an outside of the lens driving apparatus (10). Furthermore, the controller may be also disposed at an inside of the lens driving apparatus (10). The controller may control a direction, intensity and an amplitude of a current supplied to each element of lens driving apparatus (10). The controller may perform any one of an AF function and an OIS function of the camera module by controlling the lens driving apparatus (10). That is, the controller may move the lens module to—an optical axis direction or tile the lens module to a direction orthogonal to the optical axis direction by controlling the lens driving apparatus (10). Furthermore, the controller may perform a feedback control of AF function and OIS function. To be more specific, the controller may control a power or a current supplied to a third driving portion (220) and/or a second driving portion (420) by receiving a position of a first driving portion (320) and/or a sensing magnet (not shown) detected by a sensor portion (700).

Hereinafter, configuration of lens driving apparatus (10) will be described in detail with reference to the accompanying drawings.

Figure 2:
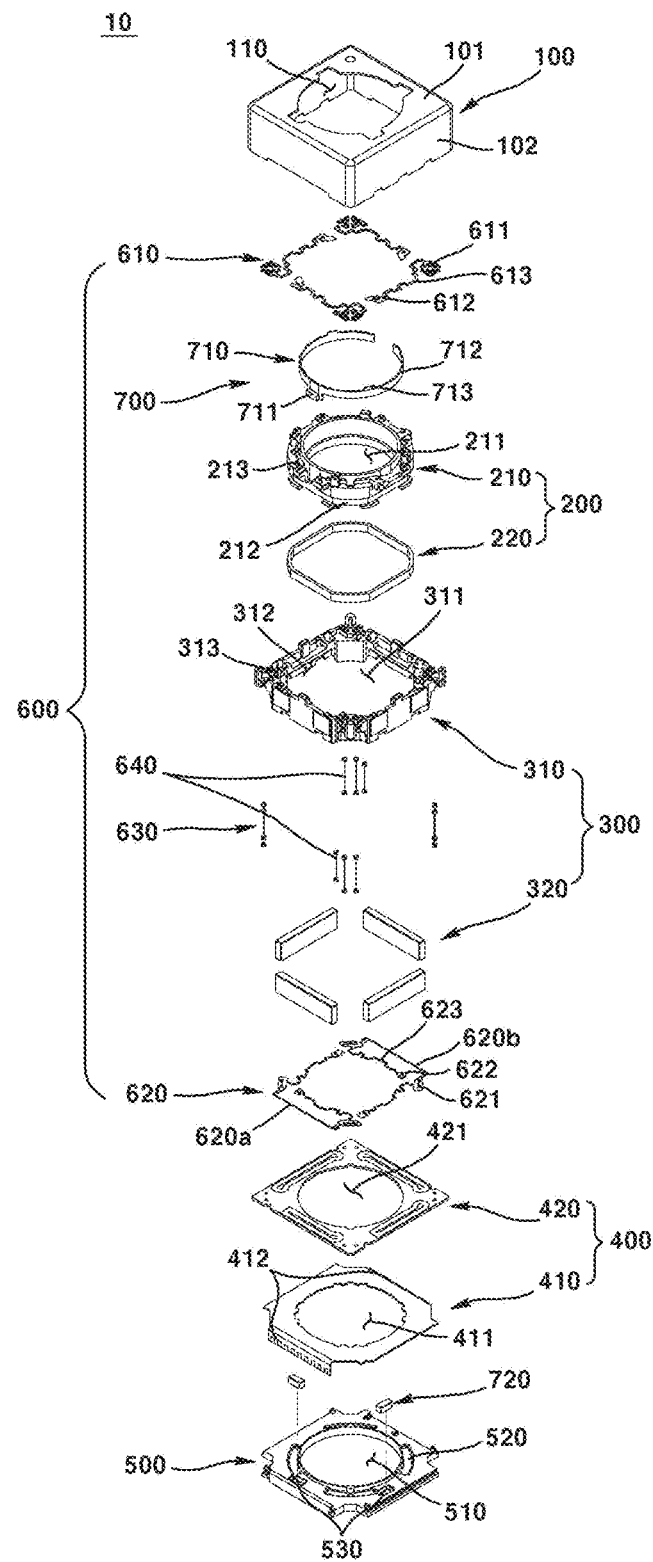
FIG. 2 is an exploded perspective view illustrating a lens driving apparatus according to a first exemplary embodiment of the present invention.
Figure 3:
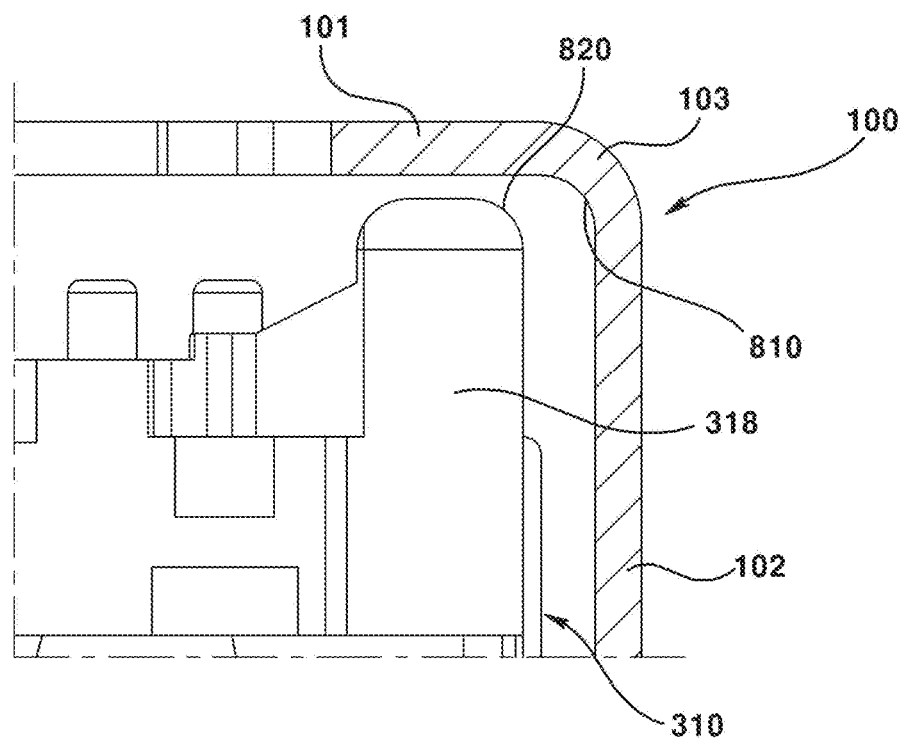
FIG. 3 is a cross-sectional view illustrating a part of a lens driving apparatus according to a second exemplary embodiment of the present invention.
Figure 4:
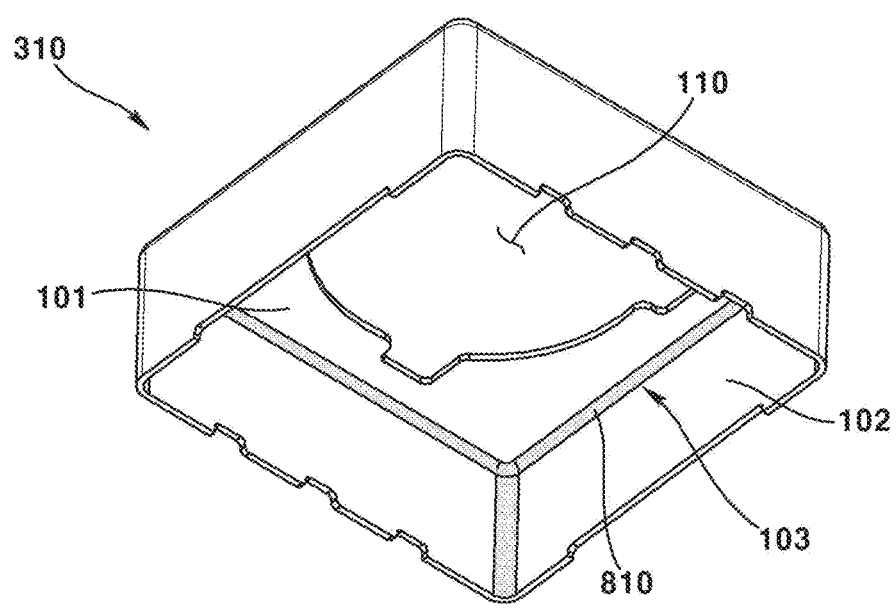
FIG. 4 is a perspective view illustrating a cover member of a lens driving apparatus according to a second exemplary embodiment of the present invention.
Figure 5:
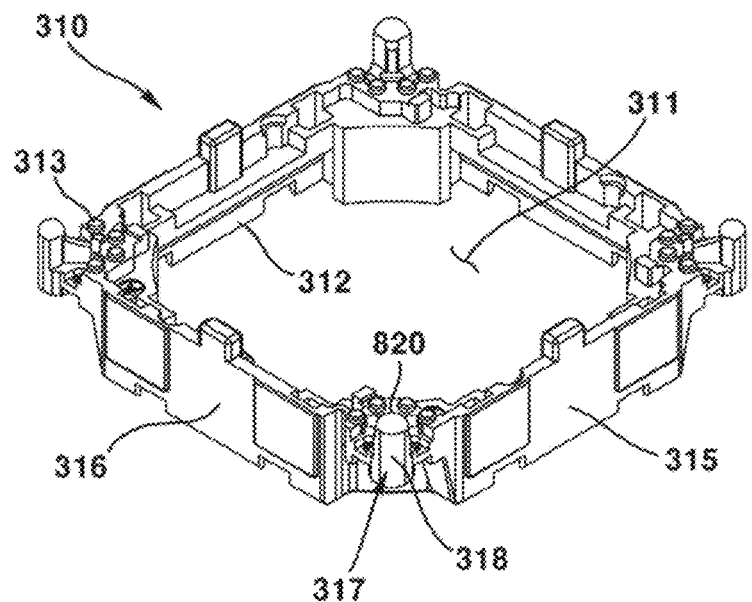
FIG. 5 is a perspective view illustrating a housing of a lens driving apparatus according to a first exemplary embodiment of the present invention.

FIG. 1 is a perspective view illustrating a lens driving apparatus according to a first exemplary embodiment of the present invention, FIG. 2 is an exploded perspective view illustrating a lens driving apparatus according to a first exemplary embodiment of the present invention, FIG. 3 is a cross-sectional view illustrating a part of a lens driving apparatus according to a second exemplary embodiment of the present invention, FIG. 4 is a perspective view illustrating a cover member of a lens driving apparatus according to a second exemplary embodiment of the present invention, and FIG. 5 is a perspective view illustrating a housing of a lens driving apparatus according to a first exemplary embodiment of the present invention.

Referring to FIGS. 1 to 5, the lens driving apparatus (10) according to a first exemplary embodiment of the present invention may include a cover member (100), a first mover (200), a second mover (300), a stator (400), a base (500), a support member (600) and a sensor portion (700). However, the lens driving apparatus (10) according to a first exemplary embodiment of the present invention may omit any one of the cover member (100), the first mover (200), the second mover (300), the stator (400), the base (500), the support member (600) and the sensor portion (700). Inter alfa, the sensor portion (700) may be omitted as an element for AF feedback function and/or OIS feedback function.

The cover member (100) may form an exterior look of lens driving apparatus (10). The cover member may take a lower-opened cubic shape. However, the present invention is not limited thereto. The cover member (100) may include an upper plate (101) and a lateral plate (102) extended downwards from an external side of the upper plate (101). Meantime, a lower end of the lateral plate (102) at the cover member (100) may be mounted to the base (500).

An inner space formed by the cover member (100) and the base (500) may be disposed with a first mover (200), a second mover (300), a stator and a support member (600).

Furthermore, the cover member (100) may be mounted to the base (500) by partially or totally adhered by an inner lateral surface to a lateral surface of the base (500), through which the cover member (100) may have functions of protecting inner elements from external shocks and inhibiting foreign objects from entering the cover member (100) as well.

The cover member (100) may be formed with a metal material, for example. In this case, the cover member (100) may inhibit radio interference. That is, the cover member (100) may inhibit electric waves generated from outside of the lens driving apparatus (10) from entering an inside of the cover member (100). Furthermore, the cover member (100) may inhibit the electric waves generated from inside of the cover member (100) from being emitted to outside of the cover member (100). However, the material of cover member (100) according to the present invention is not limited thereto.

The cover member (100) may include an opening (110) exposing the lens module by being formed at the upper plate (101). The opening (110) may be formed in a shape corresponding to that of the lens module. The size of opening (110) may be formed greater than that of a diameter of the lens module in order to allow the lens module to be assembled through the opening (110). Furthermore, a light introduced through the opening (110) may pass through the lens module. Meantime, the light having passed the lens module may be transmitted to the image sensor.

The first mover (200) may include a bobbin (210) and a third driving portion (220). The first mover (200) may be coupled to a lens module, one of the constitutional elements of camera module {however, the lens module may be explained as one of the elements of the lens driving apparatus (10)}. That is, the lens module may be disposed at an inside of the first mover (200). In other words, an inner circumferential surface of the first mover (200) may be coupled by an outer circumferential surface of the lens module. Meantime, the first mover (200) may move integrally with the lens module through an interaction with the second mover (300). That is, the first mover (200) may move the lens module.

The first mover (200) may include a third driving portion (220) coupled to the bobbin (210).

The bobbin (210) may be coupled to the lens module. To be more specific, an inner circumferential surface of the bobbin (210) may be coupled by an outer circumferential surface of the bobbin (210). Meantime, the bobbin (210) may be coupled by the third driving portion (220). Furthermore, a lower surface of bobbin (210) may be coupled to a lower support member (620) and an upper surface of the bobbin (210) may be coupled to an upper support member (610). The bobbin (210) may be disposed at an inside of a housing (310). The bobbin (210) may be moved to an optical axis direction relative to the housing (310).

The bobbin (210) may include a lens coupling portion (211) formed thereinside. The lens coupling portion (211) may be coupled by the lens module. An inner circumferential surface of the lens coupling portion (211) may be formed with a screw thread in a shape corresponding to that of a screw thread formed at an outer circumferential surface of the lens module. That is, the outer circumferential surface of lens module may be screw-connected to the inner circumferential surface of the lens coupling portion (211). Meantime, an adhesive may be infused into the lens module and the bobbin (210). At this time, the adhesive may be UV curing epoxy. Furthermore, the lens module and the bobbin (210) may be adhered by a heat-curing epoxy.

The bobbin (210) may include a third driving portion coupling portion (212) wound by or installed with the third driving portion (220). The third driving portion coupling portion (212) may be integrally formed with an external lateral surface of the bobbin (210). Furthermore, the third driving portion coupling portion (212) may be continuously formed along with the external lateral surface of the bobbin (210) or may be spaced apart at a predetermined distance. The third driving portion coupling portion (212) may include a recess portion formed by a portion of the external lateral surface of the bobbin (210) being recessed. The third driving portion coupling portion (212) may be disposed with the third driving portion (220), and the third driving portion (220) disposed at the third driving portion coupling portion (212) may be supported by the third driving portion coupling portion (212).

The bobbin (210) may include an upper coupling portion (213) coupled with an upper support member (610). The upper coupling portion (213) may be coupled to an inner lateral portion (612) of the upper support member (610). For example, a lug (not shown) of the upper coupling portion (213) may be coupled by being inserted into a groove or a hole (not shown) at the inner lateral portion (612). Meantime, these elements may be coupled by allowing a lug to be disposed at the upper support member (610) and by allowing a groove or a hole to be disposed at the bobbin (210). Meantime, the bobbin (210) may include a lower coupling portion coupled to a lower support member (620). The lower coupling portion formed at a lower of the bobbin (210) may be coupled to an inner lateral portion (622) of the lower support member (620). For example, a lug (not shown) at the lower coupling portion may be coupled by being inserted into a groove or a hole (not shown) of the inner lateral portion (622). Meanwhile, these elements may be coupled by allowing a lug to be disposed at the lower support member (620) and by allowing a groove or a hole to be disposed on the bobbin (210).

The third driving portion (220) may be disposed in opposition to a first driving portion (320) of the second mover (300). The third driving portion (220) may move the bobbin (210) relative to the housing (310) through an electromagnetic interaction with the first driving portion (320). The third driving portion (220) may include a coil. The coil may be guided to the third driving portion coupling portion (212) to be wound on an external lateral surface of the bobbin (210). Furthermore, in another exemplary embodiment, the coil may be arranged at the external lateral surface of the bobbin (210) by allowing four coils to be independently disposed to form a 90° between adjacent two coils.

When the third driving portion (220) includes a coil, an electric power supplied to the coil may be supplied through the lower support member (620). At this time, the lower support member (620) may be divisively formed into a pair for power supply to the coil.

Meanwhile, the third driving portion (220) may include a pair of lead cables (not shown) in order to supply a power. In this case, each of the pair of lead cables on the third driving portion (220) may be electrically coupled to each of a pair of lower support members (620). Alternatively, the third driving portion (220) may receive the power from the upper support member (610). Meantime, when electricity is supplied to the coil, an electromagnetic field may be generated about the coil. In another exemplary embodiment, the third driving portion (220) may include a magnet, and the first driving portion (320) may include a coil.

The second mover (300) may be disposed at an external side of the first mover (200) in opposition to the first mover (200). The second mover (300) may be supported by the lower-side disposed base (500). The second mover (300) may be supported by a fixing member. At this time, the fixing member may include the base (500) and the stator (400). That is, the second mover (300) may be supported by the base (500) and/or by a circuit substrate (410). The second mover (300) may be disposed at an inner space of the cover member (100).

The second mover (300) may include a housing (310) and a first driving portion (320). The second mover (300) may include a housing (310) disposed at an outside of the bobbin (210). Furthermore, the second mover (300) may include a first driving portion (320) fixed to the housing (310) by being disposed in opposition to the third driving portion (220).

The housing (310) may be formed in a shape corresponding to that of an inner lateral surface of the cover member (100) forming an external look of the lens driving apparatus (10). However, the shape of the housing (310) is not limited thereto, and any shape will suffice as long as the housing is disposed at an inside of the cover member (100). At least a portion of the housing (310) may be formed in a shape corresponding to that of an upper surface of the cover member (100).). At least a portion of the housing (310) may be formed in a shape corresponding to that of a lateral surface of the cover member (100). The housing (310) may take a shape of a cube including four (4) lateral surfaces.

The housing (310) may be formed with an insulation material, and may be formed in an injection-molded article in consideration of productivity. The housing (310) is a part moving for OIS function driving, and may be arranged by being spaced apart from the bobbin (210) at a predetermined distance. However, the housing (310) may be fixed to the base (500) in an AF model. Alternatively, the housing (310) may be omitted in the AF model, and a magnet formed as the first driving portion (320) may be fixed to the cover member (100).

The housing (310) may be upper/lower side-opened to include a first mover (200) in order to allow the first mover (200) to vertically move. The housing (310) may include, at an inner side, an upper/lower opened inner space (311). The inner space (311) may be movably disposed with the bobbin (210). That is, the inner space (311) may be formed in a shape corresponding to that of bobbin (210). Furthermore, an inner circumferential surface of the housing (310) forming the inner space (311) may be disposed by being spaced apart from an outer circumferential surface of the bobbin (210).

The housing (310) may include, at a lateral surface, a first driving portion coupling portion (312) that accommodates the first driving portion (320) by being formed in a shape corresponding to that of the first driving portion (320). That is, the first driving portion coupling portion (312) may fix the first driving portion (320) by accommodating the first driving portion (320). The first driving portion (320) may be fixed by an adhesive (not shown) to the first driving portion coupling portion (312).

Meantime, the first driving portion coupling portion (312) may be disposed at an inner circumferential surface of the housing (310). In this case, there is an advantageous strength for an electromagnetic interaction with the third driving portion (220) disposed at an inside of the first driving portion (320). Furthermore, the first driving portion coupling portion (312) may take a lower-opened shape, for example. In this case, there is an advantageous strength for an electromagnetic interaction between a second driving portion (420) disposed at a lower side of the first driving portion (320) and the first driving portion (320). For example, a lower end of the first driving portion (320) may be protrusively and more downwardly disposed than a lower end of the housing (310). The first driving portion coupling portion (312) may be formed in four pieces, for example. Each of the first driving portion coupling portion (312) may be coupled by each of the first driving portion (320).

The housing (310) may be coupled at an upper surface with an upper support member (610), and may be coupled at a lower surface with a lower support member (620). The housing (310) may include an upper side coupling portion (313) coupled to the upper support member (610). The upper side coupling portion (313) may be coupled to an external portion (611) of the upper support member (610). For example, a lug of the upper side coupling portion (313) may be coupled to a groove or a hole (not shown) at the external portion (611) by being inserted thereinto. Meantime, in a modification, the upper support member (610) may be formed with a lug, and the housing (310) may be formed with a groove or a hole, where both elements may be coupled thereby. Meantime, the housing (310) may include a lower coupling portion (not shown) coupled to the lower support member (620). The lower coupling portion formed at a lower surface of the housing (310) may be coupled to an external portion (621) of the lower support member (620). For example, a lug of the lower coupling portion may be coupled by being inserted into a groove or a hole of the external portion (621). Meantime, in a modification, a lug may be formed at the lower support member (620) and a groove or a hole may be formed at the housing (310), whereby both elements can be coupled.

The housing (310) may include a first lateral surface (315), a second lateral surface (316) formed adjacent to the first lateral surface (315) and a corner portion (317) interposed between the first and the second lateral surfaces (315, 316). In this case, a second round portion (820) may be disposed at the corner portion (317). The corner portion (317) of the housing (310) may be disposed with an upper stopper (318). At this time, the second round (820) may be disposed at an upper end of the upper stopper (318). Furthermore, the housing may include four (4) lateral surfaces and four (4) corner portions disposed among the four lateral surfaces. In this case, the second round portion (820) may be disposed at four corner portions respectively. At this time, two imaginary lines diagonally connecting two second round portions of the four second round portion (820) may meet at a center of the housing (310).

An external surface of the housing (310) and an inner lateral surface of the lateral plate (102) of the cover member (100) may be parallel formed. To be more specific, when the housing (310) is at an initial position, the external surface of the housing (310) and the inner lateral surface of the lateral plate (102) of the cover member (100) may be parallel. In this case, when the housing (310) is maximally moved to a cover member (100) side, the external surface of the housing (310) and the inner lateral surface of the lateral plate (102) of the cover member (100) may be surface-contacted, shocks generated on the housing and/or the cover member (100) may be dispersed.

The first driving portion magnet (320) may be disposed in opposition to the third driving portion (220) of the first mover (200). The first driving portion (320) may move the third driving portion (220) through an electromagnetic interaction with the third driving portion (220). The first driving portion (320) may include a magnet. The magnet may be fixed to the first driving coupling portion (312) of the housing (310). The first driving portion (320) may be disposed at the housing (310) in such a fashion that four magnets are independently formed, and two adjacent magnets form a right angle of 90°, as illustrated in FIG. 2, for example. That is, the first driving portion (320) can promote an efficient use of inner volume by being installed on four lateral surfaces of the housing (310), each at a predetermined interval. Furthermore, the first driving portion (320) may be attached to the housing (310) using an adhesive, but the present invention is not limited thereto. Meantime, the third driving portion (220) may include magnets, and the first driving portion (320) may include coils.

A fixing member may be disposed at a lower side of the housing (310) to movably support the housing (310). The fixing member may include a stator (400) and a base (500). The fixing member may include a circuit substrate (410) disposed with the second driving portion (420). At this time, the housing (310) may be elastically supported by a lateral support member (630) coupled to the circuit substrate (410). The fixing member may include a base (500) coupled to a lateral plate (102) of the cover member (100). At this time, the housing (310) may be elastically supported to the base (500) by a leaf spring (not shown).

The stator (400) may be disposed in opposition to a lower side of the second mover (300). Meantime, the stator (400) can move the second mover (300). Furthermore, through holes (411, 412) parallel or corresponding to the lens module may be disposed at a center of the stator (400). The stator (400) may include a circuit substrate (410) and a second driving portion (420), for example. The stator (400) may include a circuit substrate (board) (410) interposed between the second driving portion (420) and the base (500). Furthermore, the stator (400) may include a second driving portion (420) oppositely formed at a lower side of the first driving portion (320).

The circuit substrate (410) may include a flexible substrate of FPCB (Flexible Printed Circuit Board). The circuit substrate may be interposed between the second driving portion (420) and the base (500). Meantime, the circuit substrate (410) can supply electricity to the second driving portion (420). Furthermore, the circuit substrate (410) may supply electricity to the third driving portion (220) or the first driving portion (320). For example, the circuit substrate (410) can supply electricity to the third driving portion (220) through the lateral support member (630), the upper support member (610), the conductive member (640) and the lower support member (620). Furthermore, the circuit substrate (410) can supply electricity to the third driving portion (220) through the upper support member (610).

The circuit substrate (410) may include a through hole (411) and a terminal portion (412), for example. The circuit substrate (410) may include a through hole (411) that passes a light having passed the lens module. The circuit substrate (410) may include a terminal portion (412) exposed to an outside by being bent. The terminal portion (412) may be connected to an outside power whereby the circuit substrate (410) can be supplied with the electricity.

The second driving portion (420) can move the first driving portion (320) through electromagnetic interaction. The second driving portion (420) may include a coil. When a power is applied to the coil of the second driving portion (420), the first driving portion (320) and the housing (310) fixed by the first driving portion (320) may be integrally moved through an interaction with the first driving portion (320). The second driving portion (420) may be mounted on the circuit substrate (410) or may be electrically connected to the circuit substrate (410). Meantime, the second driving portion (420) may be formed with a through hole (421) for a light of the lens module to pass by. Furthermore, the second driving portion (420) may be formed with an FP (Fine Patterned) coil in consideration of miniaturization of the lens driving apparatus (10, to reduce a height to a z axis direction which is an optical axis direction) to be disposed or mounted at the circuit substrate (410). The FP coil may be so formed as to minimize interference with a second sensor portion (720) disposed at a lower side, for example. The FP coil may be so formed as not to overlap with the second sensor portion (720) to the vertical direction. In this case, each opposing FP coil may be asymmetrically formed.

The base (500) may support the second mover (300). A PCB may be disposed at a lower side of the base (500). The base (500) may include a through hole (510) formed at a position corresponding to that of a lens coupling portion (211) of the bobbin (210). The base (500) may perform a function of sensor holder protecting the image sensor. Meantime, the through hole (510) of the base (500) may be coupled by an infrared ray filter. Alternatively, the infrared ray filter may be coupled to a separate sensor holder arranged at a lower surface of the base (500).

The base (500) may include a foreign object collection portion (520) collecting foreign objects introduced into the cover member (100), for example. The foreign object collection portion (520) may be disposed at an upper surface of the base (500) to collect not only an adhesive material but also foreign objects inside of an inner space formed by cover member (100) and the base (500). The base (500) may include a sensor mounting portion (530) coupled by a second sensor portion (720). That is, the second sensor portion (720) may be mounted on the sensor mounting portion (530). At this time, the second sensor portion (720) may detect the first driving portion (320) coupled to the housing (310) to detect a horizontal movement of the housing (310). The sensor mounting portion (530) may be disposed in two pieces, for example. Each of the sensor mounting portions (530) may be disposed with the second sensor portion (720). In this case, the second sensor portion (720) may be so disposed as to detect both the x axis and y axis direction movements of the housing (310).

The support member (600) may connect two or more of the first mover (200), the second mover (300) and the base (500). The support member (600) may elastically connect more than two elements of the first mover (200), the second mover (300) and the base (500) to allow a relative movement among each element. The support member (600) may be formed with an elastic member. The support member (600) may include an upper support member (610), a lower support member (620), lateral support member (630) and a conductive member (640), for example. However, the conductive member (640) is disposed for electrical conduction of the upper support member (610) and the lower support member (620), such that the conductive member (640) may be separately explained from the upper support member (610), the lower support member (620) and the lateral support member (630).

The upper support member (610) may include an external portion (611), an internal portion (612) and a connection portion (613), for example. The upper support member (610) may include an external portion (611) coupled with the housing (310), an internal portion (612) coupled with the bobbin (210), and a connection portion (613) elastically connecting the external portion (611) and the internal portion (612).

The upper support member (610) may be connected to an upper surface of the first mover (200) and an upper surface of the second mover (300). To be more specific, the upper support member (610) may be coupled to an upper surface of bobbin (210) and an upper surface of housing (310). The internal portion (612) of the upper support member (610) may be coupled to an upper coupling portion (213) of the bobbin (210), and the external portion (611) of the upper support member (610) may be coupled to an upper coupling portion (313) of the housing (310).

The upper support member (610) may be divided to six (6) pieces, for example. At this time, two pieces of the six upper support members (610) may be conductively connected to the lower support member (620) for use to apply electricity to the third driving portion (220). Each of the two upper support members (610) may be electrically connected to a pair of lower support members (620a, 620b) through the conductive member (640). Meantime, remaining four upper support members out of the six upper support members (610) may supply the electricity to the second sensor portion (720) and may be used for transmission/receipt of information and signals between a controller and the second sensor portion (720). Furthermore, as a modification, two upper support members among the six upper support members (610) may be directly connected to the third driving portion (220), and remaining four may be connected to the second sensor portion (720).

The lower support member (620) may include a pair of lower support members (620a, 620b), for example. That is, lower support member (620) may include a first lower support member (620a) and a second lower support member (620b). Each of the first lower support member (620a) and the second lower support member (620b) may receive the electricity by being connected to a pair of lead cables at the third driving portion (220) formed with a coil. Meantime, the pair of lower support members (620a, 620b) may be electrically connected to the circuit substrate (410). Through this configuration, the pair of lower support members (620) can supply the electricity supplied from the circuit substrate (410) to the third driving portion (220).

The lower support member (620) may include an external portion (621), an internal portion (622) and a connection portion (623), for example. The lower support member (620) may include an external portion (621) coupled to the housing (310), an internal portion (622) coupled to the bobbin (210) and a connection portion (623) elastically connecting the external portion (621) and the internal portion (622).

The lower support member (620) may connect a lower surface of the first mover (200) to a lower surface of the second mover (300). To be more specific, the lower support member (620) may connect a lower surface of the bobbin (210) to a lower surface of the housing (310). The internal portion (622) of the lower support member (620) may be coupled by a lower coupling portion of the bobbin (210) and the external portion (621) of the lower support member (620) may be coupled by a lower coupling portion of the housing (310).

The lateral support member (630) may be fixed at one end to the stator (400) and/or the base (500), and coupled at the other end to the upper support member (610) and/or to the second mover (300). The lateral support member (630) may be coupled at one side to the stator (400) and coupled at the other side to the upper support member (610), for example. In another exemplary embodiment, the lateral support member (630) may be coupled at one side to the base (500), and coupled at the other side to the second mover (300), whereby the lateral support member (630) may elastically support the second mover (300) to allow the second mover (300) to horizontally move or to tilt.

The lateral support member (630) may include a plurality of wires. Furthermore, the lateral support member (630) may include a plurality of leaf springs. The lateral support member (630) may be formed in the same number as that of the upper support member (610), for example. That is, the lateral support member (630) may be formed in 6 pieces to be respectively connected to 6-piece upper support member (610). In this case, the lateral support member (630) can supply an electricity supplied from the stator (400) or from outside to each of the 6-piece upper support members (610). The lateral support member (630) may be determined in the number of pieces in consideration of symmetry, for example. The lateral support member (630) may be formed in the total number of eight (8), 2 pieces each to a corner of housing (310), for example.

The lateral support member (630) or the upper support member (610) may include a shock absorption portion (not shown), for example. The shock absorption portion may be formed on at least any one of the lateral support member (630) and the upper support member (610). The shock absorption portion may be a separate member like a damper. Furthermore, the shock absorption portion may be realized through a shape change on any one part of the lateral support member (630) and the upper support member (610).

The conductive member (640) may electrically connect the upper support member (610) and the lower support member (620). The conductive member (640) may be formed separately from the lateral support member (630). Electricity supplied to the upper support member (610) through the conductive member (640) may be supplied to the lower support member (620), and may be supplied to the third driving portion (220) through the lower support member (620). Meantime, as a modification, when the upper support member (610) is directly connected to the third driving portion (220), the conductive member (640) may be omitted.

The sensor portion (700) may be used for at least any one of AF feedback and OIS feedback. The sensor portion (700) may detect positions or movements of at least any one of the first mover (200) and the second mover (300). The sensor portion (700) may include a first sensor portion (710) and a second sensor portion (720), for example. The first sensor portion (710) may provide information for AF feedback by sensing a relative vertical movement of the bobbin (210) relative to the housing (310). The second sensor portion (720) may provide information for OIS feedback by detecting the horizontal direction movement and tilt of the second mover (300).

The first sensor portion (710) may be disposed at the first mover (200). The first sensor portion (710) may be disposed at the bobbin (210). The first sensor portion (710) may be fixed by being inserted into a sensor guide groove (not shown) formed at an outer circumferential surface of bobbin (210). The first sensor portion (710) may include a first sensor (711), a flexible PCB (712) and a terminal portion (713).

The first sensor (711) may detect movement or position of the bobbin (210). Alternatively, the first sensor (711) may detect a position of the first driving portion (320) mounted on the housing (310). The first sensor (711) may be a Hall sensor, for example. The first sensor (711) may detect a relative position change between the bobbin (210) and the housing (310) by detecting a magnetic force generated from the first driving portion (320).

The flexible PCB (712) may be mounted with the first sensor (711). The flexible PCB (712) may be formed with a strip shape, for example. At least one portion of the flexible PCB (712) may be inserted into a sensor guide groove by being formed in a shape corresponding to that of the sensor guide groove formed to be recessed at an upper surface of the bobbin (210). The flexible PCB (712) may be an FPCB, for example. That is, the flexible PCB (712) may be bent in order to correspond to a shape of the sensor guide groove by being formed in a flexible manner. The flexible PCB (712) may be formed with a terminal portion (713).

The terminal portion (713) may supply electricity to the first sensor (711) through the flexible PCB (712) by receiving the electricity. Furthermore, the terminal portion (713) may receive a control command relative to the first sensor (711) or transmit a value sensed from the first sensor (711). The terminal portion (713) may be formed in the number of four (4), for example, to be electrically connected to the upper support member (610). In this case, two terminal portions (713) may be used to receive electricity from the upper support member (610) and the remaining two terminal portions (713) may be used to transmit/receive information or a signal.

The second sensor portion (720) may be disposed at the stator (400). The second sensor portion (720) may be disposed at an upper surface or a lower surface of circuit substrate (410). The second sensor portion (720) may be disposed at a sensor mounting portion (530) formed at the base (500) by being disposed at a lower surface of the circuit substrate (410), for example. The second sensor portion (720) may include a Hall sensor, for example. In this case, the second sensor portion (720) may sense the magnetic field of the first driving portion (320) to sense a relative movement of the second mover (300) relative to the stator (400). The second sensor portion (720) may be formed in the number of two (2) or more to detect both the x axis and y axis movements of the second mover (300), for example. The second sensor portion (720) may be so disposed as not to be overlapped with the FP coil of the second driving portion (420) to the vertical direction.

The lens driving apparatus according to an exemplary embodiment may further comprise a first round portion (810), and a second round portion (820).

The first round portion (810) may be formed in a round manner on at least a portion meeting an upper plate (101) and the lateral plate (102) of the cover member (100). At least a portion of the first round portion (810) may be overlapped with the second round portion (820) to a horizontal direction. That is, when the housing (310) move to the horizontal direction, the second round portion (820) may contact the first round portion (810). A round portion may be formed between the lateral plate (102) of the cover member (100) and the lateral plate (102) adjacent to the lateral plate (102).

When the housing (310) moves to contact an inner lateral surface of the fixing member (100), an outer circumferential surface of the housing may surface-contact an inner circumferential surface of the fixing member (100) by the contact between the first round portion (810) and the second round portion (820). That is, the first round portion (810) and the second round portion (820) may guide in such a manner that the external circumferential surface of the housing (310) surface-contact the inner circumferential surface of the fixing member (100) through the contact. In this case, the external circumferential surface of the housing (310) and the inner circumferential surface of the fixing member (100) may function as a mechanical stopper to disperse the shocks generated by the housing (310) and/or the fixing member (100).

The second round portion (820) may be formed in a round manner at a portion of the housing (310) selectively contacting the first round portion (820). That is, the second round (820) may selectively contact the first round portion (810). Thus, the second round portion (820) may function as a stopper to restrict the movement of the housing (310).

A radius of the second round portion (820) may be smaller than or equal to a radius of the first round portion (810). Furthermore, curvature of second round portion (820) may be smaller than or equal to that of the first round portion (810). Through this configuration, a phenomenon of the housing (310) tilting when the second round portion (820) contacts the first round portion (810). For example, the second round portion (820) may be formed with a shape corresponding to that of the first round portion (810). That is, radius of the second round portion (820) and the radius of the first round portion (810) may be same. Furthermore, curvature of the second round portion (820) and the curvature of the first round portion (810) may be same.

The second round portion (820) may be disposed at the corner portion (317) of the housing (310). Meantime, the second round portion (820) may be disposed at each of the four (4) corner portions of the housing (310). The second round portion (820) may be disposed at an upper end of the housing (310). The second round portion (820) may be disposed at an upper end of the corner portion (317). The second round portion (820) may be disposed at an upper end of an upper stopper (318). Meantime, the second round portion (820) may be vertically overlapped with the upper plate (101) of the cover member (100). In this case, when the housing (310) is moved upwards by an external shock, the second round portion (820) may contact an inner circumferential surface of the upper plate (101) at the cover member (100) to restrict an upward movement of the housing (310).

The second round portion (820) may be provided in four (4) pieces, each being disposed at each four corner portions of the housing (310). At this time, two imaginary lines diagonally connecting two second round portions out of four second round portions (820) may be orthogonal. Furthermore, two imaginary lines diagonally connecting two second round portions out of four second round portions (820) may meet at a center of the housing (310). That is, each of the plurality of second round portions (820) may be formed with a corresponding shape and may be disposed at a corresponding position.

Hereinafter, operation of camera module according to a first exemplary embodiment of the present invention will be described.

First, an AF (Auto Focus) function of the camera module according to the exemplary embodiment of the present invention will be explained.

When a power is supplied to the coil of the third driving portion (220), the third driving portion (220) may perform movement relative to the first driving portion (320) by electromagnetic interaction between magnets of the third driving portion (220) and the first driving portion (320). At this time, the bobbin (210) coupled with the third driving portion (220) may integrally move along with the third driving portion (220). That is, the bobbin (210) coupled to an inner side of the lens module may vertically move relative to the housing (310). The movement by the bobbin (210) may result in the lens module closing in onto or distancing from the image sensor, whereby focus adjustment to an object can be performed.

Meantime, an AF feedback may be applied in order to perform a more accurate realization of AF function for the camera module according to the exemplary embodiment of the present invention.

The first sensor (711) mounted on the bobbin (210) and formed with a Hall sensor can detect a magnetic field of the magnet on the second driving portion (320) fixed to the housing (310).

Meantime, when the bobbin (210) performs a relative movement relative to the housing (310), the amount of magnetic field detected by the first sensor (711) is changed. Using the abovementioned method, the first sensor may transmit a detection value to a controller by detecting the movement of z axis direction or a position of the bobbin (210). The controller may determine whether to perform an additional movement to the bobbin (210) through the received detection value. This process is performed in real time, such that the AF function of the camera module according to an exemplary embodiment of the present invention can be more accurately implemented through the AF feedback.

Now, the OIS function of camera module according to the exemplary embodiment of the present invention will be described.

When a power is supplied to a coil of second driving portion (420), the first driving portion (320) may perform a movement relative to the second driving portion (420) through an electromagnetic interaction between the magnets between the second driving portion (420) and the first driving portion (320). At this time, the housing (310) coupled by the first driving portion (320) may move integrally with the first driving portion (320). That is, the housing (310) may horizontally move to the base (310). Meantime, at this time, the housing (310) may be induced to tilt relative to the base (500). This movement of housing (310) may result in the lens module moving to a direction parallel to that of the image sensor being positioned relative to the image sensor, whereby the OIS function can be performed.

Meantime, an OIS feedback may be applied for more accurate implementation of OIS function of camera module according to the exemplary embodiment of the present invention.

A pair of second sensor portions (720) mounted on the base (500) and formed with a Hall sensor may detect a magnetic field of a magnet at the first driving portion (320) fixed to the housing (310). Meanwhile, when the housing (310) performs a relative movement relative to the base (500), the amount of magnetic field detected by the second sensor portion (720) is changed. Using the abovementioned method, the pair of second sensor portion (720) may transmit a detection value to a controller by detecting the movement of horizontal direction (x axis and y axis directions) or a position of the housing (310). The controller may determine whether to perform an additional movement to the housing (320) through the received detection value. This process is performed in real time, such that the OIS function of the camera module according to an exemplary embodiment of the present invention can be more accurately implemented through the OIS feedback.

Hereinafter, effect of lens driving apparatus according to a first exemplary embodiment of the present invention will be described with reference to the accompanying drawings.

Figure 6A:
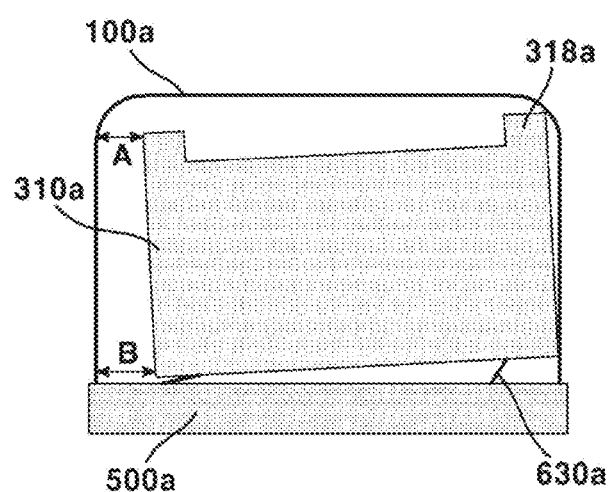
FIGS. 6(a) and 6(b) are schematic views illustrating a comparative example (a) and an operation of a lens driving apparatus (b) according to a first exemplary embodiment of the present invention.
Figure 6B:
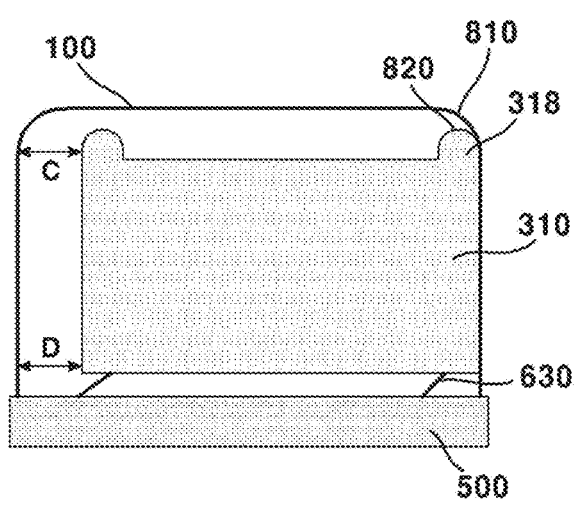

FIGS. 6(*a*) and 6(*b*) are schematic views illustrating a comparative example (a) and an operation of a lens driving apparatus (b) according to a first exemplary embodiment of the present invention.

The lens driving apparatus according to the comparative example may include a cover member (100*a*), a housing (310*a*), an upper stopper (318*a*), a lateral support member (630*a*) and a base (500*a*), as shown in FIG. 6(*a*). At this time, an upper end of the upper stopper (318*a*) may be so formed as to have a square cross-section.

When the housing (310*a*) maximally moves to a horizontal direction (x axis or y axis direction) in order to perform the OIS function, or the housing (310*a*) reaches a mechanical stop position by an external shock in the lens driving apparatus according to the comparative example, a tilt is induced to the housing (310*a*) as shown in FIG. 6(*a*). That is, movement amount (A) at an upper side of the housing (310*a*) and movement amount (B) at a lower side of the housing (310*a*) may be different. In this case, an entire external surface of the housing (310*a*) may not contact an inner surface of the cover member (100*a*), but only an upper end of the upper stopper (318*a*) at the housing (310*a*) may hit the cover member (100*a*) to generate a deformation to the housing (310*a*) or to generate a burr.

The lens driving apparatus according to the exemplary embodiment of the present invention may include a cover member (100), a housing (310), an upper stopper (318), a lateral support member (630) and a base (500), as shown in FIG. 6(*b*). At this time, an upper end of the upper stopper (318) may be formed with a second round portion (820) having a shape corresponding to that of the first round portion (810) of cover member (100).

When the housing (310) maximally moves to a horizontal direction (x axis or y axis direction) in order to perform the OIS function, or the housing (310) reaches a mechanical stop position by an external shock in the lens driving apparatus according to the exemplary embodiment of the present invention, an external surface of the housing (310) may surface-contact an inner surface at the lateral plate (102) of the cover member (100), as illustrated in FIG. 6(*b*). Thus, even if the housing (310) maximally moves to a cover member (100) side, the phenomenon of the housing (310) being unintentionally tilted can be inhibited. Furthermore, the phenomenon of the upper stopper (318) at the housing (310) may be inhibited from being worn or abraded caused by reliability tests or external shocks or the phenomenon of generating a burr can be also inhibited.

Hereinafter, configuration of optical apparatus according to a second exemplary embodiment of the present invention will be described.

The optical apparatus according to the exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus according to the exemplary embodiment of the present invention may include a main body (not shown), a display portion (not shown) arranged at one surface of the main body to display information, and a camera having a camera module (not shown) disposed at the main body to photograph an image or a photograph.

Hereinafter, configuration of camera module according to a second exemplary embodiment of the present invention will be described.

The camera module may include a lens driving apparatus (1000), a lens module (not shown), an infrared cut-off filter (not shown), a PCB (not shown), an image sensor (not shown) and a controller (not shown).

The lens module may include a lens and a lens barrel. The lens barrel may include one or more lenses (not shown) and a lens barrel accommodating one or more lenses. However, one element of the lens module is not limited by the lens barrel, and any holder structure capable of supporting one or more lenses will suffice. The lens module may be coupled to the lens driving apparatus (1000) to move along with the lens driving apparatus (1000). The lens module may be coupled to an inner side of the lens driving apparatus (1000). The lens module may be screw-coupled or screw-connected with a lens driving apparatus (1000), for example. The lens module may be coupled to the lens driving apparatus (1000) using an adhesive (not shown). Meantime, a light having passed the lens module may be irradiated on an image sensor.

The infrared cut-off filter may serve to inhibit a light of infrared ray region from entering the image sensor. The infrared cut-off filter may be interposed between the lens module and the image sensor, for example. The infrared cut-off filter may be disposed at a holder member (not shown) formed separately from a base (1500). However, the infrared cut-off filter may be mounted on a through hole (1510) formed at a center of the base (1500). The infrared cut-off filter may be formed with a film material or a glass material, for example. Meantime, the infrared cut-off filter may be formed by allowing an infrared cut-off coating material to be coated on a plate-shaped optical filter such as an imaging plane protection cover glass or a cover glass, for example.

The PCB may support the lens driving apparatus (1000). The PCB may be mounted with an image sensor. For example, an upper inner side of the PCB may be disposed with an image sensor, and an upper outer side of the PCB may be disposed with a sensor holder (not shown). The sensor holder may be disposed at an upper side with a lens driving apparatus (1000). Alternatively, an upper outer side of the PCB may be disposed with lens driving apparatus (1000), and an upper inner side of the PCB may be disposed with an image sensor. Through this configuration, a light having passed the lens module accommodated at an inside of the lens driving apparatus (1000) can be irradiated to the image sensor mounted on the PCB. The PCB can supply electricity to the lens driving apparatus (1000). Meantime, the PCB may be disposed with a controller for controlling the lens driving apparatus (1000).

The image sensor may be mounted on a PCB. The image sensor may be matched with the lens module in terms of optical axis, whereby the image sensor can obtain a light having passed the lens module. The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on the PCB. The controller may be disposed at an outside of lens driving apparatus (1000). However, the controller may be also disposed at an inside of lens driving apparatus (1000). The controller may control a direction, intensity and amplitude of a current supplied to each element of lens driving apparatus (1000). The controller may perform any one of an AF function and an OIS function of the camera module by controlling the lens driving apparatus (1000). That is, the controller may move the lens module to an optical axis direction or tile the lens module to a direction orthogonal to the optical axis direction by controlling the lens driving apparatus (1000). Furthermore, the controller may perform a feedback control of AF function and OIS function. To be more specific, the controller may control a power or a current applied to a first driving portion (1220) to a third driving portion (1420) by receiving a position of a housing (1310) detected by a sensor portion (1700), whereby a more accurate AF function and OIS function can be provided.

Hereinafter, configuration of lens driving apparatus (1000) according to a second exemplary embodiment of the present invention will be described in detail with reference to the accompanying drawings.

Figure 7:
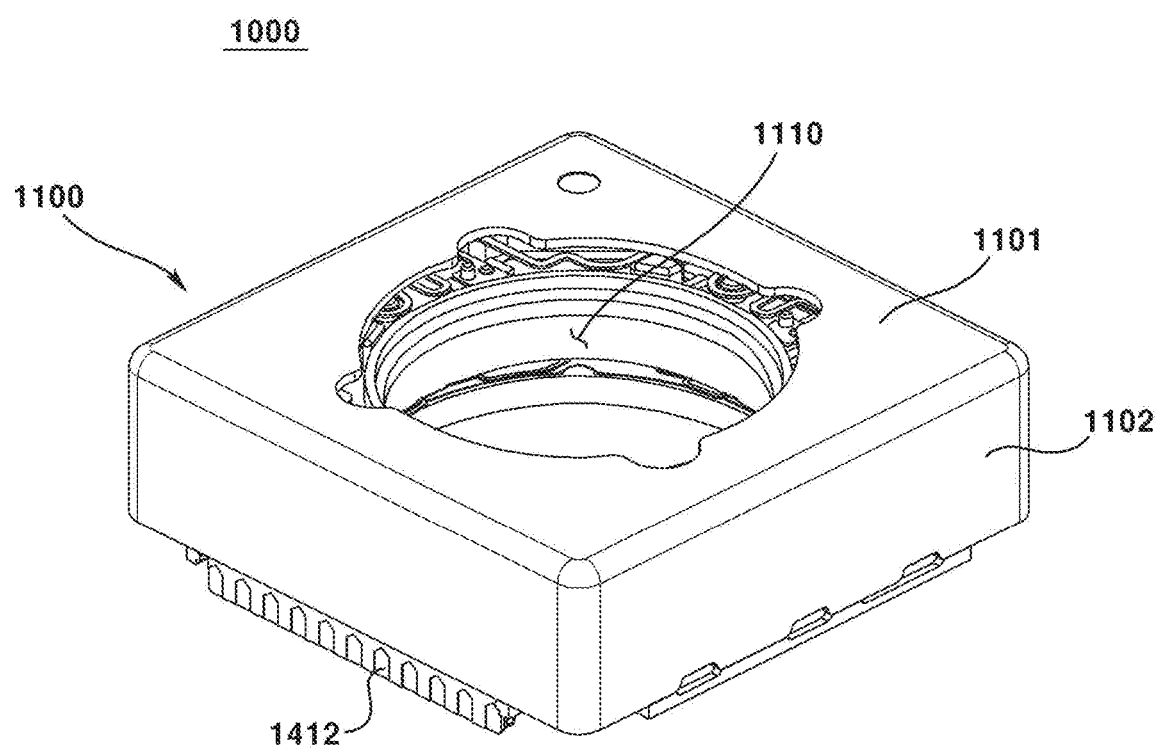
FIG. 7 is a perspective view illustrating a lens driving apparatus according to a second exemplary embodiment of the present invention.
Figure 8:
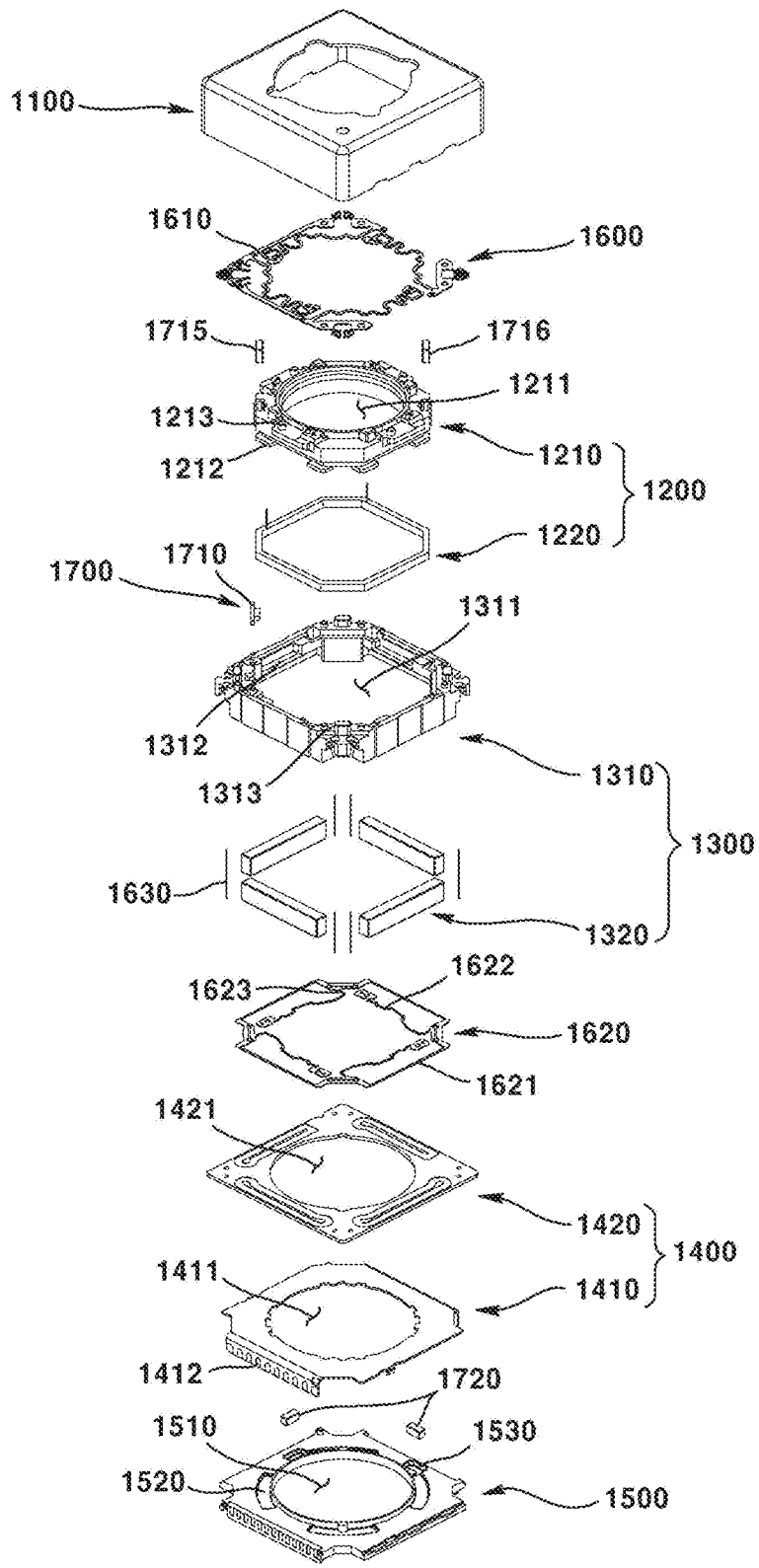
FIG. 8 is an exploded perspective view illustrating a lens driving apparatus according to a second exemplary embodiment of the present invention.
Figure 9:
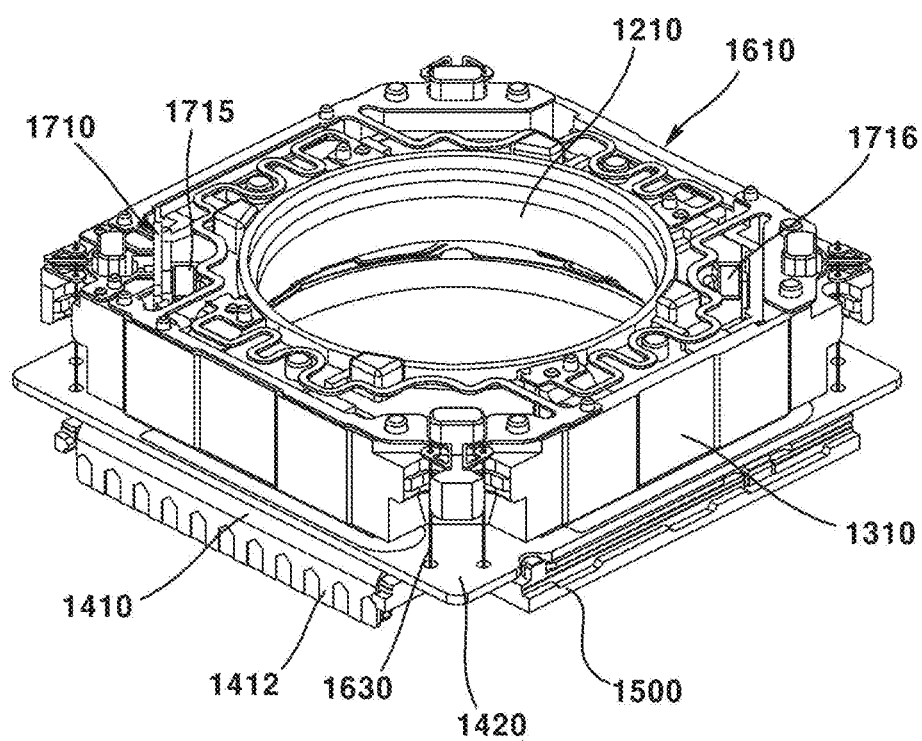
FIG. 9 is a perspective view illustrating a state in which a cover member is removed from a lens driving apparatus according to a second exemplary embodiment of the present invention.
Figure 10:
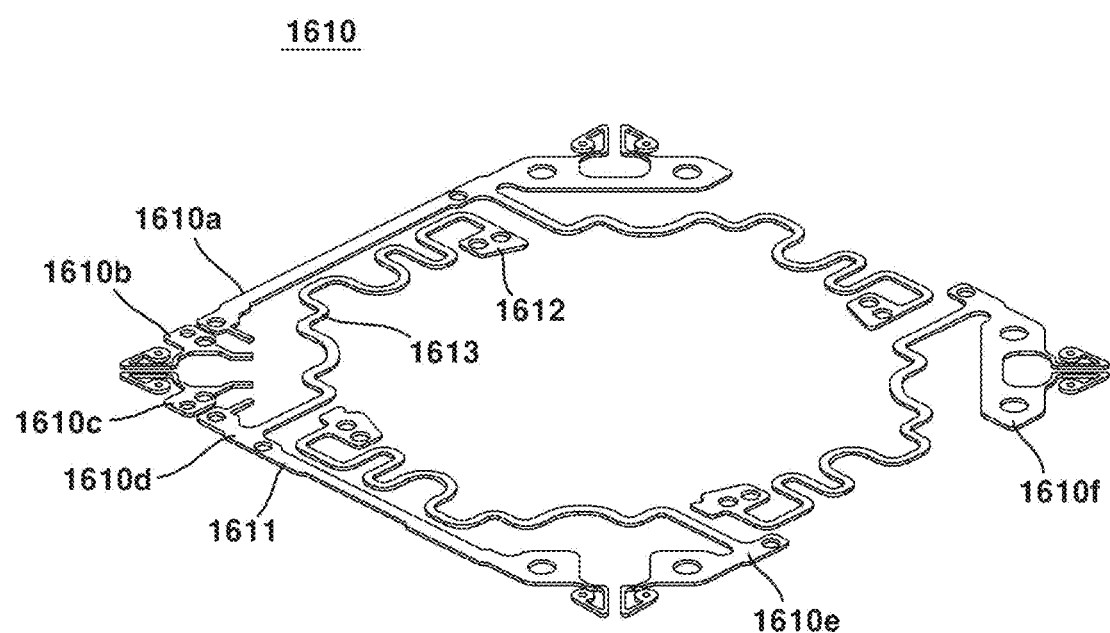
FIG. 10 is a perspective view illustrating an upper support member of a lens driving apparatus according to a second exemplary embodiment of the present invention.
Figure 11:
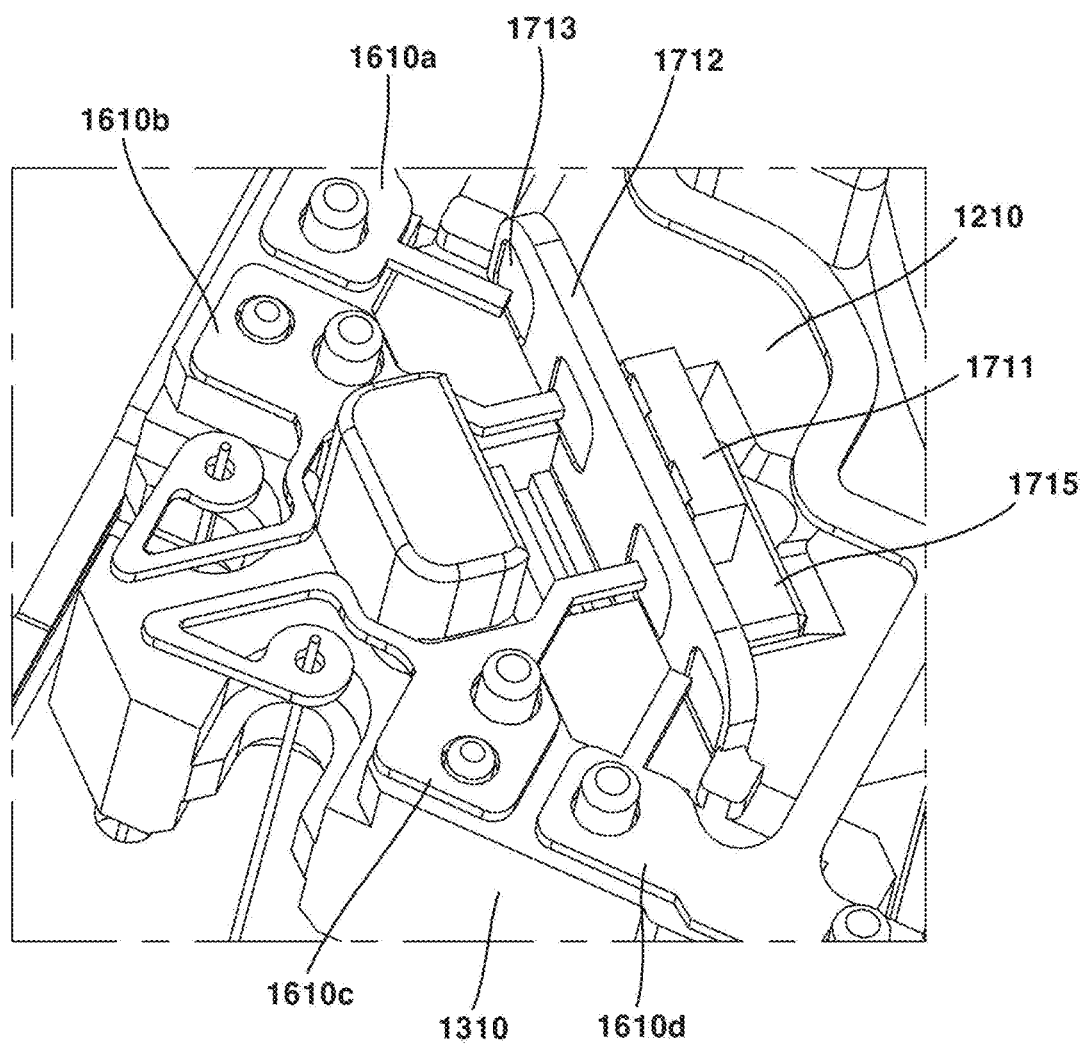
FIG. 11 is a partially expanded view of a state in which a cover member is removed from a lens driving apparatus according to a second exemplary embodiment of the present invention.
Figure 12:
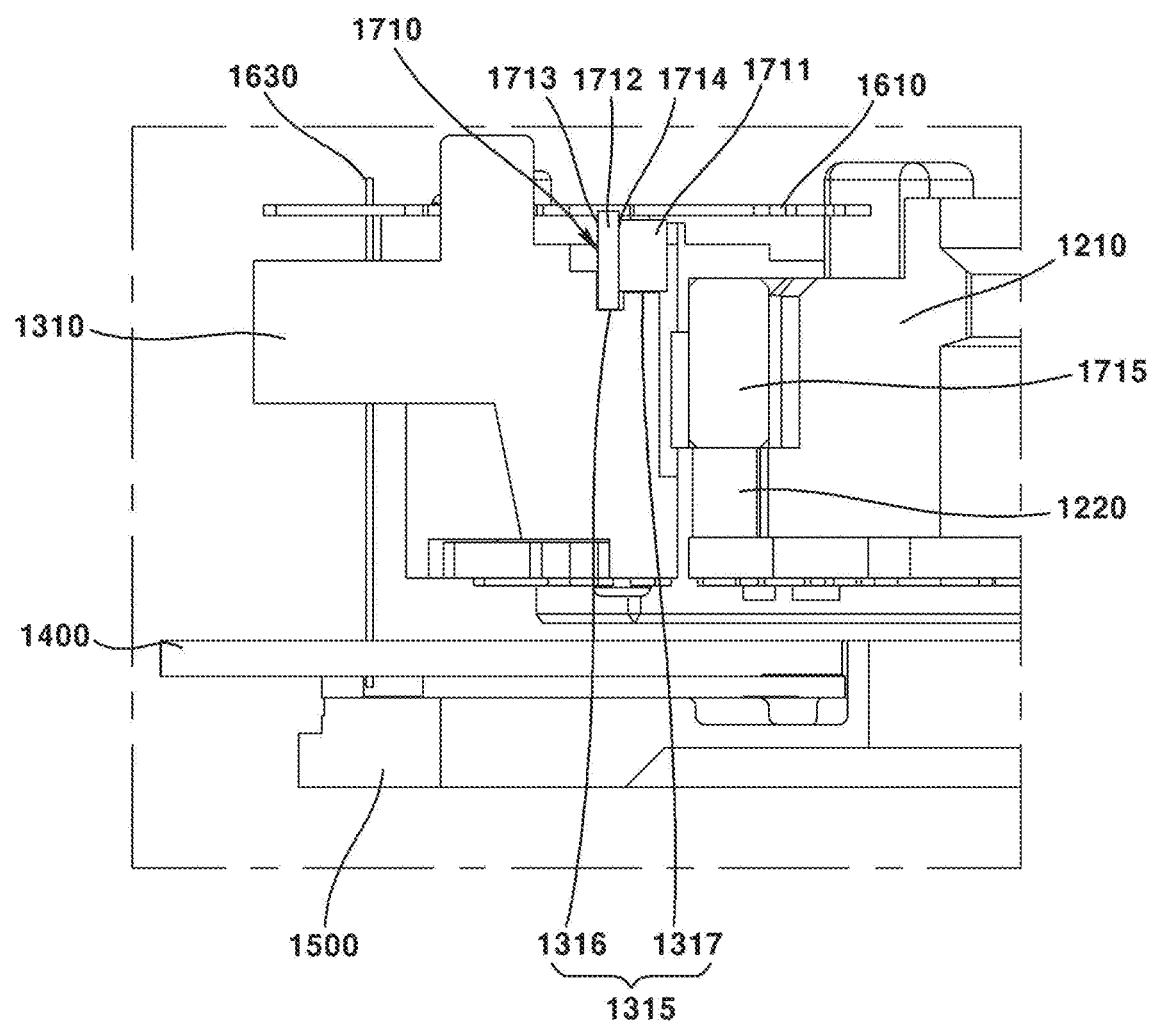
FIG. 12 is a partial cross-sectional view illustrating a state in which a cover member is removed from a lens driving apparatus according to a second exemplary embodiment of the present invention.
Figure 13A:
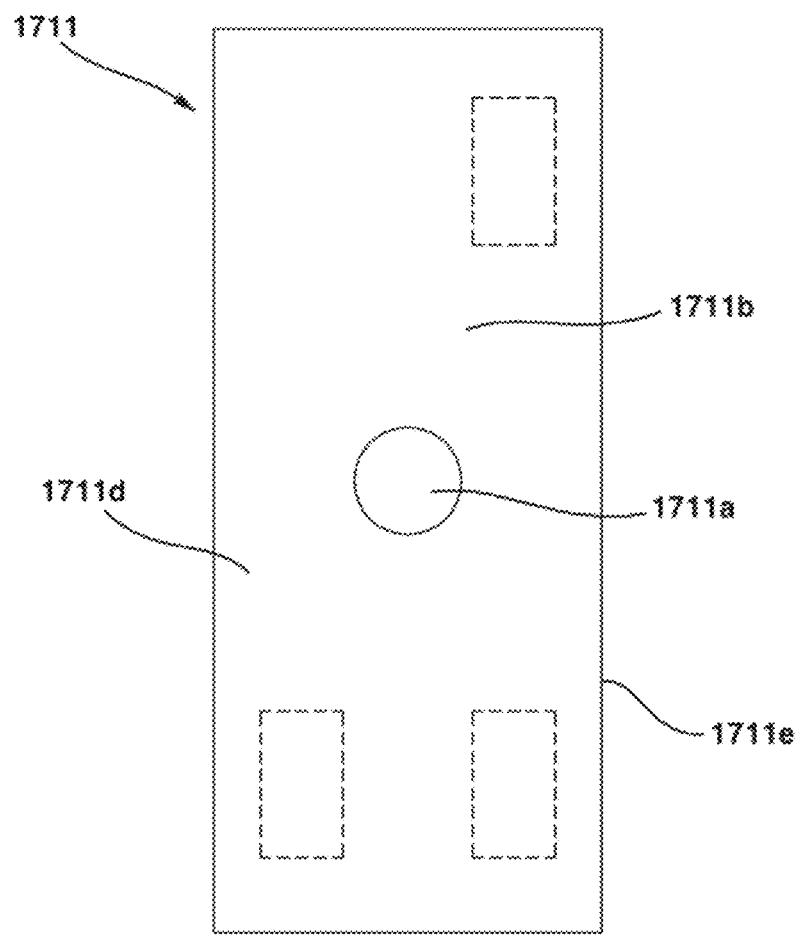
FIG. 13(a) is a plane view of a first sensor in a lens driving apparatus according to a second exemplary embodiment of the present invention.
Figure 13B:
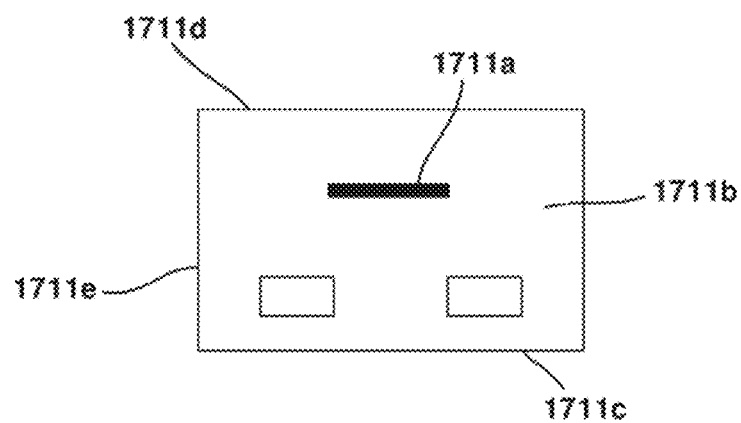
FIG. 13(b) is a lateral view of a first sensor.

FIG. 7 is a perspective view illustrating a lens driving apparatus according to a second exemplary embodiment of the present invention, FIG. 8 is an exploded perspective view illustrating a lens driving apparatus according to a second exemplary embodiment of the present invention, FIG. 9 is a perspective view illustrating a state in which a cover member is removed from a lens driving apparatus according to a second exemplary embodiment of the present invention, FIG. 10 is a perspective view illustrating an upper support member of a lens driving apparatus according to a second exemplary embodiment of the present invention, FIG. 11 is a partially expanded view of a state in which a cover member is removed from a lens driving apparatus according to a second exemplary embodiment of the present invention, FIG. 12 is a partial cross-sectional view illustrating a state in which a cover member is removed from a lens driving apparatus according to a second exemplary embodiment of the present invention, and FIG. 13(a) is a plane view of a first sensor in a lens driving apparatus according to a second exemplary embodiment of the present invention, and FIG. 13(b) is a lateral view of a first sensor.

Referring to FIGS. 7 to 13(b), the lens driving apparatus (1000) according to the exemplary embodiment of the present invention may include a cover member (1100), a first mover (1200), a second mover (1300), a stator (1400), a base (1500), a support member (1600) and a sensor portion (1700).

However, the lens driving apparatus (1000) according to the exemplary embodiment of the present invention may be omitted of any one of a cover member (1100), a first mover (1200), a second mover (1300), a stator (1400), a base (1500), a support member (1600) and a sensor portion (1700). Particularly, the sensor portion (1700) may be omitted as a configuration for AF feedback function and/or OIS feedback function.

The cover member (1000) may form an exterior look of lens driving apparatus (1000). The cover member (1100) may take a lower-opened cubic shape. However, the present invention is not limited thereto. The cover member (1100) may be formed with a metal material, for example. To be more specific, the cover member (1100) may be formed with a metal plate. In this case, the cover member (1100) can shield an EMI (Electromagnetic Interference). This characteristic of cover member (1100) may be called an EMI shield can. The cover member (1100) may inhibit radio wave generated from outside of the lens driving apparatus (1100) from entering an inside of the cover member (1100). Furthermore, the cover member (1100) may inhibit the radio wave generated from inside of the cover member (1100) from outputting to an outside of the cover member (1100). However, the material of cover member (1100) is not limited thereto.

The cover member (110) may include an upper plate (1101) and a lateral plate (1102). The cover member (1100) may include an upper plate (1101) and a lateral plate (1102) extended downwards from an external side of the upper plate (1101). A lower end of the lateral plate (1102) at the cover member (1100) may be mounted on the base (1500). The cover member (1100) may be mounted on the base (1500) by allowing an inner surface to be adhered with a portion or an entire portion of the base (1500). An inner space formed by the cover member (1100) and the base (1500) may be disposed with a first mover (1200), the second mover (1300), the stator (1400) and the support member (1600). Through this configuration, the cover member (1100) may have functions of protecting inner elements from external shocks and inhibiting foreign pollution materials from entering the cover member (1100) as well. The cover member (1100) is not limited thereto, and a lower end of the lateral plate (1102) at the cover member (1100) may be directly coupled to a PCB disposed at a lower side of the base (1500).

The cover member (1100) may include an opening (1110) exposing the lens module by being formed at an upper plate (1101). The opening (1110) may be formed in a shape corresponding to that of the lens module. The size of opening (1110) may be formed greater than that of a diameter of the lens module in order to allow the lens module to be assembled through the opening (1110). Meantime, a light introduced through the opening (1110) may pass through the lens module. At this time, the light having passed the lens module may be obtained as an image at the image sensor.

The first mover (1200) may be coupled to a lens module, one of the constitutional elements of camera module {however, the lens module may be explained as one of the elements for the lens driving apparatus (1000)}. The first mover (1200) may accommodate the lens module at an inside thereof. In other words, an inner circumferential surface of the first mover (1200) may be coupled by an outer circumferential surface of the lens module. Meantime, the first mover (1200) may move integrally with the lens module through an interaction with the second mover (1300) and/or the stator (1400). That is, the first mover (1200) can move along with the lens module.

The first mover (1200) may include a bobbin (1210) and a first driving portion (1220). The first mover (1200) may include a bobbin (1210) coupled with the lens module. The first mover (1200) may be disposed at the bobbin (1210) to include the first driving portion (1220) moved by electromagnetic interaction with the second driving portion (1320).

The bobbin (1210) may be coupled to the lens module. To be more specific, an inner circumferential surface of the bobbin (1210) may be coupled by an outer circumferential surface of the lens module. Meanwhile, the bobbin (1210) may be coupled by the first driving portion (1220). Furthermore, a lower surface of bobbin (1210) may be coupled to a lower support member (1620) and an upper surface of the bobbin (1210) may be coupled to an upper surface of an upper support member (1610). The bobbin (1210) may be disposed at an inside of the housing (1310). The bobbin (1210) may be moved to an optical axis direction relative to the housing (1310).

The bobbin (1210) may include a lens coupling portion (1211), a first driving coupling portion (1212), an upper coupling portion (1213) and a lower coupling portion (not shown).

The bobbin (1210) may include a lens coupling portion (1211) formed at an inside thereof. The lens coupling portion (1211) may be coupled by the lens module. An inner circumferential surface of the lens coupling portion (1211) may formed with a screw thread in a shape corresponding to that of a screw thread formed at an outer circumferential surface of the lens module. That is, the lens module may be screw-connected to the lens coupling portion (1211). Meantime, an adhesive may be interposed between the lens module and the bobbin (1210). At this time, the adhesive may be an UV curing epoxy. That is, the bobbin (1210) may be adhered by an UV curing epoxy and/or a heat curing epoxy.

The bobbin (1210) may include a first driving coupling portion (1212) wound by or installed with the first driving portion (1220). The first driving coupling portion (1212) may be integrally formed with an external lateral surface of the bobbin (1210). Furthermore, the first driving coupling portion (1212) may be continuously formed along with the external lateral surface of the bobbin (1210) or may be spaced apart at a predetermined distance. For example, the first driving coupling portion (1212) may be formed by a portion of the external lateral surface of the bobbin (1210) being recessed to correspond to a shape of the first driving portion (1220). At this time, the coil of the first driving portion (1220) may be directly wound on the first driving coupling portion (1212). As a modification, the first driving coupling portion (1212) may be formed with an upper side or a lower side being opened. At this time, the coil of the first driving portion (1220) may be inserted and coupled to the first driving coupling portion (1212) through the opened portion while the coil is in a pre-wound state.

The bobbin (1210) may include an upper coupling portion (1213) coupled with the upper support member (1610). The upper coupling portion (1213) may be coupled to an inner lateral portion (1612) of the upper support member (1610). For example, a lug (not shown) of the upper coupling portion (1213) may be coupled by being inserted into a groove or a hole (not shown) at the inner lateral portion (1612). Meantime, the lug of the upper coupling portion (1213) may fix the upper support member (1610) while being heat-fused in a state of being inserted into a hole of the inner lateral portion (1612).

The bobbin (1210) may include a lower coupling portion (not shown) coupled to the lower support member (1620). The lower coupling portion may be coupled to an inner lateral portion (1622) of the lower support member (1620). For example, a lug (not shown) of the lower coupling portion may be coupled by being inserted into a groove of the inner lateral portion (1622) or a hole (not shown). At this time, the lug at the lower coupling portion may be heat-fused in a state of being inserted into the hole of the inner lateral portion (1622) to fix the lower support member (1620).

The first driving portion (1220) may be disposed at the bobbin (1210). The first driving portion (1220) may be disposed at a position in opposition to the second driving portion (1320). The first driving portion (1220) may move the bobbin (1210) relative to the housing (1310) through an electromagnetic interaction with the second driving portion (1320). The first driving portion (1220) may include a coil.

At this time, the first driving portion (1220) may be called a "first coil" in order to be distinguished from other elements formed with coils. The first coil may be wound on an external surface of the bobbin (1210) by being guided to the first driving coupling portion (1212). Furthermore, in another exemplary embodiment, the first coil (1220) may be disposed at the external lateral surface of the bobbin (1210) by allowing four coils to be independently disposed to form a 90° between adjacent two coils.

The first coil may include a pair of lead cables (not shown) for power supply. In this case, each pair of first coil may be electrically coupled to fifth and sixth upper support members (16105, 6106) which are dividing elements of the upper support member (1610). That is, the first coil may receive electricity through the upper support member (1610). Alternatively, the first coil may receive electricity through the lower support member (1620). Meantime, when the electricity is supplied to the first coil, an electromagnetic field may be formed about the first coil. In a modification, the first driving portion (1220) may include a magnet. At this time, the second driving portion (1320) may include a coil.

The second mover (1300) may move for implementation of OIS function. The second mover (1300) may be disposed at an outside of the first mover (1200) opposite to the first mover (1200) to move the first mover (1200) or move along with the first mover (1200). The second mover (1300) may be movably supported by the stator (1400) and/or the base (1500) disposed at a lower side thereof. The second mover (1300) may be disposed at an inner space of the cover member (1100). The second mover (1300) may include a housing (1310) and a second driving portion (1320). The second mover (1300) may include a housing (1310) disposed at an outside of the bobbin (1210). Furthermore, the second mover (1300) may include a second driving portion (1320) disposed opposite to the first driving portion (1220) to be fixed to the housing (1310).

At least a portion of the housing (1310) may be formed in a shape corresponding to that of an inner surface of the cover member (1100). Particularly, an outside of the housing (1310) may be formed in a shape corresponding to that of an inner surface of the lateral plate (1102) of the cover member (1100). The housing (1310) may take a shape of a cube including four lateral surfaces, for example. However, the shape of housing (1310) may take any shape as long as the housing (1310) can be arranged inside the cover member (1100).

The housing (1310) may be formed with an insulation material, and may be formed in an injection-molded article in consideration of productivity. The housing (1310) is a part moving for OIS function driving, and may be arranged by being spaced apart from the cover member (1100) at a predetermined distance.

However, the housing (1310) may be fixed to the base (1500) in an AF model. Alternatively, the housing (1310) may be omitted in the AF model and a magnet of the second driving portion (1320) may be fixed to the cover member (1100). An upper surface of the housing (1310) may be coupled by the upper support member (1610) and a lower surface of the housing (1310) may be coupled by the lower support member (1620).

The housing (1310) may include an inner space (1311), a second driving coupling portion (1312), an upper coupling portion (1313), a lower coupling portion (not shown) and a sensor accommodating portion (1315). The housing (1310) may be opened at an upper side and a lower side to allow the first mover (1200) to be movably accommodated to a vertical direction. The housing (1310) may be formed at an inner side with an upper/lower opened inner space (1311). The inner space (1311) may be movably disposed with a bobbin (1210). That is, the inner space (1311) may be formed in a shape corresponding to that of the bobbin (1210). Furthermore, an inner circumferential surface of the housing (1310) forming the inner space (1311) may be discretely formed from an outer circumferential surface of the bobbin (1210).

The housing (310) may be formed at a lateral surface with a second driving coupling portion (1312) formed in a shape corresponding to that of the second driving portion (1320) to accommodate the second driving portion (1320). That is, the second driving coupling portion (1312) may fix the second driving portion (1320) by accommodating the second driving portion (1320). The second driving portion (1320) may be fixed by an adhesive (not shown) to the second driving coupling portion (1312). Meantime, the second driving coupling portion (1312) may be disposed at an inner circumferential surface of the housing (1310). In this case, there is an advantageous effect for an electromagnetic interaction with the first driving portion (1220) disposed at an inside of the second driving portion (1320). Furthermore, the second driving coupling portion (1312) may take a lower-opened shape, for example. In this case, there is an advantageous strength for an electromagnetic interaction between the third driving portion (1420) disposed at a lower side of the third driving portion (1420) and the second driving portion (1320). The second driving coupling portion (1312) may be formed in four pieces, for example. Each of the second driving coupling portion (1312) may be coupled by each of the second driving portions (1320).

The housing (1310) may include an upper coupling portion (1313) coupled with the upper support member (1610). The upper coupling portion (1313) may be coupled to an external circumferential portion (1611) of the upper support member (1610). For example, a lug of the upper coupling portion (1313) may be inserted into and coupled to a groove or a hole (not shown) of the external circumferential surface (1611). At this time, the lug of the upper coupling portion (1313) may be heat-fused in a state of being inserted into a hole of the external circumferential surface (1611) to fix the upper support member (1610).

The housing (1310) may include a lower coupling portion (not shown) coupled to the lower support member (1620). The lower coupling portion may be coupled to an external portion (1621) of the lower support member (1620). For example, a lug of the lower coupling portion may be coupled by being inserted into a groove or a hole of the external portion (1621). At this time, the lug of the lower coupling portion may be heat-fused in a state of being inserted into a hole of the external portion (1621) to fix the lower support member (1620).

The housing (1310) may include a sensor accommodation portion (1315). The sensor accommodation portion (1315) may be disposed at an upper surface of the housing (1310). The sensor accommodation portion (1315) may be accommodated with a substrate (1712) first sensor (1711) of the first sensor portion (1710). The sensor accommodation portion (1315) may include a substrate support portion (1316) and a sensor support portion (1317). The sensor accommodation portion (1315) may include a substrate support portion (1316) supporting a lower surface of a substrate (1712) and a sensor support portion (1317) supporting a lower surface of the first sensor (1711). At this time, the substrate support portion (1316) and the sensor support portion (1317) may be connected at a staircase manner. Through this configuration, the housing (1310) can fix and support the substrate (1712) and the first sensor (1711) in a state of being mounted on the substrate (1712).

The second driving portion (1320) may be disposed in opposition to the first driving portion (1220). The second driving portion (1320) may move the first driving portion (1220) through an electromagnetic interaction with the first driving portion (1220). The second driving portion (1320) may include a magnet. At this time, the second driving portion (1320) may be called a "driving magnet" for driving a magnet. Furthermore, the second driving portion (1320) may be called a "third magnet" in order to be distinguished from a sensing magnet (1715, described later) and a compensation magnet (1716).

The third magnet may be fixed to the second driving coupling portion (1312) of the housing (1310). The second driving portion (1320) may be disposed at the housing (1310) in such a fashion that four magnets are independently formed, and two adjacent magnets form a right angle of 90°, for example, as illustrated in FIG. 8. That is, the second driving portion (1320) can promote an efficient use of inner volume by being installed on four lateral surfaces of the housing (1310), each at a predetermined interval. Furthermore, the second driving portion (1320) may be attached to the housing (1310) using an adhesive. However, the present invention is not limited thereto. Meantime, as explained in the foregoing discussion, the first driving portion (1220) may include a magnet, and the second driving portion (1320) may include a coil.

A stator (1400) may be disposed opposite to a lower side of the second mover (1300). The stator (1400) may movably support the second mover (1300). The stator (1400) may move the second mover (1300). At this time, the first mover (1200) may be also moved along with the second mover (1300). Furthermore, the stator (1400) may be disposed at a center with through holes (1411, 1412) corresponding to the lens module. The stator (1400) may include a circuit substrate (1410) and a third driving portion (1420), for example. The stator (1400) may include a circuit substrate (1410) interposed between the third driving portion (1420) and the base (1500). Furthermore, the stator (1400) may include a third driving portion (1420) at a position opposite to a lower side of the second driving portion (1320).

The circuit substrate (1410) may include a flexible circuit substrate, which is an FPCB. The circuit substrate (1410) may be interposed between the third driving portion (1420) and the base (1500). The circuit substrate (1410) can supply electricity to the third driving portion (1420). The circuit substrate (1410) can supply electricity to the first driving portion (1220) or to the second driving portion (1320). For example, the circuit substrate (1410) can supply electricity to a first coil through a lateral support member (1630) and an upper support member (1610). Furthermore, the circuit substrate (1410) can supply electricity to a substrate (1712) of the first sensor portion (1710) through the lateral support member (1630) and the upper support member (1610). The power supplied to the substrate (1712) may be used for driving of a first sensor (1711).

The circuit substrate (1410) may include a through hole (1411) and a terminal portion (1412), for example. The circuit substrate (1410) may include a through hole (1411) that allows passing a light having passed the lens module. The circuit substrate (1410) may include a terminal portion (1412) exposed to outside by being downwardly bent. At least one portion of the terminal portion (1412) may be exposed to outside to be connected to an outside power through which electricity is supplied to the circuit substrate (1410).

The third driving portion (1420) may move the second driving portion (1320) through electromagnetic interaction. The third driving portion (1420) may include a coil. At this time, the third driving portion (1420) may be called a "second coil" in order to be distinguished from the first coil. The second coil (1420) may be disposed at the circuit substrate (1410). The second coil (1420) may be formed opposite to the third magnet (1320). When a power is applied to the second coil, the second driving portion (1320) and the housing (1310) fixed with the second driving portion (1320) may integrally move through interaction between the second coil and the second driving portion (1320).

The second coil (1420) may be an FP (Fine Pattern) coil mounted on the circuit substrate (1410). In this case, there may be an effect in the aspect of miniaturization of the lens driving apparatus (1000, to reduce a height to a z axis direction which is an optical axis direction). The second coil (1420) may be so formed as to minimize interference with the lower-side positioned second sensor portion (1720). The second coil may be so formed as not to overlap with the second sensor portion (1720) to a vertical direction.

The third driving portion (1420) may include a through hole (1421) that allows passing a light having passed the lens module. The through hole (1421) may have a diameter corresponding to that of the lens module. The through hole (1421) of the third driving portion (1420) may have a diameter corresponding to that of the through hole (1411) at the circuit substrate (1410). The through hole (1421) of the third driving portion (1420) may have a diameter corresponding to that of a through hole (1510) at the base (1500). The through hole (1421) may be round, for example. However, the present invention is not limited thereto.

The base (1500) may support the second mover (1300). The base (1500) may be disposed at a lower side with a PCB. The base (1500) may function as a sensor holder protecting an image sensor mounted on the PCB. The base (1500) may include a through hole (1510), a foreign object collection portion (1520) and a sensor mounting portion (1530). The base (1500) may include a through hole (1510) formed at a position corresponding to that of the lens coupling portion (1211). Meantime, the through hole (1510) of the base (1500) may be coupled by an infrared ray filter. However, an infrared ray filter may be coupled to a separate sensor holder arranged at a lower surface of the base (1500).

The base (1500) may include a foreign object collection portion (1520) collecting foreign objects introduced into the cover member (1100). The foreign object collection portion (1520) may be disposed at an upper surface of the base, may include an adhesive material and may collect foreign objects in an inner space formed by the cover member (1100) and the base (1500).

The base (1500) may include a sensor mounting portion (1530) coupled by the second sensor portion (1720). That is, the second sensor portion (1720) may be mounted on the sensor mounting portion (1530). At this time, the second sensor portion (1720) may detect the second driving portion (1320) coupled to the housing (1310) to detect a horizontal movement or a tilt of the housing (1310). The sensor mounting portion (1530) may be provided in two pieces, for example. Each of the two pieced sensor mounting portion (1530) may be disposed with the second sensor portion (1720). In this case, the second sensor portion (1720) may be so arranged as to detect both the x-axis and y-axis direction movements of the housing (1310).

The support member (1600) may connect two or more elements from a first mover (1200), a second mover (1300), a stator (1400) and a base (1500). The support member (1600) may elastically connect two or more elements from a first mover (1200), a second mover (1300), a stator (1400) and a base (1500) to enable a relative movement between each element. The support member (1600) may be formed with an elastic member.

The support member (1600) may include an upper support member (1610), a lower support member (1620) and a lateral support member (1630). The upper support member (1610) may connect an external portion (1611), an internal portion (1612) and a connection portion (1613), for example. The upper support member (1610) may include an external portion (1611) coupled to the housing (1310), an internal portion (1612) coupled to the bobbin (1210) and a connection portion (1613) elastically connecting the external portion (1611) and the internal portion (1612).

The upper support member (1610) may be connected to an upper surface of the first mover (1200) and an upper surface of the second mover (1300). To be more specific, the upper support member (1610) may be connected to an upper surface of the bobbin (1210) and an upper surface of the housing (1310). The internal portion (1612) of the upper support member (1610) may be coupled to an upper coupling portion (1213) of bobbin (1210), and the external portion (1611) of the upper support member (1610) may be coupled to an upper coupling portion (1313) of housing (1310).

The upper support member (1610) may be divided to six (6) pieces, for example. At this time, four (4) out of six upper support members (1610) may be electrically conducted with the first sensor portion (1710), and the remaining two may be electrically conducted to the first coil. In other words, the upper support member (1610) may include first to sixth upper support members (1610*a*, 1610*b*, 1610*c*, 1610*d*, 1619*e*, 1610*f*), each spaced apart from the other. At this time, the first to sixth upper support members (1610*a*, 1610*b*, 1610*c*, 1610*d*, 1619*e*, 1610*f*) may be electrically connected to a substrate (1712). Furthermore, the fifth and sixth upper support members (1610*e*, 1610*f*) may be electrically connected to the first coil. The first to fourth upper support members (1610*a*, 1610*b*, 1619*c*, 1610*d*) may supply electricity to the first sensor portion (1710), and may be used for transmission/receipt of information or signals between the controller and the first sensor portion (1710). The fifth and sixth upper support members (1610*e*, 1610*f*) may be used for supplying electricity to the first coil.

The lower support member (1620) may include an external portion (1621), an internal portion (1622) and a connection portion (1623). The lower support member (1620) may include an external portion (1621) coupled to the housing (1310), an internal portion (1622) coupled to the bobbin (1210) and a connection portion (1623) elastically connecting the external portion (1621) and the internal portion (1622).

The lower support member (1620) may be connected to a lower surface of the first mover (1200) and a lower surface of the second mover (1300). To be more specific, the lower support member (1620) may be connected to a lower surface of the bobbin (1210) and a lower surface of the housing (1310). The internal portion (1622) of the lower support member (1620) may be coupled by a lower coupling portion of bobbin (1210), and the external portion (1621) of the lower support member (1620) may be coupled by a lower coupling portion of housing (1310).

The lower support member (1620) may be integrally formed, for example. However, the present invention is not limited thereto. In a modification, the lower support member (1620) may be divided to a pair to be used for supplying of electricity to the first coil.

The lateral support member (1630) may be coupled at one side to the stator (1400) and/or base (1500), and may be coupled at the other side to the upper support member (1610) and/or housing (1310). The lateral support member (1630) may be coupled at one side to the stator (1400), and may be coupled at the other side to the upper support member (1610). Furthermore, as another exemplary embodiment, the lateral support member (1630) may be coupled at one side to the base (1500), and may be coupled at the other side to the housing (1310). Through this configuration, the lateral support member (1630) may elastically support the second mover (1300) to allow the second mover (1300) to horizontally move or tilt. The lateral support member (1630) may include a plurality of wires, for example. Alternatively, the lateral support member (1630) may include a plurality of leaf springs.

The lateral support member (1630) may be electrically connected at a distal end of one side to the circuit substrate (1410), and may be electrically connected at a distal end of the other side to the upper support member (1610). The lateral support member (1630) may be formed in the same number as that of the upper support member (1610), for example. That is, the lateral support member (1630) may be formed in six (6) pieces to be respectively connected to the upper support member (1610), which is also formed in six pieces. In this case, the lateral support member (1630) may supply electricity supplied from the stator (1400) or an outside to each of the upper support members (1610). The number of lateral support member (1630) may be determined in consideration of symmetry, for example. The lateral support member (1630) may be provided in a total number of eight (8), two each for each corner of the housing (1310), for example. The lateral support member (1630) may include mutually-spaced-apart first to eight lateral support members.

The first lateral support member may be electrically connected to the first upper support member (1610*a*), the second lateral support member may be electrically connected to the second upper support member (1610*b*), the third lateral support member may be electrically connected to the third upper support member (1610*c*), the fourth lateral support member may be electrically connected to the fourth upper support member (1610*d*), the fifth lateral support member may be electrically connected to the fifth upper support member (1610*d*), and the sixth lateral support member may be electrically connected to the sixth upper support member (1610*f*).

The lateral support member (1630) or the upper support member (1610) may include a shock absorber (not shown) for absorbing shocks, for example. The shock absorber may be formed at any one of the lateral support member (1630) and the upper support member (1610). The shock absorber may be a separate member such as a damper. Furthermore, the shock absorber may be also realized through a shape change to one or more portions of the lateral support member (1630) and the upper support member (1610).

The sensor portion (1700) may be used for any one or more of the AF feedback and the OIS feedback. The sensor portion (1700) may detect a position or movement of any one of the first mover (1200) and the second mover (1300). The sensor portion (1700) may include a first sensor portion (1710) and a second sensor portion (1720), for example. The first sensor portion (1710) may sense a relative vertical movement of the bobbin (1210) to the housing (1310) and provide information for AF feedback. The second sensor portion (1720) may provide information for OIS feedback by detecting the horizontal movement or tilt of the second mover (1300).

The first sensor portion (1710) may include a first sensor (1711), a substrate (1712) and a sensing magnet (1715). The first sensor (1711) may be disposed at the housing (1310). The first sensor (1711) may be disposed at an upper surface of housing (1310). At this time, the sensing magnet (1715) may be disposed at an upper surface of bobbin (1210). Meantime, the first driving portion (1220) may be disposed at a lower surface of bobbin (1210). That is, the first sensor (1711) in the lens driving apparatus (1000) according to an exemplary embodiment of the present invention may be relatively adjacent to the sensing magnet (1715) and may be further distanced from the first driving portion (1220).

The first sensor (1711) may be mounted on the substrate (1712). The first sensor (1711) may be disposed at the housing (1310) while being in a state of being mounted on the substrate (1712). The first sensor (1711) may be supported by a sensor support portion (1317) formed at an upper surface of the housing (1310). The first sensor (1711) may detect a position or movement of the bobbin (1210). The first sensor (1711) may detect the position or movement of bobbin (1210) by detecting the sensing magnet (1715) arranged at the bobbin (1210), for example.

The first sensor (1711) may be a Hall sensor detecting a magnetic force of the magnet, for example. However, the present invention is not limited thereto. The first sensor (1711) may include a sensing portion (1711a) sensing a magnetic field of the sensing magnet (1712) and a case (1711b) accommodating the sensing portion (1711a) at an inside thereof. The case (171b) may take a cubic shape, for example. However, the present invention is not limited thereto. The case (1711b) may include a first surface (1711c) mounted on the substrate (1712), a second surface (1711d) opposite to the first surface (1711c), and a third surface (1711e) connecting a corner of the first surface (1711c) and a corner of the second surface (1711d).

A distance between the sensing portion (1711a) and the second surface (1711d) may be shorter than a distance between the sensing portion (1711a) and the third surface (1711e). A distance between the sensing portion (1711a) and the second surface (1711d) may be shorter than a distance between the sensing portion (1711a) and the first surface (1711c). A distance between the sensing portion (1711a) and the second surface (1711d) may be 90 µm~110 µm. A distance between the sensing portion (1711a) and the third surface (1711e) may be 240 µm~260 µm.

The substrate (1712) may be mounted with the first sensor (1711). The substrate (1712) may be disposed at the housing (1310). The substrate (1712) may be supported by a substrate support portion (1316A) formed at an upper surface of the housing (1310). The substrate (1712) may be in contact at a lower surface with the substrate support portion (1316). The substrate (1712) may be electrically conductive with the upper support member (1610). Through this configuration, the substrate (1712) may supply the electricity and transmit/receive information or signals from the controller.

The substrate (1712) may include a terminal portion (1713) and a mounting surface (1714). The mounting surface (1714) may be disposed at a side opposite to a surface formed with the terminal portion (1713). The terminal portion (1713) may be electrically connected to the upper support member (1610). To be more specific, four (4) terminals of the terminal portion (1713) may be formed with the first to four upper support members (1610a, 1610b, 1610c, 1610d), each formed in a pair for electrical conduction. The mounting surface (1714) may be mounted with the first sensor (1711). The mounting surface (1714) may be so disposed as to face the sensing magnet (first magnet, 1715) in the lens driving apparatus (1000) according to an exemplary embodiment of the present invention. The mounting surface (1714) may be so disposed as to face inwardly. The mounting surface (1714) may be so disposed as to face a center side of the bobbin (1210). The substrate (1712) may be so disposed as to stand in an orthogonal manner. The first sensor (1711) may be disposed at a farther inner side than the substrate (1712).

The sensing magnet (1715) may be disposed at the bobbin (1210). At this time, the sensing magnet (1715) may be called a "first magnet". The lens driving apparatus (1000) according to an exemplary embodiment may further include a compensation magnet (1716) disposed at the bobbin (1210) and symmetrically disposed with the sensing magnet (1715) about a center of the bobbin (1210). The compensation magnet (1716) may be called a "second magnet" in order to be distinguished from the first magnet. The compensation magnet (1716) may be so disposed as to constitute a magnetic force balance with the sensing magnet (1715). That is, the compensation magnet (1716) may be so disposed as to solve the magnetic force unbalance generated by the sensing magnet (1715). The sensing magnet (1715) may be disposed at one side of the bobbin (1210) and the compensation magnet (1716) may be disposed at the other side of the bobbin (1210).

The second sensor portion (1720) may be disposed at the stator (1400). The second sensor portion (1720) may be disposed at an upper surface or a lower surface of the circuit substrate (1410). The second sensor portion (1720) may be arranged at a lower surface of the circuit substrate (1410) to be disposed at a sensor mounting portion (1530) formed on the base (1500), for example. The second sensor portion (1720) may include a Hall sensor, for example. In this case, the second sensor portion (1720) may sense a relative movement of the second mover (1300) relative to the stator (1400) by sensing a magnetic field of the second driving portion (1320). The second sensor portion (1720) may be formed in more than two pieces to detect x axis and y axis movements of the second mover (1300). The second sensor portion (1720) may be so disposed as not to vertically overlap with the FP coil of the third driving portion (1420).

Hereinafter, operation of camera module according to an exemplary embodiment of the present invention will be described with reference to accompany drawings.

First, AF function of the camera module according to an exemplary embodiment will be explained.

When a power is supplied to a coil of the first driving portion (1220), the first driving portion (1220) may perform a movement relative to the second driving portion (1320) by the electromagnetic interaction between the magnet of the first driving portion (1220) and the magnet of the second driving portion (1320). At this time, the bobbin (1210) coupled with the first driving portion (1220) may integrally move with the first driving portion (1220). That is, the bobbin (1210) coupled at an inside with the lens module may vertically move relative to the housing (1310). This movement of bobbin (1210) may result in the lens module moving closer or being distanced from the image sensor, whereby a focus adjustment to an object can be performed by supplying a power to the coil of the first driving portion (1220) according to the exemplary embodiment of the present invention.

Meanwhile, an AF feedback may be applied in order to implement a more accurate realization of the auto focus function in the camera module according to the exemplary embodiment of the present invention.

The first sensor (1711) formed in the form of Hall sensor by being disposed at the housing (1310) may detect a magnetic field of the sensing magnet fixed to the bobbin (1210). Hence, when the bobbin (1210) performs a relative movement to the housing (1310), an amount of magnetic field detected by the first sensor (1711) may be changed. The first sensor (1711) may detect a movement to z axis direction of the bobbin (1210) or a position of the bobbin (1210) using the abovementioned method and transmit a detected value to the controller. The controller may determine whether to perform an additional movement to the bobbin (1210) using the received detected value. This process is generated in real time, such that the AF function of the camera module according to the exemplary embodiment of the present invention can be more accurately implemented through the AF feedback.

Now, a handshake correction function, i.e., "OIS (Optical Image Stabilization)" of camera module according to an exemplary embodiment of the present invention will be described When electricity is supplied to a coil of the third driving portion (1420), the second driving portion (1320) may perform a movement to the third driving portion (1420) in response to electromagnetic interaction between the second driving portion (1320) and the third driving portion (1420).

At this time, the housing (1310) coupled by the second driving portion (1320) may integrally move with the second driving portion (1320). That is, the housing (1310) may horizontally move relative to the base (1500). Meanwhile, at this time the housing (1310) may be induced with a tilt relative to the base (1500). At this time, the bobbin (1210) may also integrally move along with the housing (1310). Thus, the said movement of housing (1310) may result in the lens module moving to a direction parallel with a direction of image sensor relative to the image sensor, whereby the OIS function can be implemented by supplying electricity to the coil at the third driving portion (1420).

Meantime, the OIS feedback may be applied in order to more accurately realize the OIS function of the camera module.

A pair of second sensor portions (1720) mounted on the base (1500) and formed in a Hall sensor may detect a magnetic field of a magnet at the second driving portion (1320) fixed at the housing (1310). Thus, when the housing (1310) performs a relative movement to the base (1500), the amount of magnetic field detected by the second sensor portion (1720) may be changed. The pair of second sensor portions (1720) may detect the amount of movement or the position of horizontal direction (x axis and y axis) at the housing (1310) by this method and transmit the detected value to the controller. The controller may determine whether to perform an additional movement relative to the housing (1310) through the received detected value. This process is generated in real time, such that the OIS function of camera module according to the exemplary embodiment of the present invention can be more accurately implemented through the OIS feedback.

Hereinafter, an effect of camera module according to a second exemplary embodiment will be described.

Figure 14A:
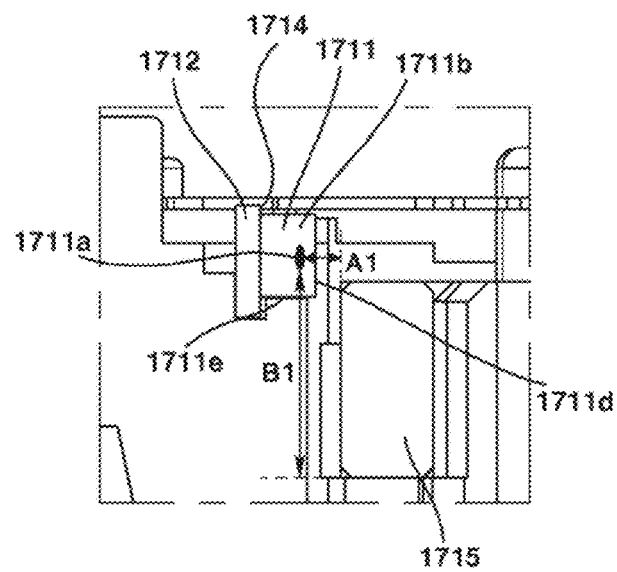
FIGS. 14(a) and 14(b) are illustrations to explain an effect of a lens driving apparatus according to a second exemplary embodiment of the present invention, where
Figure 14B:
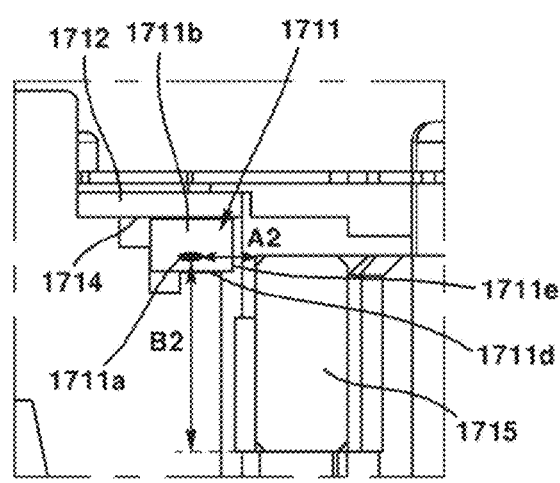

FIGS. 14(*a*) and 14(*b*) are illustrations to explain an effect of a lens driving apparatus according to a second exemplary embodiment of the present invention, where FIG. 14(*a*) is a partial cross-sectional view illustrating a lens driving apparatus according to a second exemplary embodiment of the present invention, and FIG. 14(*b*) is partial cross-sectional view of a lens driving apparatus according to a comparative example.

Referring to FIGS. 14(*a*) and 14(*b*), it can be noted that the substrate (1712) of the first sensor portion (1710) is arranged while being stood in the lens driving apparatus (1000) according to the exemplary embodiment of the present invention, and that the substrate (1712) of the first sensor portion (1710) is arranged while being laid down flat according to the lens driving apparatus (1000) in the comparative example. That is, the mounting surface (1714) of the substrate (1712) at the first sensor portion (1710) is arranged to face a sensing magnet (1715) side in the lens driving apparatus (1000) according to the exemplary embodiment, and the mounting surface (1714) of the substrate (1712) at the first sensor portion (1710) is arranged to face a lower side in the lens driving apparatus (1000) according to the comparative example.

Because of the difference in the arrangement shape of the substrate (1712) at the first sensor portion (1710), a horizontal distance (A1) between a sensing portion (1711*a*) and a sensing magnet (1751) in the exemplary embodiment of the present invention may be shorter than a horizontal distance (A1) between a sensing portion (1711*a*) and a sensing magnet (1751) in the comparative example.

Furthermore, a vertical distance (B1) between the sensing portion (1711*a*) and a first coil in the exemplary embodiment of the present invention may be greater than a vertical distance (B2) between the sensing portion (177*a*) and a first coil in the comparative example.

That is, the sensing portion (1711*a*) is more closely formed to the sensing magnet (1751) and the sensing portion (1711*a*) is more distanced from the first coil in the exemplary embodiment over the comparative example. Through this configuration, a Hall output detected by the sensing portion (1711*a*) can be more increased in the camera module according to the exemplary embodiment of the present invention than that of the comparative example. Furthermore, noise of the first coil detected by the sensing portion (1711*a*) can be minimized whereby the position of the bobbin (1210) arranged with the sensing magnet (1715) in the camera module according to the exemplary embodiment of the present invention can be more accurately sensed than the comparative example.

Hereinafter, configuration of optical apparatus according to a third exemplary embodiment of the present invention will be described.

The optical apparatus according to the third exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus according to the third exemplary embodiment of the present invention may include a main body (not shown), a display portion (not shown) arranged at one surface of the main body to display information, and a camera (not shown) having a camera module (not shown) disposed at the main body to photograph an image or a photograph.

Hereinafter, configuration of camera module according to a third exemplary embodiment of the present invention will be described.

The camera module may include a lens driving apparatus (not shown), a lens module (not shown), an infrared cut-off filter (not shown), a PCB (not shown), an image sensor (not shown) and a controller (not shown).

The lens module may include a lens and a lens barrel. The lens barrel may include one or more lenses (not shown) and a lens barrel accommodating one or more lenses. However, one element of the lens module is not limited by the lens barrel, and any holder structure capable of supporting one or more lenses will suffice. The lens module may be coupled to the lens driving apparatus to move along with the lens driving apparatus. The lens module may be coupled to an inner side of the lens driving apparatus, for example. The lens module may be screw-coupled or screw-connected with a lens driving apparatus, for example. The lens module may be coupled to the lens driving apparatus using an adhesive (not shown). Meantime, a light having passed the lens module may be irradiated on an image sensor.

The infrared cut-off filter may serve to inhibit a light of infrared ray region from entering the image sensor. The infrared cut-off filter may be interposed between the lens module and the image sensor, for example. The infrared cut-off filter may be disposed at a holder member (not shown) formed separately from a base (2500). However, the infrared cut-off filter may be mounted on a through hole (2510) formed at a center of the base (2500). The infrared cut-off filter may be formed with a film material or a glass material, for example. Meantime, the infrared cut-off filter may be formed by allowing an infrared cut-off coating material to be coated on a plate-shaped optical filter such as an imaging plane protection cover glass or a cover glass, for example.

The PCB may support the lens driving apparatus. The PCB may be mounted with an image sensor. For example, an upper inner side of the PCB may be disposed with an image sensor, and an upper outer side of the PCB may be disposed with a sensor holder (not shown). The sensor holder may be disposed at an upper side with a lens driving apparatus. Alternatively, an upper outer side of the PCB may be disposed with lens driving apparatus, and an upper inner side of the PCB may be disposed with an image sensor. Through this configuration, a light having passed the lens module accommodated at an inside of the lens driving apparatus may be irradiated on the image sensor mounted on the PCB. The PCB can supply electricity to the lens driving apparatus. Meantime, the PCB may be disposed with a controller for controlling the lens driving apparatus.

The image sensor may be mounted on a PCB. The image sensor may be matched with the lens module in terms of optical axis, whereby the image sensor can obtain a light having passed the lens module. The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on the PCB. The controller may be disposed at an outside of lens driving apparatus. However, the controller may be also disposed at an inside of lens driving apparatus. The controller may control a direction, intensity and amplitude of a current supplied to each element of lens driving apparatus. The controller may perform any one of an AF function and an OIS function of the camera module by controlling the lens driving apparatus. That is, the controller may move the lens module to an optical axis direction or tile the lens module to a direction orthogonal to the optical axis direction by controlling the lens driving apparatus. Furthermore, the controller may perform a feedback control of AF function and OIS function. To be more specific, the controller may control a power or a current applied to a first driving portion (2220) to a third driving portion (2420) by receiving a position of a housing (2310) detected by a sensor portion (2700), whereby a more accurate AF function and OIS function can be provided.

Hereinafter, configuration of a lens driving apparatus according to a third exemplary embodiment of the present invention will be described with reference to the accompanying drawings.

Figure 15:
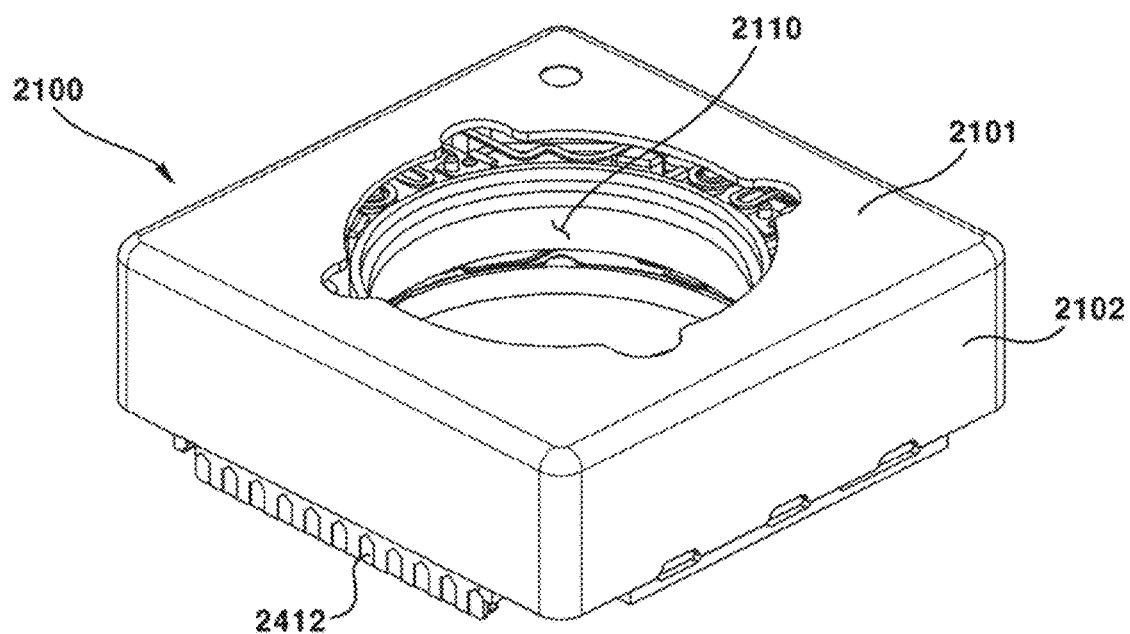
FIG. 15 is a perspective view illustrating a lens driving apparatus according to a third exemplary embodiment of the present invention.
Figure 16:
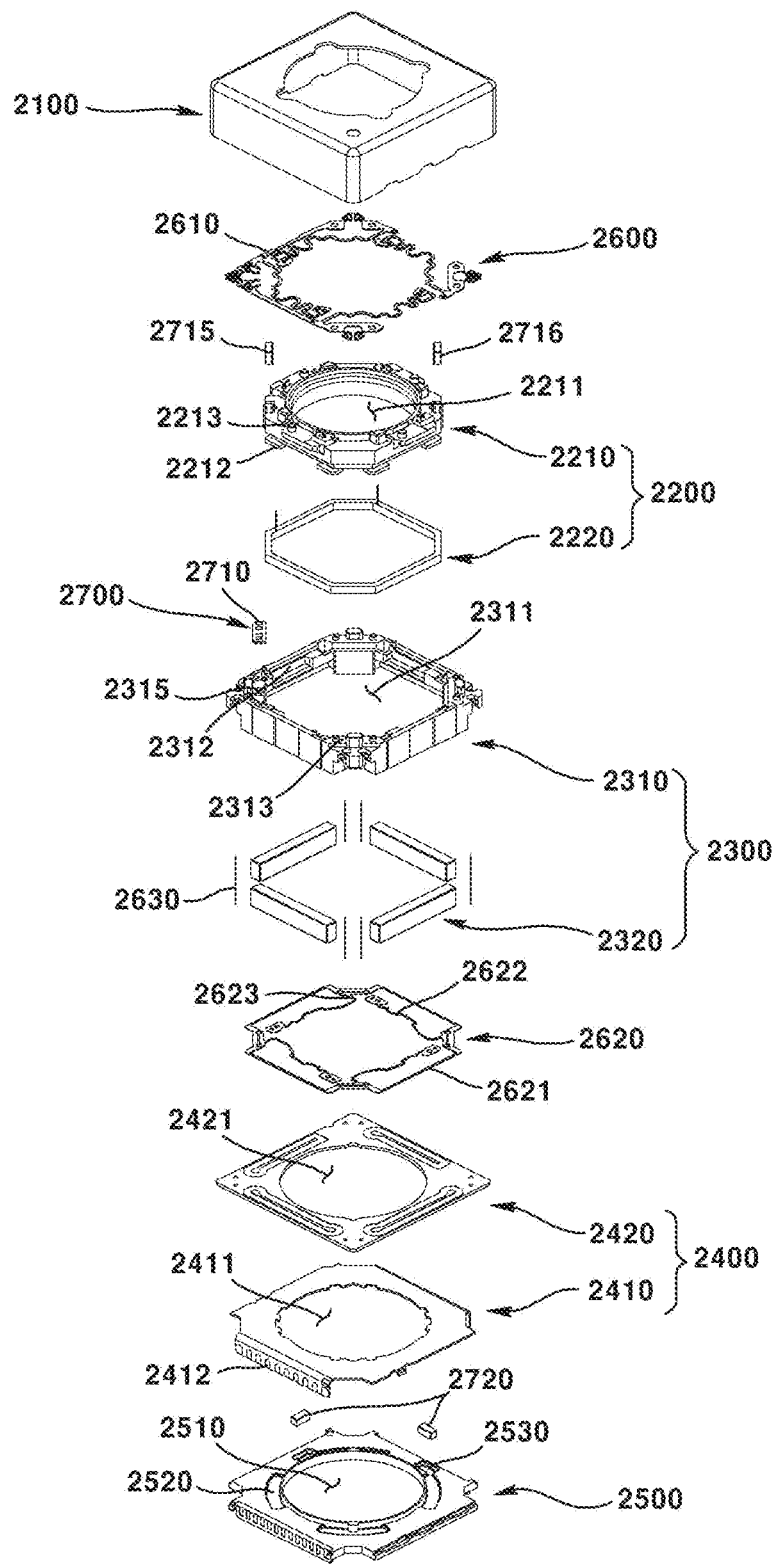
FIG. 16 is an exploded perspective view illustrating a lens driving apparatus according to a third exemplary embodiment of the present invention.
Figure 17:
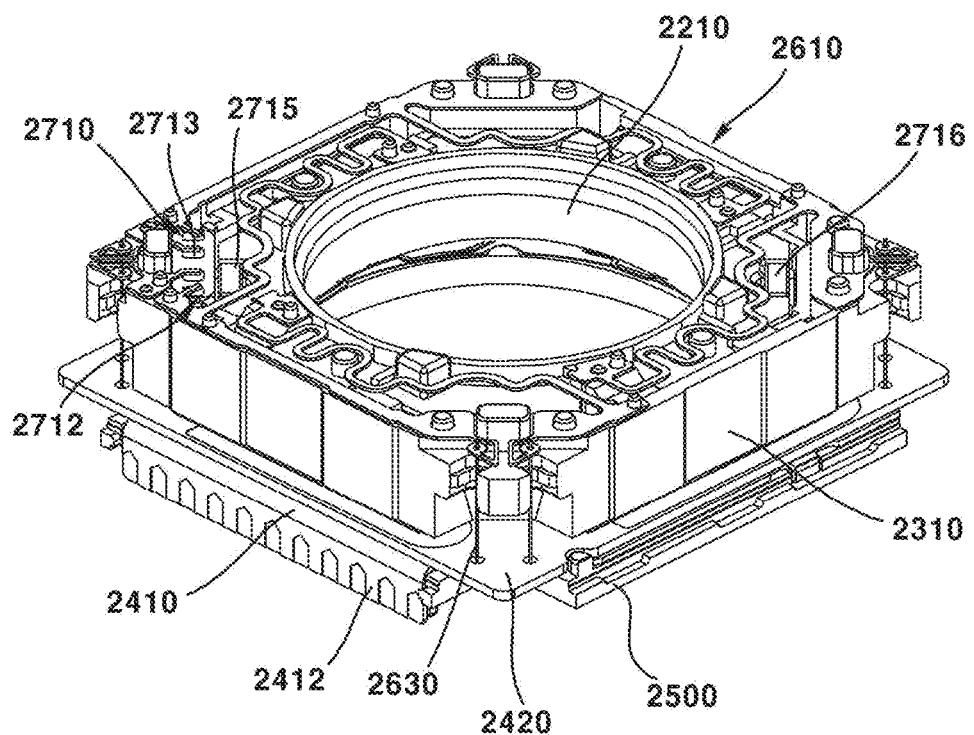
FIG. 17 is a perspective view illustrating a state where a cover member is removed from FIG. 15.
Figure 18:
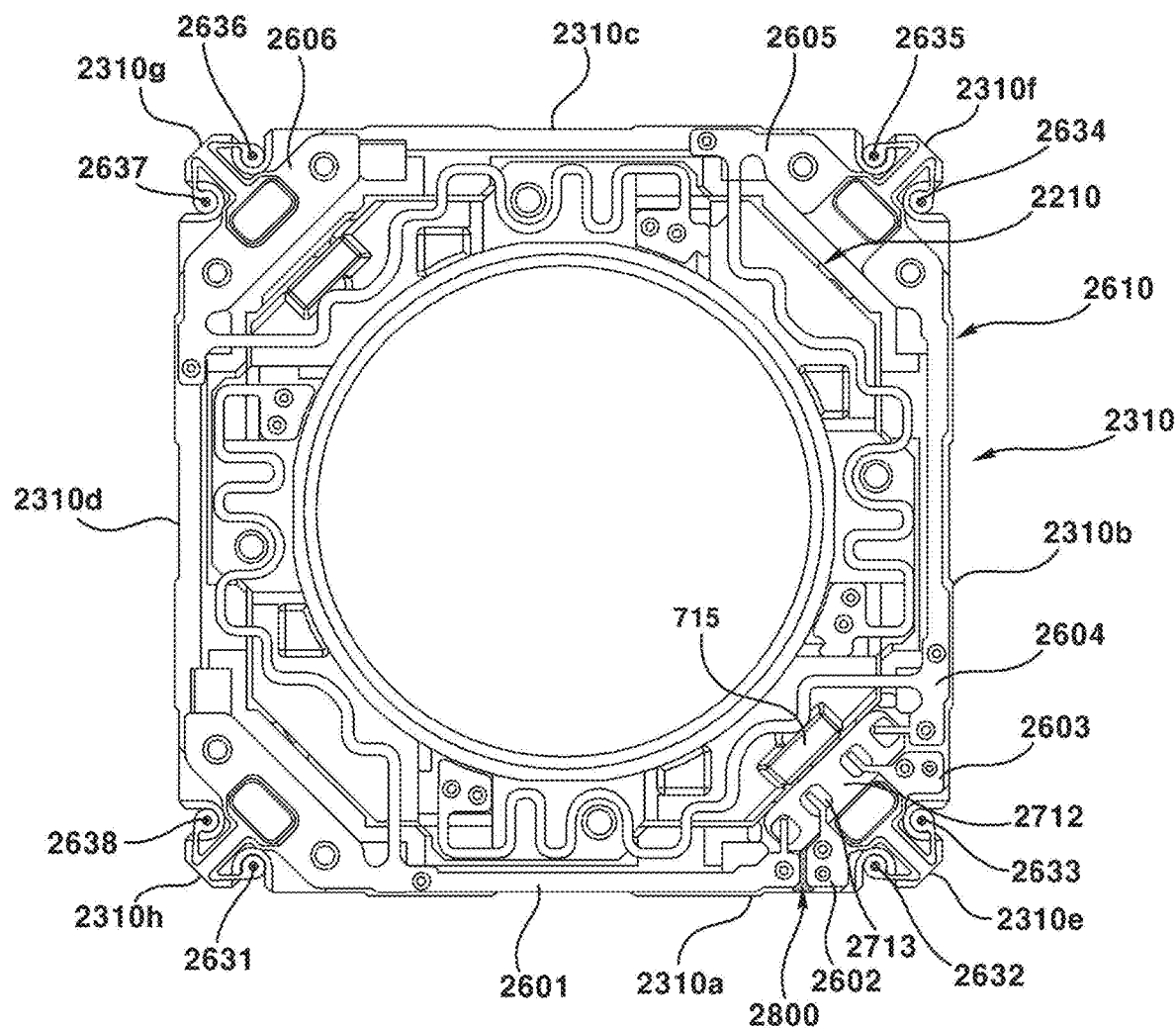
FIG. 18 is a plan view illustrating a state where some elements of a lens driving apparatus according to a third exemplary embodiment of the present invention.
Figure 19:
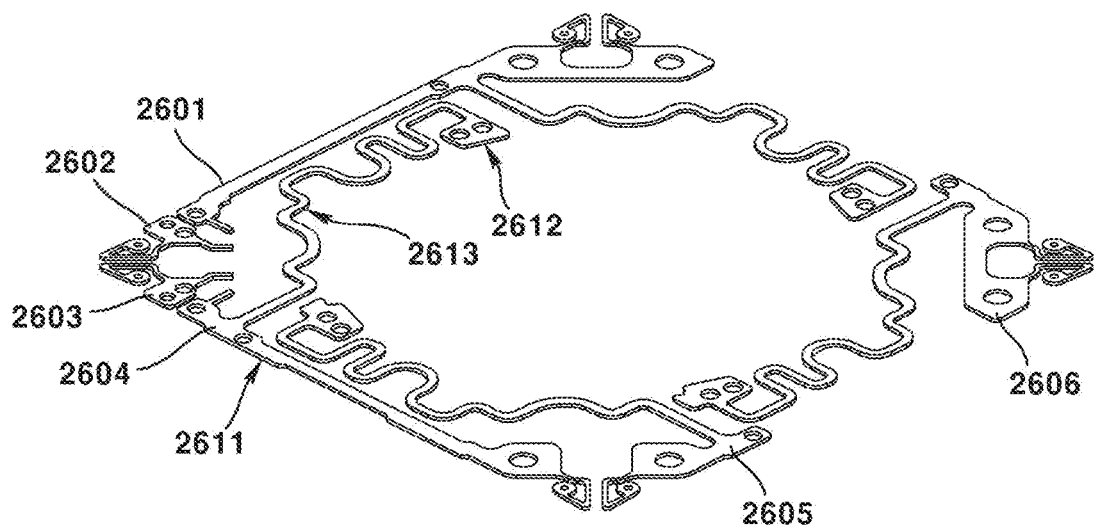
FIG. 19 is a perspective view illustrating an upper support member of a lens driving apparatus according to a third exemplary embodiment of the present invention.
Figure 20:
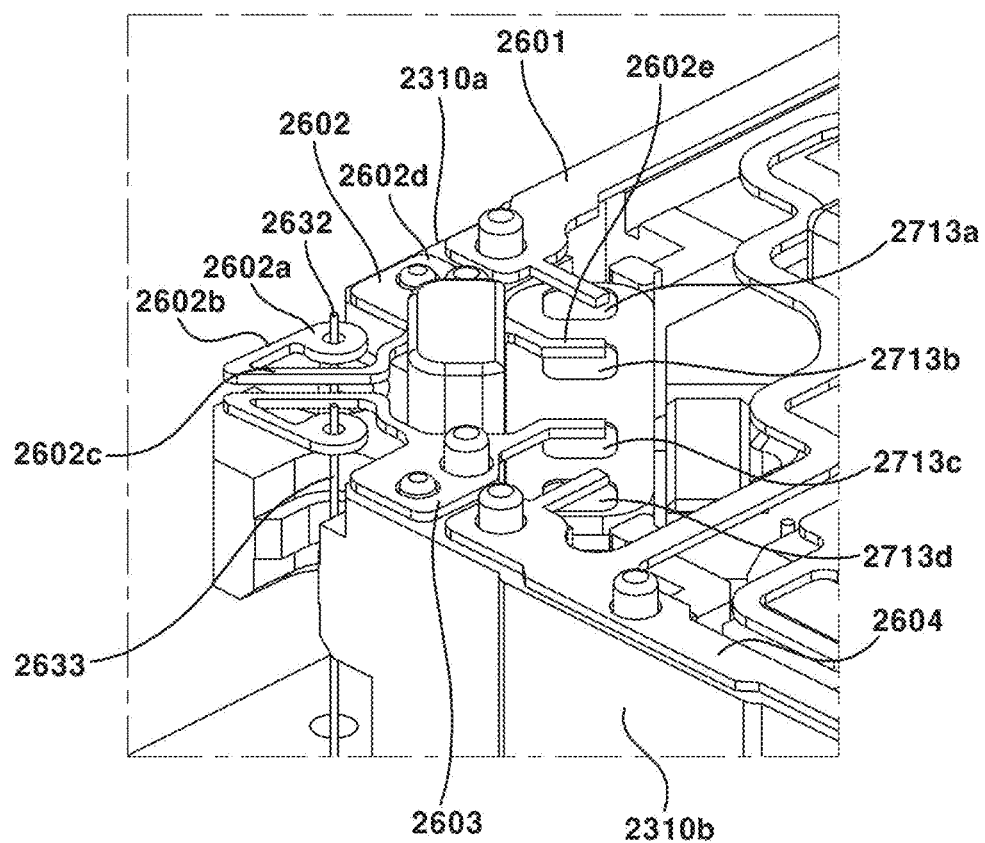
FIG. 20 is a perspective view illustrating some elements of a lens driving apparatus according to a third exemplary embodiment of the present invention.
Figure 21:
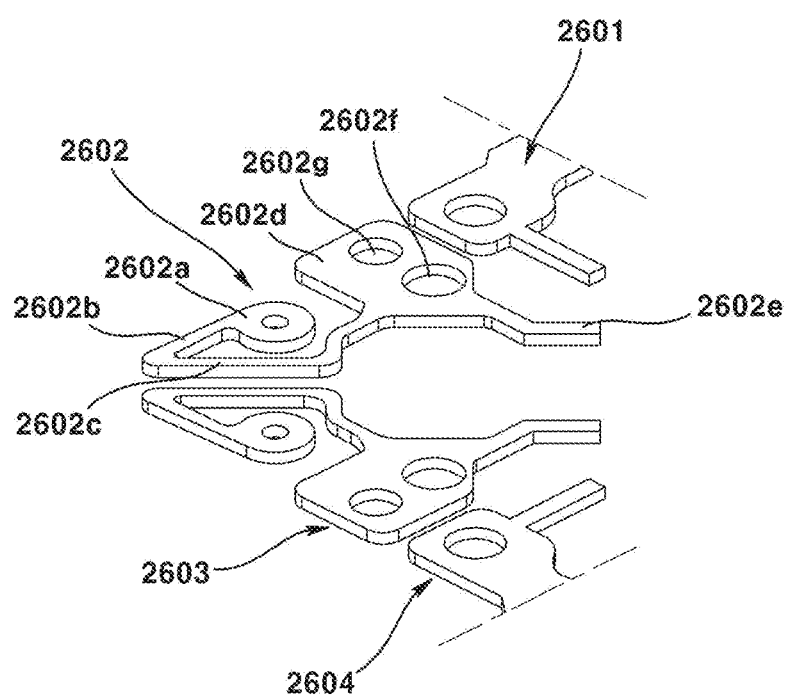
FIG. 21 is a perspective view illustrating an upper support member in FIG. 20.
Figure 22:
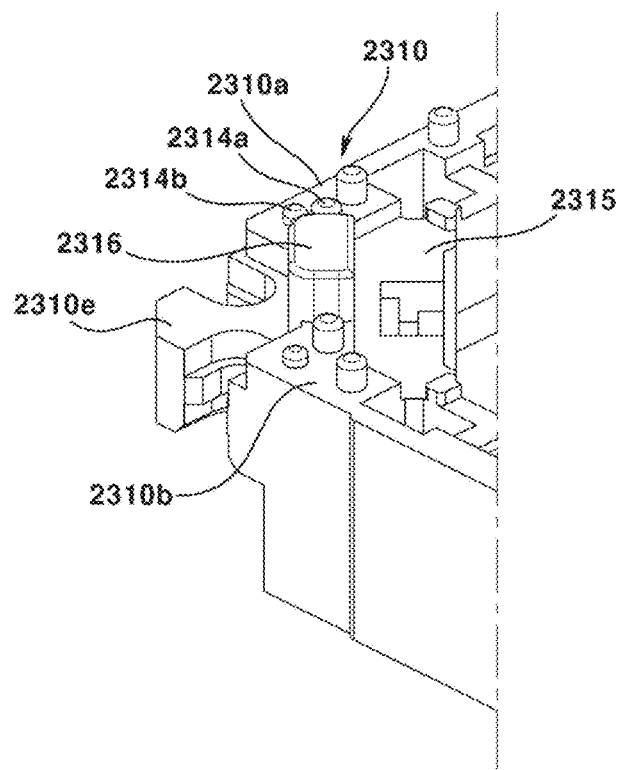
FIG. 22 is a perspective view illustrating a housing in FIG. 20.

FIG. 15 is a perspective view illustrating a lens driving apparatus according to a third exemplary embodiment of the present invention, FIG. 16 is an exploded perspective view illustrating a lens driving apparatus according to a third exemplary embodiment of the present invention, FIG. 17 is a perspective view illustrating a state where a cover member is removed from FIG. 15, FIG. 18 is a plan view illustrating a state where some elements of a lens driving apparatus according to a third exemplary embodiment of the present invention, FIG. 19 is a perspective view illustrating an upper support member of a lens driving apparatus according to a third exemplary embodiment of the present invention, FIG. 20 is a perspective view illustrating some elements of a lens driving apparatus according to a third exemplary embodiment of the present invention, FIG. 21 is a perspective view illustrating an upper support member in FIG. 20, and FIG. 22 is a perspective view illustrating a housing in FIG. 20.

Referring to FIGS. 15 to 22, the lens driving apparatus according to a third exemplary embodiment of the present invention may include a cover member (2100), a first mover (2200), a second mover (2300), a stator (2400), a base (2500), a support member (2600) and a sensor portion (2700). However, the lens driving apparatus according to the third exemplary embodiment of the present invention may omit any one of the cover member (2100), the first mover (2200), the second mover (2300), the stator (2400), the base (2500), the support member (2600) and the sensor portion (2700). Inter alfa, the sensor portion (2700) may be omitted as a configuration for AF feedback function and/or OIS feedback function.

The cover member (2100) may form an exterior look of lens driving apparatus. The cover member (2100) may take a lower-opened cubic shape. However, the present invention is not limited thereto. The cover member (2100) may be formed with a metal material, for example. To be more specific, the cover member (2100) may be formed with a metal plate. In this case, the cover member (2100) can block an EMI (Electromagnetic Interference). Because of this characteristic of the cover member (2100), the cover member (2100) may be called an EMI shield. The cover member (2100) may shield the radio wave generated from an outside of the lens driving apparatus from entering into an inside of the cover member (2100). Furthermore, the cover member (2100) can inhibit the radio wave generated from inside of the cover member (2100) from being emitted to outside of the cover member (2100). However, the material of the cover member (2100) is not limited thereto.

The cover member (2100) may include an upper plate (2101) and a lateral plate (2102). The cover member (2100) may include an upper plate (2101) and a lateral plate (2102) extended downwards from an external side of the upper plate (2101). Meantime, a lower end of the lateral plate (2102) at the cover member (2100) may be mounted to the base (2500). The cover member (2100) may be adhered at an inner surface to a portion or a whole portion at the lateral surface of the base (2500) to be mounted on the base (2500). An inner space formed by the cover member (2100) and the base (2500) may be disposed with a first mover (2200), a second mover (2300), a stator (2400) and a support member (2600). Through this configuration, the cover member (2100) may have functions of protecting inner elements from external shocks and inhibiting foreign objects from entering the cover member (2100) as well. However, the present invention is not limited thereto, and a lower end of the lateral plate (2102) at the cover member (2100) may be directly coupled to a PCB disposed at a lower side of the base (2500).

The cover member (2100) may include an opening (2110) exposing the lens module by being formed at the upper plate (2101). The opening (2110) may be formed in a shape corresponding to that of the lens module. The size of opening (2110) may be formed greater than that of a diameter of the lens module in order to allow the lens module to be assembled through the opening (2110). Furthermore, a light introduced through the opening (2110) may pass through the lens module. At this time, the light having passed the lens module may be obtained by an image sensor as an image.

The first mover (2200) may be coupled to a lens module, one of the constitutional elements of camera module {however, the lens module may be explained as one of the elements of the lens driving apparatus}. That is, the lens module may be disposed at an inside of the first mover (2200). In other words, an inner circumferential surface of the first mover (2200) may be coupled by an outer circumferential surface of the lens module. Meantime, the first mover (2200) may move integrally with the lens module through an interaction with the second mover (2300) and/or the stator (2400). That is, the first mover (2200) may move along with the lens module.

The first mover (2200) may include a bobbin (2210) and a first driving portion (2220). The first mover (2200) may include a bobbin (2210) coupled to the lens module. The first mover (2200) may include a first driving portion (2220) disposed at the bobbin (2210) to move by the electromagnetic interaction with a second driving portion (2320).

The first mover (2200) may be coupled to a lens module. To be more specific, an inner circumferential surface of the bobbin (2210) may be coupled by an outer circumferential surface of the lens module. The bobbin (2210) may be coupled by the first driving portion (2220). A lower surface of bobbin (2210) may be coupled to a lower support member (2620), and an upper surface of bobbin (2210) may be coupled to an upper support member (2610). The bobbin (2210) may be disposed at an inside of the housing (2310). The bobbin (2210) may relatively move to an optical axis direction relative to the housing (2310).

The bobbin (2210) may include a lens accommodation portion (2211), a first driving portion coupling portion (2212) and an upper coupling portion (2213) and a lower coupling portion (not shown). The bobbin (2210) may be formed at an inside with an upper/lower-opened lens accommodation portion (2211). The bobbin (2210) may include a lens accommodation portion (2211) formed at an inside. The lens accommodation portion (2211) may be coupled by the lens module.

An inner circumferential surface of the lens accommodation portion (2211) may be formed with a screw thread in a shape corresponding to that of a screw thread formed at an outer circumferential surface of the lens module. That is, the lens accommodation portion (2211) may be screw-connected with the lens module. An adhesive may be interposed between the lens module and the bobbin (2210). At this time, the adhesive may be UV curing epoxy. That is, the lens module and the bobbin (2210) may be adhered by a UV-curing epoxy and/or heat-curing epoxy.

The bobbin (2210) may include a first driving portion coupling portion (2212) wound by or installed with the first driving portion (2220). The first driving portion coupling portion (2212) may be integrally formed with an external lateral surface of the bobbin (2210). Furthermore, the first driving portion coupling portion (2212) may be continuously formed along with the external lateral surface of the bobbin (2210) or may be spaced apart at a predetermined distance. For example, the first driving portion coupling portion (2212) may be formed by being recessed in a shape corresponding to that of the first driving portion (2220) at a portion in an outer circumferential surface of the bobbin (2210). At this time, a coil of the first driving portion (2220) may be directly wound on the first driving portion coupling portion (2212). In a modification, the first driving portion coupling portion (2212) may be opened at an upper side or a lower side. At this time, a coil on the first driving portion (2220) may be inserted and coupled to the first driving portion coupling portion (2212) through the opened portion in a pre-wound state.

The bobbin (2210) may include an upper coupling portion (2213) coupled with an upper support member (2610). The upper coupling portion (2213) may be coupled to an inner lateral portion (2612) of the upper support member (2610). For example, a lug (not shown) of the upper coupling portion (2213) may be coupled by being inserted into a groove or a hole (not shown) at the inner lateral portion (2612) of the upper support member (2610). At this time, the lug of the upper coupling portion (2213) may fix the upper support member (2610) by being heat-fused in a state of being inserted into a hole of the inner lateral portion (2612).

The bobbin (2210) may include a lower coupling portion coupled to a lower support member (2620). The lower coupling portion may be coupled to an inner lateral portion (2622) of the lower support member (2620). For example, a lug (not shown) at the lower coupling portion may be coupled by being inserted into a groove or a hole (not shown) of the inner lateral portion (2622) of the lower support member (2620). At this time, the lug of the lower coupling portion may fix the lower support member (2620) by being heat-fused in a state of being inserted into a hole of the inner lateral portion (2622).

The first driving portion (2220) may be disposed at the bobbin (2210). The first driving portion (2220) may be disposed opposite to the second driving portion (2320). The first driving portion (2220) may move the bobbin (2210) to the housing (2310) through an electromagnetic interaction with the second driving portion (2320).

The first driving portion (2220) may include a coil. At this time, in order to distinguish the first driving portion (2220) from other element formed with a coil, the first driving portion (2220) may be called a "first coil". The first coil may be guided to the first driving portion coupling portion (2212) to be wound on an outer circumferential surface of the bobbin (2210). Furthermore, in another exemplary embodiment, the coil may be arranged at the external lateral surface of the bobbin (2210) by allowing four coils to be independently disposed to form a 90° between adjacent two coils.

The first coil may include a pair of lead cables (not shown) in order to supply a power. In this case, each pair of lead cables on the first coil may be electrically coupled to fifth and sixth upper support members (2605, 606) which are dividing elements of the upper support member (2610). That is, the first coil may receive the power from the upper support member (2610). Alternatively, the first coil may receive the power through the lower support member (2620).

Meantime, when electricity is supplied to the first coil, an electromagnetic field may be generated about the first coil. In a modification, the first driving portion (2220) may include a magnet, and the second driving portion (2320) may include a coil.

The second mover (2300) may move for OIS function. The second mover (2300) may be disposed an outside of the first mover (220) in opposition to the first mover (2200) to move the first mover (2200) or move along with the first mover (2200). The second mover (2300) may be movably supported by the stator (2400) and/or base (2500) disposed at a lower side. The second mover (2300) may be disposed at an inner space of the cover member (2100).

The second mover (2300) may include a housing (2310) and a second driving portion (2320). The second mover (2300) may include a housing (2310) disposed at an outside of the bobbin (2210). Furthermore, the second mover (2300) may include a second driving portion (2320) fixed to the housing (2310) by being disposed in opposition to the first driving portion (2220).

At least a portion of the housing (2310) may be formed in a shape corresponding to that of an inner lateral surface of the cover member (2100). Particularly, an outer lateral surface of the housing (2310) may be so formed as to correspond in shape to that of an inner lateral surface of lateral plate (2102) at the cover member (2100). The housing (2310) may take a cubic shape including four (4) lateral surfaces, for example. However, the shape of the housing (2310) is not limited thereto, and any shape will suffice as long as the housing can be disposed at an inside of the cover member (2100).

The housing (2310) may be formed with an insulation material, and may be formed in an injection-molded article in consideration of productivity. The housing (2310) is a part moving for OIS function driving, and may be arranged by being spaced apart from the cover member (2100) at a predetermined distance. However, the housing (310) may be fixed to the base (2500) in an AF model. Alternatively, the housing (2310) may be omitted in the AF model, and a magnet of the second driving portion (2320) may be fixed to the cover member (2100). The housing (2310) may be coupled at an upper surface to the upper support member (2610) and at a lower surface to the lower support member (2620).

The housing (2310) may include an inner space (2311), a second driving portion coupling portion (2312), an upper coupling portion (2313), a lower coupling portion (not shown) and a sensor accommodation portion (2315).

The housing (2310) may be opened at an upper side and a lower side to movably accommodate the first mover (2200) to a vertical direction. The housing (2310) may include, at an inner side, upper/lower-opened inner space (2311). The inner space (2311) may be movably disposed with the bobbin (2210). That is, the inner space (2311) may be formed in a shape corresponding to that of the bobbin (2210). Furthermore, an inner circumferential surface of the housing (2310) forming the inner space (2311) may be formed by being distanced from an outer circumferential surface of the bobbin (2210).

The housing (2310) may include, at a lateral surface, a second driving portion coupling portion (2312) that accommodates the second driving portion (2320) by being formed in a shape corresponding to that of the second driving portion (2320). That is, the second driving portion coupling portion (2312) may fix the second driving portion (2320) by accommodating the second driving portion (2320). The second driving portion (2320) may be fixed to the second driving portion coupling portion (2312) by an adhesive (not shown).

Meantime, the second driving portion coupling portion (2312) may be disposed at an inner circumferential surface of the housing (2310). In this case, there is an advantageous effect for an electromagnetic interaction with the first driving portion (2220) disposed at an inside of the second driving portion (2320). Furthermore, the second driving portion coupling portion (2312) may take a lower-opened shape, for example. In this case, there is an advantageous strength for an electromagnetic interaction between a third driving portion (2420) disposed at a lower side of the second driving portion (2320) and the second driving portion (2320). For example, the second driving portion coupling portion (2312) may be formed in four (4) pieces. Each of the second driving portion coupling portions (2312) may be coupled by the second driving portion (2320).

The housing (2310) may include an upper side coupling portion (2313) coupled to the upper support member (2610). The upper side coupling portion (2313) may be coupled to an external portion (2611) of the upper support member (2610). For example, a lug of the upper side coupling portion (2313) may be coupled to a groove or a hole (not shown) at the external portion (2611) by being inserted thereinto. Meantime, a lug of the upper side coupling portion (2313) may be fixed to the upper support member (2610) by being heat-fused in a state of being inserted into a hole of the external portion (2611).

The housing (2310) may include a lower coupling portion coupled to the lower support member (2620). The lower coupling portion may be coupled to an external portion (2621) of the lower support member (2620). For example, a lug of the lower coupling portion may be coupled by being inserted into a groove or a hole of the external portion (2621) of the lower support member (2620). At this time, a lug of the lower coupling portion may be fix the lower support member (2620) by being heat-fused in a state of being inserted into the hole of the external portion (2621).

The housing (2310) may include a sensor portion accommodation portion (2315). The sensor portion accommodation portion (2315) may be formed at an upper surface of housing (2310) by being recessed. The sensor portion accommodation portion (2315) may be accommodated with a substrate (2712) of first sensor portion (2710) and a first sensor (not shown). That is, the housing (2310) may fix and support the substrate (2712) mounted with the first sensor through the sensor portion accommodation portion (2315).

The housing (2310) may include continuously and adjacently arranged first to fourth lateral surface portions (2310a, 2310b, 2310c, 2310d). The housing (2310) may include a first edge portion (2310e) interposed between the first and second lateral surface portions (2310a, 2310b), a second edge portion (2310f) interposed between the second and third lateral surface portions (2310b, 2310c), a third edge portion (2310g) interposed between the third and fourth lateral surface portions (2310c, 2310d), and a fourth edge portion (2310h) interposed between the fourth and first lateral surface portions (2310d, 2310a).

The housing (2310) may include a coupling lug (2314a) and a guide lug (2314b) formed by being distanced from the coupling lug (2314a).

The coupling lug (2314a) may be protruded from a first surface of the housing (2310). To be more specific, the coupling lug (2314a) may be protruded upwardly from an upper surface of the housing (2310). The coupling lug (2314a) may be inserted into a coupling hole (2602f) of the upper support member (2610). The coupling lug (2314a) may be heat-fused in a state of being inserted into the coupling hole (2602f) of the upper support member (2610). In this case, the heat-fused coupling lug (2314a) may fix the upper support member (2610) to an upper surface of housing (2310).

The guide lug (2314b) may be spaced apart from the coupling lug (2314a). The guide lug (2314b) may be protruded from a first surface of housing (2310). To be more specific, the guide lug (2314b) may be protruded upwardly from an upper surface of the housing (2310). The guide lug (2314b) may be inserted into a guide hole (1602g) of the upper support member (2610). The guide lug (2314b) may be formed with a diameter smaller than that of the coupling lug (2314a). Furthermore, a height of the guide lug (2314b) may be shorter than that of the coupling lug (2314a). However, the present invention is not limited thereto. The guide lug (2314b) may inhibit the upper support member (2610) fixed to the housing (2310) by the coupling lug (2314a) from rotating.

The housing (2310) may include an upper stopper (2316) protruded from a first surface. The housing (2310) may include an upper stopper (2316) protruded upwardly from an upper surface. The upper stopper (2316) may be vertically overlapped with the cover member (2100). Through this configuration, when the housing (2310) moves upwardly, the upper stopper (2316) and the cover member (2100) may be contacted to restrict the movement of housing (2310). That is, the upper stopper (2316) may restrict a movement limit by mechanism of the housing (2310).

The upper stopper (2316) may be disposed at an inside of a first conductive portion (2602a) of upper support member (2610), an extension portion (2602b), a bent portion (2602c) and a coupling portion (2602d). That is, the upper stopper (2316) may be so disposed as not to overlap with corners of cover member (2100) to a vertical direction. In this case, interference between the upper stopper (2316) and corner portions of the cover member (2100) can be minimized to thereby minimize generation of foreign objects caused by wear and deformation. However, the present invention is not limited thereto, and the upper stopper (2316) may be disposed at a farther inner side than that of any one of a first conductive portion (2602a), an extension portion (2602b), a bent portion (2602c) and a coupling portion (2602d).

The second driving portion (2320) may be disposed in opposition to the first driving portion (2220). The second driving portion (2320) may move the first driving portion (2220) through an electromagnetic interaction with the first driving portion (2220). The second driving portion (2320) may include a magnet. At this time, the second driving portion (2320) may be called a "driving magnet" for the purpose of driving. Furthermore, the second driving portion (2320) may be called a "first magnet" in order to be distinguished from a sensing magnet (2715, described later) and a compensation magnet (2716).

The first magnet may be fixed to the second driving portion coupling portion (2312) of the housing (2310).

The second driving portion (2320) may be disposed at the housing (2310) in such a fashion that four magnets are independently formed, and two adjacent magnets form a right angle of 90°, as illustrated in FIG. 16, for example. That is, the second driving portion (2320) can promote an efficient use of inner volume by being installed on four lateral surfaces of the housing (2310), each at a predetermined interval. Furthermore, the second driving portion (2320) may be attached to the housing (2310) using an adhesive, but the present invention is not limited thereto. Meantime, as discussed above, the first driving portion (2220) may include magnets, and the second driving portion (2320) may include coils.

The stator (2400) may be disposed in opposition to a lower side of the second mover (2300). The stator (2400) may movably support the second mover (2300). The stator (2400) may move the second mover (2300). At this time, the first mover (2200) may also move along with the second mover (2300). The stator (2400) may be disposed at a center with through holes (2411, 421) corresponding to the lens module.

The stator (2400) may include a circuit substrate (2410) and a third driving portion (2420), for example. The stator (2400) may include a circuit substrate (2410) interposed between the third driving portion (2420) and the base (2500). Furthermore, the stator (2400) may include a third driving portion (2420) at a position oppositely formed at a lower side of the second driving portion (2320).

The circuit substrate (2410) may include a flexible substrate of FPCB (Flexible Printed Circuit Board). The circuit substrate (2410) may be interposed between the third driving portion (2420) and the base (2500). Meantime, the circuit substrate (2410) can supply electricity to the third driving portion (2420). Furthermore, the circuit substrate (2410) can supply electricity to the first driving portion (2220) or to the second driving portion (2320). For example, the circuit substrate (2410) can supply electricity to the first coil through the lateral support member (2630) and the upper support member (2610). Furthermore, the circuit substrate (2410) can supply electricity to a substrate (2712) of the first sensor portion (2710) through the lateral support member (2630) and the upper support member (2610). The power supplied to the substrate (2712) may be used for driving of the first sensor.

The circuit substrate (2410) may include a through hole (2411) and a terminal portion (2412), for example. The circuit substrate (2410) may include a through hole (2411) that passes a light having passed the lens module. The circuit substrate (2410) may include a terminal portion (2412) exposed to an outside by being bent downwardly. The terminal portion (2412) may be connected to an outside power by being exposed to outside on at least a portion thereof, whereby the circuit substrate (2410) can be supplied with the electricity.

The third driving portion (2420) can move the second driving portion (2320) through electromagnetic interaction. The third driving portion (2420) may include a coil. At this time, the third driving portion (2420) may be called a "second coil" in order to be distinguished from the first coil. The second coil may be disposed at the circuit substrate (2410). The second coil may be disposed in opposition to the first magnet.

When a power is applied to the second coil, the second driving portion (2320) and the housing (2310) fixed by the second driving portion (2320) may be integrally moved through an interaction with the second coil and the second driving portion (2320).

The second coil may be formed with an FP (Fine Patterned) coil mounted on the circuit substrate (2410). In this case, this configuration may be advantageous in the aspect of miniaturization of the lens driving apparatus (to reduce a height to a z axis direction which is an optical axis direction)

The second coil may be so formed as to minimize interference with a second sensor portion (2720) disposed at a lower side, for example. The second coil may be so formed as not to overlap with the second sensor portion (2720) to a vertical direction.

The third driving portion (2420) may be formed with a through hole (2421) passing a light of the lens module. The through hole (2421) may have a diameter corresponding to that of the lens module. The through hole (2421) of the third driving portion (2420) may have a diameter corresponding to that of the through hole (2411) at the circuit substrate (2410). The through hole (2421) of the third driving portion (2420) may have a diameter corresponding to that of the through hole (2510) at the base (2500). The through hole (2421) may be formed in a round shape. However, the present invention is not limited thereto.

The base (2500) may support the second mover (2300). A PCB may be disposed at a lower side of the base (2500). The base (2500) may perform a function of sensor holder protecting an image sensor mounted on the PCB.

The base (2500) may include a through hole (2510), a foreign object collection portion (2520) and a sensor mounting portion (2530). The base (2500) may include a through hole (2510) formed at a position corresponding to that of a lens accommodation portion (2211) of bobbin (2210). Meantime, the through hole (2510) of base (2500) may be coupled by an infrared ray filter. However, the infrared ray filter may be coupled to a separate sensor holder arranged at a lower surface of the base (2500).

The base (2500) may include a foreign object collection portion (2520) collecting foreign objects introduced into the cover member (2100). The foreign object collection portion (2520) may be disposed at an upper surface of the base (2500) to include an adhesive material, whereby foreign objects inside of an inner space formed by cover member (2100) and the base (2500) can be collected.

The base (2500) may include a sensor mounting portion (2530) coupled by a second sensor portion (2720). That is, the second sensor portion (2720) may be mounted on the sensor mounting portion (2530). At this time, the second sensor portion (2720) may detect the second driving portion (2320) coupled to the housing (2310) to detect a horizontal movement or a tilt of the housing (2310). The sensor mounting portion (2530) may be disposed in two pieces, for example. Each of the sensor mounting portions (2530) may be disposed with the second sensor portion (2720). In this case, the second sensor portion (2720) may be so disposed as to detect both the x axis and y axis direction movements of the housing (2310).

The support member (2600) may connect two or more of the first mover (2200), the second mover (2300) and the base (2500). The support member (2600) may elastically connect more than two elements of the first mover (2200), the second mover (2300), the stator (2400) and the base (2500) to allow a relative movement among each element. At least a portion of the support member (2600) may be formed to have elasticity. In this case, the support member (2600) may be called an elastic member.

The support member (2600) may include an upper support member (2610), a lower support member (2620) and a lateral support member (2630). Meantime, the upper support member (2610) may be called a "first support member". At this time, the lower support member (2620) may be called a "second support member", and the lateral support member (2630) may be called a "third support member" in order to be distinguished from the first and second support members Although the foregoing elaboration has described to distinguish the upper support member (2610) from the lower support member (2620) by limiting a position thereof for the convenience of explanation, the upper support member (2610) and the lower support member (2620) may be alternatively change in position, and any one may replace the other.

The upper support member (2610) may include an external portion (2611), an internal portion (2612) and a connection portion (2613), for example. The upper support member (2610) may include an external portion (2611) coupled with the housing (2310), an internal portion (2612) coupled with the bobbin (2210), and a connection portion (2613) elastically connecting the external portion (2611) and the internal portion (2612).

The upper support member (2610) may be connected to an upper surface of the first mover (2200) and an upper surface of the second mover (2300). To be more specific, the upper support member (2610) may be coupled to an upper surface of bobbin (2210) and an upper surface of housing (2310). The internal portion (2612) of the upper support member (2610) may be coupled to an upper coupling portion (2213) of the bobbin (2210), and the external portion (2611) of the upper support member (2610) may be coupled to an upper coupling portion (2313) of the housing (2310).

The upper support member (2610) may be divided to six (6) pieces, for example. At this time, four pieces of the six upper support members (2610) may be conductively connected to the first sensor portion (2710), and the remaining two pieces may be conductively connected to the first coil.

That is, the upper support member (610) may include first to sixth upper support units (2601, 2602, 2603, 2604, 2605, 2606), each spaced apart from the other. At this time, the first to fourth upper support units (2601, 2602, 2603, 2604) may be electrically connected to the first sensor portion (2710). Furthermore, the fifth and sixth upper support units (2605, 2606) may be electrically connected to the first coil. The first to fourth upper support units (2601, 2602, 2603, 2604) may supply the electricity to the first sensor portion (2710) and may be used for transmission/receipt of information and signals between a controller and the first sensor portion (2710). The fifth and sixth upper support units (2605, 2606) may be used for supply of power to the first coil.

The first to fourth upper support units (2601, 2602, 2603, 2604) may be disposed on a same planar surface as illustrated in FIG. 19. Furthermore, the first to fourth upper support units (2601, 2602, 2603, 2604) have elasticity and can be deformed, such that a portion of any one of the first to fourth upper support units (2601, 2602, 2603, 2604) may be deviated from the same planar surface.

The first and second upper support units (2601, 2602) may be vertically overlapped with a first lateral portion (2310a) of the housing (2310). Alternatively, the third and fourth upper support units (2603, 2604) may be vertically overlapped with a second lateral portion (2310b) of the housing (2310). Each of the first to sixth upper support units (2601, 2602, 2603, 2604, 2605, 2606) may be formed with a different shape. However, the second and third upper support units (2602, 2603) may have a symmetrical shape. To be more specific, each of the second and third upper support units (2602, 2603) may have a symmetrical shape based on an imaginary straight line crossing the housing (2310) to a diagonal direction.

The upper support member (2610) may include a coupling hole (2602f) and a guide hole (2602g).

The coupling hole (2602f) may be so formed as to vertically penetrate a portion of the upper support member (2610). The coupling hole (2602f) may be formed with a coupling lug (2314a) of the housing (2310). That is, a width of the coupling hole (2602f) may be greater than a width of the coupling lug (2314a) by a predetermined size. The coupling hole (2602f) may be formed with a round shape. However, the present invention is not limited thereto.

The guide hole (2602g) may be spaced apart from the coupling hole (2602f). The guide hole (2602g) may be so formed as to vertically penetrate a portion of the upper support member (2610). The guide hole (2602g) may be inserted by a guide lug (2314b) of the housing (2310). That is, a width of the guide hole (2602g) may be greater than a width of the guide lug (2314b) by a predetermined size. The guide hole (2602g) may be formed with a round shape. However, the present invention is not limited thereto.

The upper support member (2610) and the housing (2310) may be doubly coupled by a coupling by a first conductive portion (2602a), an extension portion (2602b), a bent portion (2602c), a coupling portion (2602d) and a second conductive portion (2602e), and by a coupling by a guide hole (2602g) and a guide lug (2314b) to thereby inhibit the upper support member (2610) from rotating relative to the housing (2310).

The upper support member (2610) may include a first conductive portion (2602a), an extension portion (2602b), a bent portion (2602c), a coupling portion (2602d) and a second conductive portion (2602e). The second support unit (2602) may include a first conductive portion (2602a), an extension portion (2602b), a bent portion (2602c), a coupling portion (2602d) and a second conductive portion (2602e).

Although the first conductive portion (2602a), the extension portion (2602b), the bent portion (2602c), the coupling portion (2602d) and the second conductive portion (2602e) are explained as one element of the second upper support unit for convenience of explanation in the following description, the first conductive portion (2602a), the extension portion (2602b), the bent portion (2602c), the coupling portion (2602d) and the second conductive portion (2602e) may be applied to any one of the first to sixth upper support units (2601, 2602, 2603, 2604, 2605, 2606).

The second upper support unit (2602) may include a second lateral support unit (2632) and a first conductive portion (2602a) coupled to the second lateral support unit (2632).

The first conductive portion (2602a) may be coupled to a second lateral support unit (2632). The first conductive portion (2602a) may be electrically conducted with the second lateral support unit (2632) to thereby receive a power from the circuit substrate (2410) connected to the second lateral support unit (2632). The second upper support unit (2602) may include an extension portion (2602b) extended outwardly from the first conductive portion (2602a) along a circumference of the housing (2310). The extension portion (2602b) may be extended outwardly from the first conductive portion (2602a) along a circumference of the housing (2310).

The second upper support unit (2602) may include a bent portion (2602c) extended and bent inwardly from the extension portion (2602b).

The bent portion (2602c) may be extended by being bent inwardly from the extension portion (2602b). The bent portion (2602c) may be extended from a distal end of the extension portion (2602b). The bent portion (2602c) may have an acute angle between the bent portion (2602c) and the extension portion (2602b). The bent portion (2602c) may be bent at a portion thereof in order to be corresponded to a shape of the upper stopper (2316). The bent portion (2602c) may be connected at one end to the extension portion (2602b) and connected at the other end to the coupling portion (2602d).

Each of the extension portion (2602b) and the bent portion (2602c) may have elasticity on at least one portion thereof. Thus, the extension portion (2602b) and the bent portion (2602c) may be generally called a "cushion portion". Meantime, the cushion portion may not be generated with short-circuit during reliability test through the foregoing shape. Furthermore, the cushion portion may not be generated with interference with the housing (2310) even if there is generated a deformation by shocks during the reliability test. That is, the cushion portion may be formed with a shape that generates no interference with the housing (2310) even if deformation is generated. However, explanation may be also made in such a manner that at least one portion of the housing (2310) is omitted to thereby inhibit interference with the cushion portion.

The second upper support unit (2602) may include a coupling portion (2602d) connected to the bent portion (2602c) and coupled to the housing (2602c). The coupling portion (2602d) may be connected to the bent portion (2602c) and coupled to the housing (2602c). The coupling portion (2602d) may be formed with a coupling hole (2602f) coupled by a coupling lug (2314a) of the housing (2310), and a guide hole (2602g) coupled by the guide lug (2314b) of the housing (2310). That is, the coupling portion (2602d) of the second upper support unit (2702) may be so coupled as to inhibit the rotation relative to the housing (2310) through the dual coupling structure. Meantime, when the second upper support unit (2602) and the coupling lug (2314a) are fused, a rotational deformation of the upper support unit (2602) can be inhibited. The coupling portion (2602d) may be connected by the bent portion (2602c) and the second conductive portion (2602e).

The second upper support unit (2602) may include a second conductive portion (2602e) extended from the coupling portion (2602d) or the bent portion (2602c) and electrically connected with the first sensor portion (2710). The second conductive portion (2602e) may be extended from the coupling portion (2602d) or the bent portion (2602c) and electrically connected to the first sensor portion (2710). For instance, the second conductive portion (2602e) and the terminal portion (2713) of the first sensor portion (2710) may be electrically conducted using a soldering. However, the present invention is not limited thereto.

The lower support member (2620) may include an external portion (2621), an internal portion (2622) and a connection portion (2623), for example. The lower support member (2620) may include an external portion (2621) coupled to the housing (2310), an internal portion (2622) coupled to the bobbin (2210) and a connection portion (2623) elastically connecting the external portion (2621) and the internal portion (2622).

The lower support member (2620) may be connected to a lower surface of the first mover (2200) and to a lower surface of the second mover (2300). To be more specific, the lower support member (2620) may be connected to a lower surface of the bobbin (2210) and to a lower surface of the housing (2310). The internal portion (2622) of the lower support member (2620) may be coupled by a lower coupling portion of the bobbin (2210) and the external portion (2621) of the lower support member (2620) may be coupled by a lower coupling portion of the housing (2310).

The lower support member (2620) may be integrally formed, for example. However, the present invention is not limited thereto. In a modification, the lower support member (2620) may be divided to a pair of pieces and may be used for supply of electricity to the first coil.

The lateral support member (2630) may be fixed at one end to the stator (2400) and/or the base (2500), and coupled at the other end to the upper support member (2610) and/or the housing (2310). The lateral support member (2630) may be coupled at one side to the stator (2400) and coupled at the other side to the upper support member (2610), for example. Furthermore, in another exemplary embodiment, the lateral support member (2630) may be coupled at one side to the base (2500), and coupled at the other side to the housing (2310), whereby the lateral support member (2630) may elastically support the second mover (2300) relative to the stator (2400) to allow the second mover (2300) to horizontally move or to tilt.

The lateral support member (2630) may include a plurality of wires, for example. Alternatively, the lateral support member (2630) may include a plurality of leaf springs as a modification. Meantime, the lateral support member (2630) may be integrally formed with the upper support member (2610).

The lateral support member (2630) may be electrically connected at a distal end of one side to the circuit substrate (2410), and electrically connected at a distal end of the other side to the upper support member (2610). The lateral support member (2630) may be formed in the same number as that of the upper support member (2610), for example. That is, the lateral support member (2630) may include first to sixth lateral support units (2631, 2632, 2633, 2634, 2635, 2636), each spaced apart from the other at a predetermined distance. At this time, the first to sixth support units (2631, 2632, 2633, 2634, 2635, 2636) may be electrically connected in pair with the first to sixth upper support members (2601, 2602, 2603, 2604, 2605, 2606). In this case, the lateral support member (2630) may supply electricity supplied from the stator (2400) or from outside to each of the upper support members (2610).

The number of lateral support members (2630) may be determined in consideration of symmetry, for example. The lateral support member (2630) is such that each two lateral support members (2630) may be respectively formed on the first to fourth edge portions (2310e, 2310f, 2310g, 2310h) of housing (2310), a total of eight (8) lateral support members being formed. That is, the lateral support member (2630) may include first to eighth lateral support units (2631, 2632, 2633, 2634, 2635, 2636, 2637, 2638), each spaced apart from the other at a predetermined distance.

The first lateral support member (2631) may be electrically connected to the first upper support unit (2601), the second lateral support member (2632) may be electrically connected to the second upper support unit (2602), the third lateral support member (2633) may be electrically connected to the third upper support unit (2603), the fourth lateral support member (2634) may be electrically connected to the fourth upper support unit (2604), the fifth lateral support member (2635) may be electrically connected to the fifth upper support unit (2605), and the sixth lateral support member (2636) may be electrically connected to the sixth upper support unit (2606).

The lateral support member (2630) or the upper support member (2610) may include a shock absorption portion (not shown) for shock absorption, for example. The shock absorption portion may be formed on at least any one of the lateral support member (2630) and the upper support member (2610). The shock absorption portion may be a separate member like a damper. Furthermore, the shock absorption portion may be realized through a shape change on any one part of the lateral support member (2630) and the upper support member (2610).

The sensor portion (2700) may be used for any one of the AF feedback and OIS feedback. The sensor portion (2700) may detect positions or movements of at least any one of the first mover (2200) and the second mover (2300). The sensor portion (2700) may include a first sensor portion (2710) and a second sensor portion (2720), for example. The first sensor portion (2710) may provide information for AF feedback by sensing a relative vertical movement of the bobbin (2210) relative to the housing (2310). The second sensor portion (2720) may provide information for OIS feedback by detecting the horizontal direction movement and tilt of the second mover (2300). The first sensor portion (2710) may include a first sensor (not shown), a substrate (2712) and a sensing magnet (2715), for example.

The first sensor may be disposed at the housing (2310). The first sensor may be disposed at an upper surface of housing (2310). At this time, the sensing magnet (2715) may be disposed at an upper surface of bobbin (2210). The first sensor may be mounted on the substrate (2712). The first sensor may be disposed at the housing (2310) while being mounted on the substrate (2712).

The first sensor may detect movement or position of the bobbin (2210). The first sensor may detect a position or movement of bobbin (2210) by detecting the sensing magnet (2715) disposed at the bobbin (2210). The first sensor may be a Hall sensor for detecting magnetic force of magnet, for example.

The present invention is not limited thereto.

The substrate (2712) may be mounted with the first sensor. The substrate (2712) may be disposed at the housing (2310). The substrate (2712) may electrically conduct with the upper support member (2610), whereby the substrate (2712) can supply electricity to the first sensor and transmit/receive information or signal from the controller. The substrate (2712) may include a terminal portion (2713).

The terminal portion (2713) may be electrically connected with the upper support member (2610). To be more specific, first to fourth terminals (2713a, 2713b, 2713c, 2713d) of terminal portion (2713) may be electrically conducted in pair with the first to fourth upper support units (2601, 2602, 2603, 2604).

That is, the first terminal (2713a) may be electrically connected with the first upper support unit (2601), the second terminal (2713b) may be electrically connected with the second upper support unit (2602), the third terminal (2713c) may be electrically connected with the third upper support unit (2603) and the fourth terminal (2713d) may be electrically connected with the fourth upper support unit (2604). The terminal portion (2713) may be so disposed as to face upwards. However, the present invention is not limited thereto.

The sensing magnet (2715) may be disposed with the bobbin (2210). At this time, the sensing magnet (2715) may be called a "second magnet" in order to be distinguished from the "first magnet", which is a driving magnet.

The lens driving apparatus according to exemplary embodiments of the present invention may further comprise a compensation magnet (2716) disposed at the bobbin (2210) and diagonally positioned with the sensing magnet (2715) based on a center of bobbin (2210). The compensation magnet (2716) may be called a "third magnet" in order to be distinguished from the second magnet. The compensation magnet (2716) may be so disposed as to constitute a magnetic force balance with the sensing magnet (2715).

That is, the compensation magnet (2716) may be so disposed as to solve a magnetic force unbalance generated from the sensing magnet (2715). The sensing magnet (2715) may be disposed at one side of the bobbin (2210) and the compensation magnet (2716) may be disposed at the other side of the bobbin (2210).

The second sensor portion (2720) may be disposed at the stator (2400). The second sensor portion (2720) may be disposed at an upper surface or a lower surface of circuit substrate (2410). The second sensor portion (2720) may be disposed at a lower surface of the circuit substrate (2410) to be positioned at a sensor mounting portion (2530) formed at the base (2500), for example. The second sensor portion (2720) may include a Hall sensor, for example. In this case, the second sensor portion (2720) may sense the magnetic field to sense a relative movement of the second mover (2300) relative to the stator (2400). The second sensor portion (2720) may be formed in two pieces to detect both the x axis and y axis movements of the second mover (2300). Meantime, the second sensor portion (2720) may be so disposed as not to vertically overlap with an FP coil of the third driving portion (2420).

Now, the operation of the camera module according to a third exemplary embodiment of the present invention will be described.

First, an AF (Auto Focus) function of the camera module according to the exemplary embodiment of the present invention will be explained.

When a power is supplied to the coil of the first driving portion (2220), the first driving portion (2220) may perform movement relative to the second driving portion (2320) by electromagnetic interaction between magnets of the first driving portion (2220) and the second driving portion (2320). At this time, the bobbin (2210) coupled with the first driving portion (2220) may integrally move along with the first driving portion (2220). That is, the bobbin (2210) coupled to an inner side of the lens module may vertically move relative to the housing (2310). The said movement by the bobbin (2210) may result in the lens module closing in onto or distancing from the image sensor, whereby focus adjustment to an object can be performed by supplying a power to the coil of the first driving portion (2220).

Meantime, an AF feedback may be applied in order to perform a more accurate realization of AF function for the camera module according to the exemplary embodiment of the present invention.

The first sensor mounted on the housing (2310) and formed with a Hall sensor can detect a magnetic field of the sensing magnet (2715) fixed to the bobbin (2210).

Hence, when the bobbin (2210) performs a relative movement relative to the housing (2310), the amount of magnetic field detected by the first sensor is changed. Using the abovementioned method, the first sensor may transmit a detection value to a controller by detecting the movement of z axis direction or a position of the bobbin (2210). The controller may determine whether to perform an additional movement to the bobbin (2210) through the received detection value. This process is performed in real time, such that the AF function of the camera module according to an exemplary embodiment of the present invention can be more accurately implemented through the AF feedback.

Now, the OIS function of camera module according to the exemplary embodiment of the present invention will be described.

When a power is supplied to a coil of third driving portion (2420), the second driving portion (2320) may perform a movement relative to the third driving portion (2420) through an electromagnetic interaction between the magnets of the third driving portion (2420) and the second driving portion (2320). At this time, the housing (2310) coupled by the second driving portion (2320) may move integrally with the second driving portion (2320).

That is, the housing (2310) may horizontally move relative to the base (2500). Meantime, at this time, the housing (2310) may be induced to tilt relative to the base (2500). At this time, the bobbin (2210) may also integrally move along with the housing (2310). This said movement of housing (2310) may result in the lens module moving to a direction parallel to that of the image sensor being positioned relative to the image sensor, whereby the OIS function can be performed by supplying electricity to the coil of the third driving portion (2420).

Meantime, an OIS feedback may be applied for more accurate implementation of OIS function of camera module according to the exemplary embodiment of the present invention.

A pair of second sensor portions (2720) mounted on the base (2500) and formed with a Hall sensor may detect a magnetic field of a magnet at the second driving portion (2320) fixed to the housing (2310). Thus, when the housing (2310) performs a relative movement relative to the base (2500), the amount of magnetic field detected by the second sensor portion (2720) is changed. Using the abovementioned method, the pair of second sensor portions (2720) may transmit a detection value to a controller by detecting the movement of horizontal direction (x axis and y axis directions) or a position of the housing (2310). The controller may determine whether to perform an additional movement relative to the housing (2310) through the received detection value. This process is performed in real time, such that the OIS function of the camera module according to an exemplary embodiment of the present invention can be more accurately implemented through the OIS feedback.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device comprising:
a base;
a housing disposed on the base;
a bobbin disposed in the housing;
a first coil disposed on the bobbin;
a first magnet disposed on the housing and facing the first coil;
a first board disposed on the base and comprising a second coil facing the first magnet;
an elastic member connecting the housing and the bobbin;
a support member electrically connecting the elastic member and the first board;
a second magnet disposed on the bobbin;
a second board; and
a Hall sensor disposed on the second board and configured to sense the second magnet,
wherein the Hall sensor comprises a sensing part configured to sense a magnetic field,
wherein the Hall sensor comprises first and second surfaces opposite to each other, third and fourth surfaces connecting the first and second surfaces and opposite to each other, and fifth and sixth surfaces connecting the first and second surfaces and opposite to each other,
wherein the Hall sensor is coupled to a first surface of the second board,
wherein the first surface of the Hall sensor faces the first surface of the second board, and
wherein a distance between the fifth surface and the sixth surface of the Hall sensor is greater than a distance between the third surface and the fourth surface of the Hall sensor.

2. The lens driving device of claim 1, wherein a distance between a center of the sensing part and the third surface of the Hall sensor is greater than a distance between the center of the sensing part and the second surface of the Hall sensor, and
wherein a distance between the center of the sensing part and the second surface of the Hall sensor is shorter than a distance between the center of the sensing part and the first surface of the Hall sensor.

3. The lens driving device of claim 1, wherein the second magnet comprises a first surface facing at least one of the housing and the sensor, and
wherein the first surface of the second board faces an imaginary plane comprising the first surface of the second magnet.

4. The lens driving device of claim 3, wherein the second surface of the Hall sensor faces the imaginary plane comprising the first surface of the second magnet.

5. The lens driving device of claim 3, wherein at least a portion of the second surface of the Hall sensor is overlapped with the first surface of the second magnet in a direction perpendicular to an optical axis.

6. The lens driving device of claim 1, wherein the distance between the center of the sensing part and the second surface of the Hall sensor is 90 to 110 μm, and
wherein the distance between the center of the sensing part and the third surface of the Hall sensor is 240 to 260 μm.

7. The lens driving device of claim 1, wherein the sensing part is disposed at a position higher than that of an upper surface of the second magnet.

8. The lens driving device of claim 1, wherein the first surface of the second board is vertically disposed on an upper surface of the housing.

9. The lens driving device of claim 1, comprising a third magnet,
wherein the second board is disposed on the housing, and
wherein the third magnet is disposed on the bobbin and disposed to be symmetrical with the second magnet based on a center axis of the bobbin.

10. The lens driving device of claim 1,
wherein the second magnet is disposed above the first coil.

11. The lens driving device of claim 1, wherein a distance between the center of the sensing part and the third surface of the Hall sensor is same as a distance between the center of the sensing part and the fourth surface of the Hall sensor, and
wherein a distance between the center of the sensing part and the fifth surface of the Hall sensor is same as a distance between the center of the sensing part and the sixth surface of the Hall sensor.

12. The lens driving device of claim 1, wherein the second surface of the Hall sensor is parallel to the first surface of the Hall sensor,
wherein the fourth surface of the Hall sensor is parallel to the third surface of the Hall sensor, and
wherein the sixth surface of the Hall sensor is parallel to the fifth surface of the Hall sensor.

13. The lens driving device of claim 1, wherein the fifth and sixth surfaces of the Hall sensor connect to the third and fourth surfaces of the Hall sensor.

14. A camera module comprising:
a printed circuit board (PCB);
an image sensor disposed on the PCB;
the lens driving device of claim 1 disposed on the PCB; and
a lens coupled to the bobbin of the lens driving device.

15. An optical apparatus comprising:
a main body;
the camera module of claim 14 disposed on the main body; and
a display part disposed on the main body and configured to output an image photographed by the camera module.

16. A lens driving device comprising:
a base;
a housing disposed on the base;
a bobbin disposed in the housing;
a first coil disposed on the bobbin;
a first magnet disposed on the housing and facing the first coil;

a second coil disposed on the base and facing the first magnet;

a second magnet disposed on the bobbin;

a second board; and a Hall sensor disposed on the second board and sensing configured to sense the second magnet, wherein the Hall sensor comprises a part configured to sense a magnetic field, and wherein Hall sensor comprises first and second surfaces opposite to each other.

17. The lens driving device of claim 16, wherein a distance between a center of the sensing part and the second surface of the Hall sensor is greater than a distance between the center of the sensing part and the first surface of the Hall sensor, wherein the Hall sensor comprises third and fourth surfaces connecting the first and second surfaces and opposite to each other, and fifth and sixth surfaces connecting the first and second surfaces and opposite to each other, and wherein a distance between the fifth surface and the sixth surface of the Hall sensor greater than a distance between the third surface and the fourth surface of the Hall sensor.

18. The lens driving device of claim 17, wherein a distance between a center of the sensing part and the third surface of the Hall sensor is greater than a distance between the center of the sensing part and the second surface of the Hall sensor.

19. The lens driving device of claim 18, wherein the distance between the center of the sensing part and the second surface of the Hall sensor is 90 to 110 μm, and wherein the distance between the center of the sensing part and the third surface of the Hall sensor is 240 to 260 μm.

20. A camera module comprising:

a printed circuit board (PCB);

an image sensor disposed on the PCB;

the lens driving device of claim 16 disposed on the PCB; and a lens coupled to the bobbin of the lens driving device.

* * * * *